(12) United States Patent
Zhong

(10) Patent No.: US 11,912,114 B2
(45) Date of Patent: Feb. 27, 2024

(54) ELECTROCHROMIC SUNROOF BASED ON ALL SOLID-STATE FLEXIBLE THIN FILM ELECTROCHROMIC DEVICE AND METHODS TO FABRICATE THE SAME

(71) Applicant: Shenzhen Guangyi Tech Co., Ltd., Shenzhen (CN)

(72) Inventor: Zhuohong Zhong, Shenzhen (CN)

(73) Assignee: Shenzhen Guangyi Tech Co., Ltd., Shenzhen (CN)

( * ) Notice: Subject to any disclaimer, the term of this patent is extended or adjusted under 35 U.S.C. 154(b) by 551 days.

(21) Appl. No.: 16/910,364

(22) Filed: Jun. 24, 2020

(65) Prior Publication Data

US 2020/0406728 A1 Dec. 31, 2020

Related U.S. Application Data

(60) Provisional application No. 62/866,350, filed on Jun. 25, 2019.

(51) Int. Cl.
*B60J 7/043* (2006.01)
*B60J 3/04* (2006.01)
(Continued)

(52) U.S. Cl.
CPC ....... *B60J 7/0435* (2013.01); *B32B 17/10036* (2013.01); *B32B 17/10302* (2013.01);
(Continued)

(58) Field of Classification Search
CPC ............. Y10T 428/28; Y10T 428/2809; Y10T 428/2813; Y10T 428/2817; Y10T 428/2826; Y10T 428/283; Y10T 428/2648; Y10T 428/2852; Y10T 428/287; Y10T 428/2878; Y10T 428/2891; Y10T 428/2896; Y10T 428/30; Y10T 428/31511; Y10T 428/31515; Y10T 428/31518; Y10T 428/31525; Y10T 428/31551; Y10T 428/31554; Y10T 428/31565; Y10T 428/31573; Y10T 428/31576; Y10T 428/3158; Y10T 428/31587; Y10T 428/31591; Y10T 428/31598; Y10T 428/31601; Y10T 428/31616; Y10T 428/31634; Y10T 428/31638; Y10T 428/31645; Y10T 428/31649; Y10T 428/31786; Y10T 428/3179; Y10T 428/31797; Y10T 428/31855; Y10T 428/3188; Y10T 428/31884;
(Continued)

(56) References Cited

U.S. PATENT DOCUMENTS

| | | | |
|---|---|---|---|
| 6,201,071 B1 * | 3/2001 | Miura | C08G 65/22 525/410 |
| 2004/0067343 A1 * | 4/2004 | Beteille | B32B 17/10302 428/192 |

(Continued)

*Primary Examiner* — Maria V Ewald
*Assistant Examiner* — Ethan A. Utt

(57) ABSTRACT

The present disclosure provides an electrochromic sunroof encapsulating a pre-assembled all solid-state flexible thin film ECDs and methods to fabricate the disclosed electrochromic sunroof. The electrochromic sunroof of the present disclosure provides great flexibility and can be adapted to virtually any curvature or shape without leaking concerns.

14 Claims, 16 Drawing Sheets

(51) Int. Cl.
  *B32B 17/10* (2006.01)
  *G02F 1/1523* (2019.01)
  *B60R 1/08* (2006.01)
(52) U.S. Cl.
  CPC .. *B32B 17/10513* (2013.01); *B32B 17/10807* (2013.01); *B32B 17/10816* (2013.01); *B32B 17/10917* (2013.01); *B60J 3/04* (2013.01); *B60R 1/088* (2013.01); *G02F 1/1525* (2013.01)
(58) Field of Classification Search
  CPC ..... Y10T 428/31888; Y10T 428/31891; Y10T 428/31909; Y10T 428/31913; Y10T 428/31928; Y10T 428/31935; Y10T 428/31938; Y10T 428/24777; Y10S 428/913; B32B 3/00; B32B 3/02; B32B 3/08; B32B 7/00; B32B 7/04; B32B 7/12; B32B 9/00; B32B 9/005; B32B 9/007; B32B 9/04; B32B 9/045; B32B 17/00; B32B 17/06; B32B 17/08; B32B 17/10; B32B 17/10005; B32B 17/10009; B32B 17/10036; B32B 17/10165; B32B 17/10174; B32B 17/10201; B32B 17/10211; B32B 17/10293; B32B 17/10302; B32B 17/10431; B32B 17/10467; B32B 17/10495; B32B 17/10513; B32B 17/1055; B32B 17/10733; B32B 17/10743; B32B 17/10761; B32B 17/1077; B32B 17/10779; B32B 17/10788; B32B 23/00; B32B 23/04; B32B 23/08; B32B 23/20; B32B 27/00; B32B 27/04; B32B 27/06; B32B 27/08; B32B 27/28; B32B 27/30; B32B 27/306; B32B 27/308; B32B 27/32; B32B 27/325; B32B 27/36; B32B 27/38; B32B 27/40; B32B 2605/00; B32B 2605/006; B32B 2551/00; B60J 1/00; B60J 1/001; B60J 7/00; B60J 7/02; B60J 7/04; B60J 7/043; B60J 7/08; B60J 7/10; B60J 7/11; B60J 7/16; B60J 7/1628; B60J 7/1635; B60J 7/1642; G02B 1/00; G02B 1/04; G02B 1/10; G02F 1/00; G02F 1/0009; G02F 1/0018; G02F 1/0063; G02F 1/0081; G02F 1/01; G02F 1/061; G02F 1/15; G02F 1/1514; G02F 1/1516; G02F 1/15165; G02F 1/1523; G02F 1/1524; G02F 1/15245; G02F 1/1525; G02F 1/153; G02F 1/1533; G02F 1/155; G02F 1/157; G02F 1/161; G02F 1/163; G02F 2001/1517; G02F 2001/1518; G02F 2001/1536; G02F 2001/1552; G02F 2001/1555; G02F 2001/1557; E06B 3/00; E06B 3/66; E06B 3/6608; E06B 3/663; E06B 3/66309; E06B 3/66328; E06B 3/66342; E06B 3/67; E06B 3/6715; E06B 3/6722; E06B 9/00; E06B 9/24; E06B 2009/2464
  USPC .... 428/343, 345–347, 349, 350, 354, 355 R, 428/355 EP, 355 EN, 355 AC, 355 N, 428/413–415, 417, 423.1, 423.3, 423.7, 428/424.2, 424.4, 424.6, 424.8, 425.1, 428/425.5, 425.6, 426, 428, 430, 438, 428/439, 441, 442, 480, 481, 483, 500, 428/507–510, 515, 516, 520, 522, 523, 428/688–691, 696, 697, 699–702, 408, 428/704, 913, 192; 296/146.1, 146.15, 296/146.16, 210, 216.01; 359/237, 238, 359/240, 245, 265–275, 601–614
  See application file for complete search history.

(56) References Cited

U.S. PATENT DOCUMENTS

| | | | |
|---|---|---|---|
| 2007/0128452 A1* | 6/2007 | Fisher | G02F 1/16757 428/437 |
| 2010/0068514 A1* | 3/2010 | Ellinger | C09J 153/02 524/502 |
| 2011/0170170 A1* | 7/2011 | Boote | B32B 17/10036 359/296 |
| 2013/0069105 A1* | 3/2013 | Shi | H10K 50/846 257/E33.059 |

* cited by examiner

ELECTROCHROMIC SUNROOF BASED ON ALL SOLID-STATE FLEXIBLE THIN FILM ELECTROCHROMIC DEVICE AND METHODS TO FABRICATE THE SAME

REFERENCE TO RELATED APPLICATIONS

This application claims priority to U.S. Provisional Application No. 62/866,350, filed Jun. 25, 2019. The entire content of the provisional application is incorporated herein by reference.

TECHNICAL FIELD

The present disclosure is related to an electrochromic sunroof based on all solid-state flexible thin film electrochromic device and methods for fabricating the electrochromic sunroof.

BACKGROUND

In the present automotive technology field, panoramic sunroofs are becoming more and more popular. Undoubtedly, the vehicle with a sunroof not only enhances the comfort of the vehicle's internal environment, but also makes the vehicle more fashionable and beautiful. However, most of the current sunroofs use sunshades, which undoubtedly affects the view of the sunroof.

To solve this problem, some researchers have used photosensitizers to make the sunroof transmittance lower, thus achieving the shading effect. However, this technology used a photosensitizer, which can only be passively tinted, and cannot achieve the function of active color grading by the user; in addition, the transmittance of the sunroof cannot be step wisely dimmed.

Electrochromic materials become a great solution for the automotive sunroof. Electrochromism refers to the phenomenon that the material undergoes a redox reaction under the action of an applied voltage, and its optical properties (transmittance, absorptance, reflectance) reversibly change in the visible and infrared regions. It manifests itself in changes in color and transparency. Currently, the electrochromic material-based glass uses tungsten trioxide as the color-changing material; however, its process requires magnetron sputtering or evaporation of the material on the conductive glass, which is costly and demanding, especially for curved or spherical products. Thus the technology is hard to be transferred to high throughput manufacturing format.

SUMMARY

Described herein are an electrochromic sunroof based on a pre-assembled all solid-state flexible thin film ECD and the methods to fabricate the same.

In one aspect, the disclosure describes an electrochromic sunroof. The electrochromic sunroof includes a first glass, a first transparent adhesive layer disposed on a first glass, a first adhesive disposed on the first glass 1310-a, a second glass, a second adhesive disposed on the second glass, a pre-assembled all solid-state thin-film electrochromic device (ECD) interposed between the first adhesive layer and the second adhesive layer, and a sealant disposed at edges of the first glass and the second glass to seal the ECD, the first adhesive layer, and the second adhesive layer between the first glass and the second glass. Both the adhesive layers are optical transparent. Edges of adhesive layers are equal to or beyond edges of ECD. The sealant is adhesive and waterproof. The first glass and the second glass can be flat or with certain or various curvatures.

In some embodiments, the materials for the first and the second adhesive layers include optical clear adhesive (OCA) (including but not limited to resin OCA, liquid OCA (LOCA) or solid OCA), hot melting adhesives (including but not limited to ethylene vinyl acetate membrane (EVA) and polyvinyl butyral membrane (PVB)). In some embodiments, the materials for the sealant include butyl rubber, epoxy rubber, polyurethane, acrylic.

In another aspect, methods to prepare the disclosed electrochromic sunroof are disclosed. In some embodiments, a method for preparing the electrochromic sunroof comprises: applying the sealant onto one or both of the two pieces of glass; pre-assembling of the electrochromic sunroof by stacking the first glass, the first adhesive layer, the ECD, the second adhesive layer, the second glass together layer by layer in a certain order; curing the adhesives and the sealant.

In some embodiments, a method for preparing the electrochromic sunroof comprises: applying the sealant onto the one or both of two pieces of glass; stacking the first glass, the first adhesive layer, the ECD, the second adhesive layer, the second glass together layer by layer in a certain order; applying a pre-press shaping process; and applying a high-press process.

In some embodiments, a method for preparing the electrochromic sunroof comprises: stacking the first glass, the first adhesive layer, the ECD, the second adhesive layer, the second glass together layer by layer in a certain order; applying a pre-press shaping process; applying a high-press process; and dripping the sealant into the gap between two pieces of glass; and curing the sealant.

In some embodiments, a method for preparing the electrochromic sunroof comprises: sticking the first glass and the first adhesive layer together to form a first half-cell, and sticking the second glass, the second adhesive layer, and the ECD together to form a second half-cell; or sticking the first glass, the first adhesive layer, the ECD, and the second adhesive layer together to form a first half-cell and having the second glass as a second half-cell; packing the two half cells together to stick the first glass, the first adhesive layer, the ECD, the second adhesive layer, the second glass together to form a laminate; applying a high-press process to the laminate; applying the sealant into a gap between the first glass and the second glass; and curing the sealant.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION OF EMBODIMENTS

Figure 1:
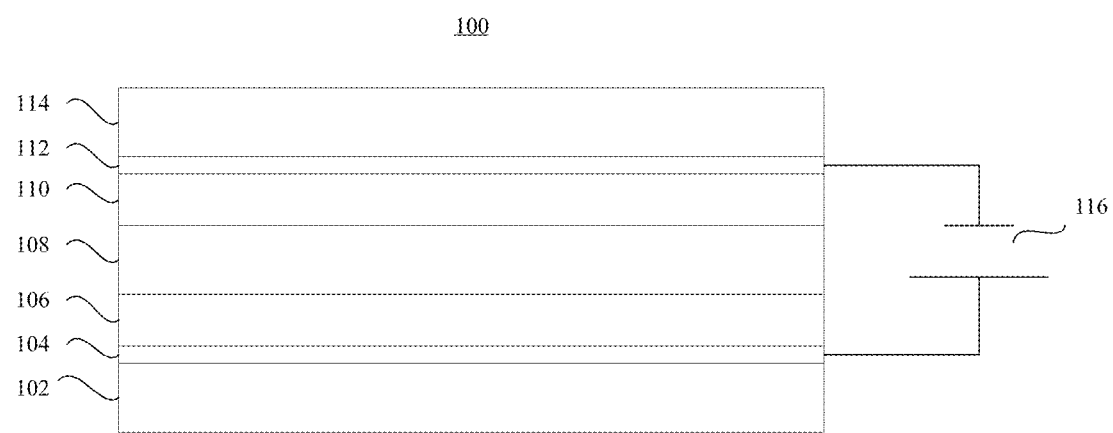
FIG. 1 is a block diagram of an electrochromic device, according to one example embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The flexible all-solid-state ECD provides a great solution to the convention approach. Due to the solid electrolyte layer, the disclosed all-solid-state ECDs can avoid bulky and complicated compartments, thus it can be very slim, light weighted and flexible to fit different shapes or curvatures. In addition, it can adopt efficient high-throughput customized manufacturing processes and realize on-line production. This disclosed pre-assembled all-solid-state ECD can be used in various applications. In this disclosure, an electrochromic sunroof based on the pre-assembled all-solid-state electrochromic thin film device and the detailed preparation processes to encapsulate this pre-assembled electrochromic thin film device into an electrochromic sunroof are disclosed.

Various embodiments described herein are directed to all solid-state ECDs that use solid-state thin films for each of the working electrode and counter electrode, which are then bonded together with a high-performance transparent solid-state electrolyte formed via in-situ photo- or thermal-cross-linking process. The all-solid-state thin-film ECDs of the present disclosure display great flexibility and can be adapted to virtually any curvature or shape without leaking concerns. Due to reduced neutral small organic molecules (for example, solvent, plasticizer, ionic liquid), ECDs of the present disclosure have more stable electrolytes and electrode interfaces, resulting in a long-life cycle compared to the liquid- or gel-based ECDs. Various embodiments described herein are also directed to an electrochromic sunroof encapsulating the above mentioned pre-assembled all solid-state ECDs and the methods to fabricate the same. The electrochromic sunroof of the present disclosure display great flexibility and can be adapted to virtually any curvature or shape without leaking concerns. The disclosed fabrication methods make the industrial production of the electrochromic sunroof more manufacturing friendly and cost efficient with improved production yield and reduced waste and defect rate.

Embodiments will now be explained with accompanying figures. Reference is first made to FIG. 1. FIG. 1 is a block diagram of an electrochromic device 100, according to one example embodiment. The electrochromic device 100 includes a first flexible substrate 102, a first transparent electrode 104 disposed on the first flexible substrate 102, an electrochromic layer 106 disposed on the first transparent electrode 104, a solid electrolyte layer 108 disposed on the electrochromic layer 106, an ion storage layer 110 disposed on the solid electrolyte layer 108, a second transparent electrode 112 disposed on the ion storage layer 110, a second flexible substrate 114 disposed on the second transparent electrode 112, and a power supply 116 connected to the first transparent electrode 104 and the second transparent electrode 112. In some embodiments, the solid electrolyte layer 108 contains less than 20%, 10%, 5%, or 3% in weight of neutral small organic molecules having a molecular weight of 3000 or less. In some embodiments, the solid electrolyte layer 108 is free of the small organic molecules that can be detected or measured by the known instruments. In some embodiments, the solid electrolyte layer 108 may contain some organic counter ions of non-monomers/non-oligomers ingredients, such as lithium salts.

For convenience, in some instance in this disclosure, the combination of the first flexible substrate 102, the first transparent electrode 104, and the electrochromic layer 106 may be referred to as a working electrode (WE), and the combination of the second flexible substrate 114, the second transparent electrode 112, and the ion storage layer 110 may be referred to as a counter electrode (CE).

In some embodiments, the first flexible substrate 102 and the second flexible substrate 114 may be transparent substrates. Example materials for the substrates 102 and 114 include polyethylene terephthalate, cyclic olefin copolymer, triacetate cellulose, or other suitable materials now-known or later-developed. The flexible substrates 102 and 114 allow the final ECDs to be bent to fit in various cases for different applications, such as rear mirrors, windows, and sunroofs for vehicles or vessels. A thickness of the first flexible substrate 102 or the second flexible substrate 114 may be 10 to 1000 μm.

In some embodiments, the first transparent electrode 104 and the second transparent electrode 112 may be thin film materials. Example materials for the transparent electrodes 104 and 112 may include indium-tin oxide (ITO), aluminum zinc oxide (AZO), fluorine doped tin oxide (FTO), silver nanowires, graphene, carbon nanotube, metal mesh based transparent conductive electrodes, silver-nanoparticle ink for reflective device, or other suitable materials now-known or later-developed. A thickness of the first transparent electrode 104 or the second transparent electrode 112 may be 1 to 800 nm.

In some embodiments, the ion storage layer 110 may include oxides of the metal elements in Group 4-12 that are capable to store cations during the reduction reaction. Examples include oxides of Ti, V, Nb, Ta, Cr, Mo, W, Mn, Fe, Co, Ir, Ni, Cu, Zn, or any mixture of these oxides or any one of these metal oxides doped by any other metal oxides, e.g., $Nb_2O_5$ doped with 5 wt. % of $TiO_2$, or other suitable materials now-known or later-developed.

In some embodiments, the ion storage layer 110 may include transition-metal complexes that can undergo reduction reactions. The example metal complexes includes, but is not limited to, Prussian green, Prussian white, Prussian brown, Tenshi blue $Fe_4[Fe(CN)_6]_3$, ferrous oxide, ferric oxide, ferroferric oxide, $KFeFe(CN)6$, FeNiHCF, FeHCF, NiHCF, Prussian blue nanoparticles, or inorganic compound of iron $NxMy\{Fe(CN)_6\}$ where M is a metal element including Fe, Co, Ni, Mn, Zn, and Cu, among others now known or later developed and N is alkali metal ion, such as Na, K, among others now known or later developed.

In some embodiments, the ion storage layer 110 may include redox-active polymers that can store cations during the reversible reduction reaction. Example redox-active polymers may include, but not limited to, redox active nitroxyl or galvinoxyl radical polymers (e.g., poly(nitronylnitroxylstyrene) and poly(galvinoxylstyrene)), and conjugated polymers (including polyaniline, PEDOT:PSS, polypyrrole, among the others now known or later developed).

In some embodiments, the ion storage layer 110 may include composites of any combinations of the transition-metal complexes, metal oxides, and redox active polymers. A thickness of the ion storage layer 110 may be 1 nm to 10 μm.

In some embodiments, the electrochromic layer 106 may include one or more materials that can be reduced/oxidized and store counterions. The electrochromic layer 106 can be composed of one or more of the following materials including $WO_3$, poly(decylviologen) and its derivatives, polyaniline and its derivatives, all kinds of electrochromic conjugated polymers such as polypyrrole and its derivatives, polythiophene and its derivatives, poly(3,4-ethylenedioxythiophene) and its derivatives, poly(propylenedioxythiophene) and its derivatives, polyfurane and its derivatives, polyfluorene and its derivatives, polycarbazole and its derivatives, and their copolymers, or their copolymers containing a certain ratio of acceptor units, such as benzothiadiazole, benzoselenadiazole, benzooxazole, benzotriazole, benzoimidazole, quinoxalines, and diketopyrrolopyrroles, and others now known or later developed. A thickness of the electrochromic layer 106 may be 1 nm to 10 μm.

In some embodiments, the solid electrolyte layer 108 has a thickness of 0.1 um to 1000 μm. In some embodiments, the solid electrolyte layer 108 can be formed from liquid materials cured by ultraviolet (UV) light or thermal exposure, changing from liquid to solid state in the curing process. The solid electrolyte layer 108 has good ionic conductivity and stability at a high temperature over 90° C. (e.g., for the defoam process and applications). Utilizing the solid electrolyte layer 108 in the ECD 100 overcomes a series of problems that liquid or gel electrolytes have such as being easy to leak, unstable, and difficult to process, and has advantages in production and process as well as safety performance.

For ECDs, the solid electrolyte is required to be transparent. Also, suitable solid electrolytes for ECDs need to be highly conductive to transfer ions between the ion storage layer and electrochromic layer. The present disclosure proposes a solid electrolyte with high transparency, decent ion conductivity (e.g., >10$^{-6}$ S/cm), and high stability.

Conventionally, solid electrolytes have been mostly developed for lithium ion batteries. These electrolytes are generally not suitable for electrochromic devices because electrochromic devices require the electrolytes to be highly transparent, which is not the case for most solid electrolytes. Over the few available examples of transparent solid electrolytes for electrochromic devices, there are generally two types. The first type is inorganic solid electrolytes, such as lithium phosphorus oxynitride (LiPON). However, the ion conductivity of LiPON is too low (e.g., 10$^{-7}$ S/cm) and LiPON can only be processed by high vacuum sputtering. The second type of solid electrolytes is composed of polymers blended with plasticizers. For examples, by blending polyethylene oxide (PEO) with succinonitrile and lithium salt, a solid electrolyte with ion conductivity as high as 10$^{-4}$ S/cm can be achieved. However, during the operation process, plasticizers in the convention solid electrolyte materials can easily penetrate into the electrochromic layers and damage the device.

The present disclosure provides, among other things, a new solution in the design of solid electrolytes in which the plasticizing moieties are covalently linked onto ion-conducting polymers to form suitable solid electrolytes for electrochromic devices. The typical ion-conducting polymers such as PEO tend to crystallize, leading to the decrease of transparency and ion conductivities. By introducing plasticizing moieties into the ion-conducting polymers, the ordered packing of the polymer chains are disturbed to suppress crystallization. Therefore, the transparency and ion conductivities of the polymers can be greatly enhanced, resulting in suitable electrolytes for ECDs. The plasticizing moieties can be small molecular groups or soft polymer chains. Since these moieties are covalently linked to the polymer chains, they do not penetrate into other layers of ECDs. The proposed polymer electrolyte can have high ion conductivity, high transparency, and good stability.

In some embodiments, the solid electrolyte layer 108 may include ion conducting polymers copolymerized with monomers or oligomers, where the monomers or oligomers have plasticizing moieties as a side chain. In some embodiments, plasticizing moieties are small molecular groups linked to the side chain of a monomer or oligomer, which can further copolymerize with ion conducting polymers into solid electrolytes. Example polymer electrolytes may include, but be not limited to:

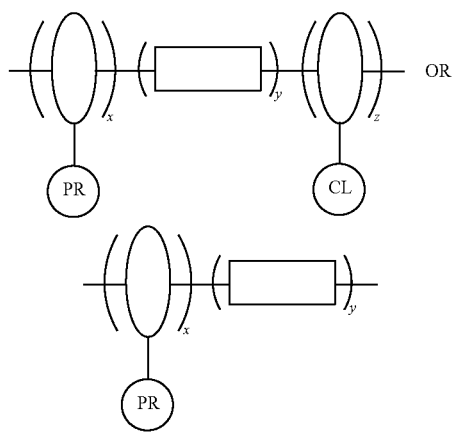

wherein each of x, y, and z is an integer greater than 0, and

In some embodiments, the connection between different parts of main chain, the connection between main chain and plasticizing groups (PR), the connection between main chain and cross-linking groups (CL) may be any type of one or several organic bonds.

Example PR groups may include, but is not limited to:

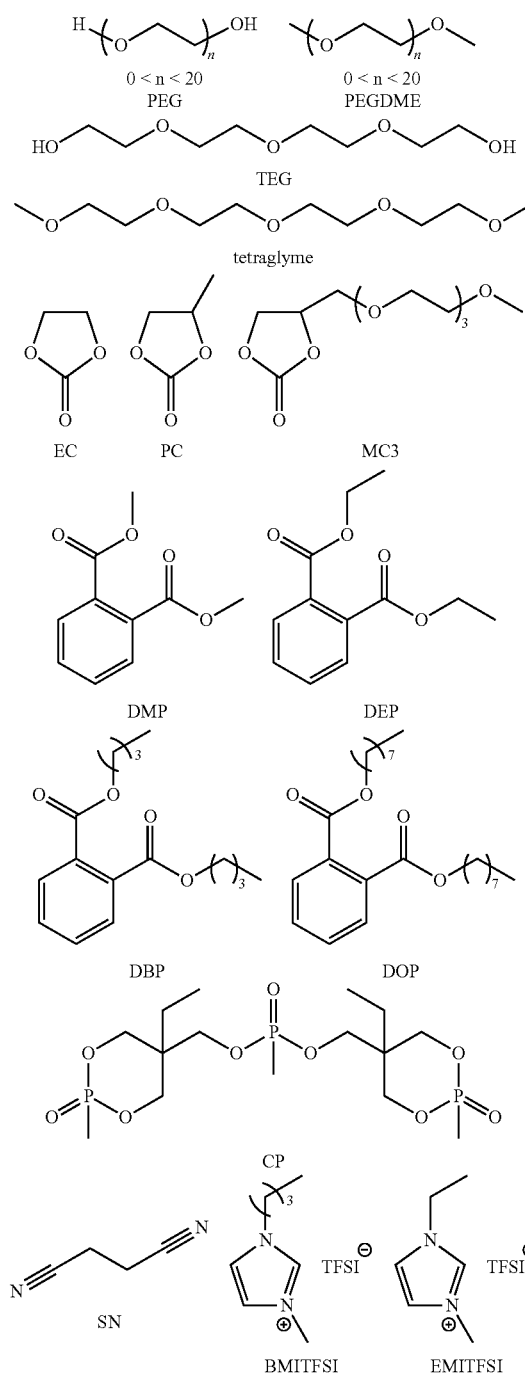

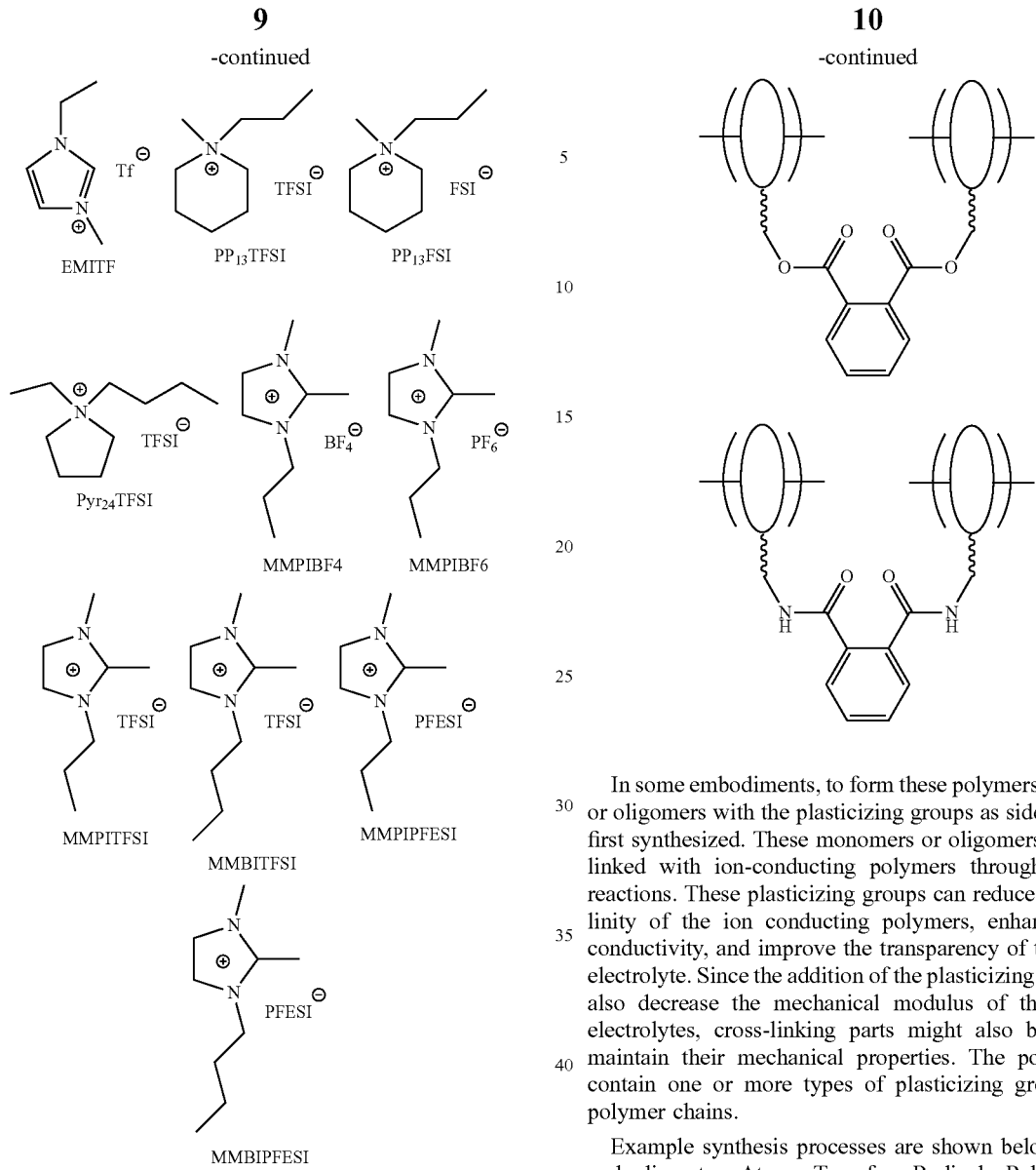

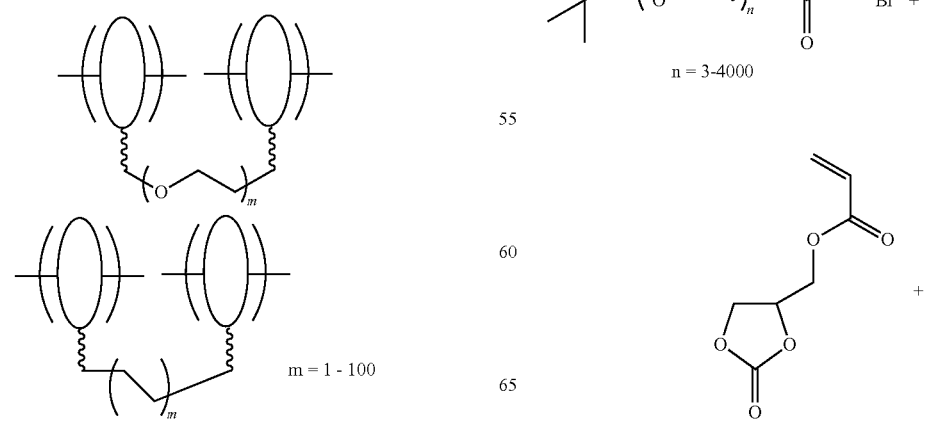

In some embodiments, to form these polymers, monomers or oligomers with the plasticizing groups as side groups are first synthesized. These monomers or oligomers are further linked with ion-conducting polymers through chain-end reactions. These plasticizing groups can reduce the crystallinity of the ion conducting polymers, enhance the ion conductivity, and improve the transparency of the polymer electrolyte. Since the addition of the plasticizing groups may also decrease the mechanical modulus of the polymers electrolytes, cross-linking parts might also be added to maintain their mechanical properties. The polymer may contain one or more types of plasticizing groups in the polymer chains.

Example synthesis processes are shown below. In some embodiments, Atom Transfer Radical Polymerization (ATRP) is employed to form the desired polymers:

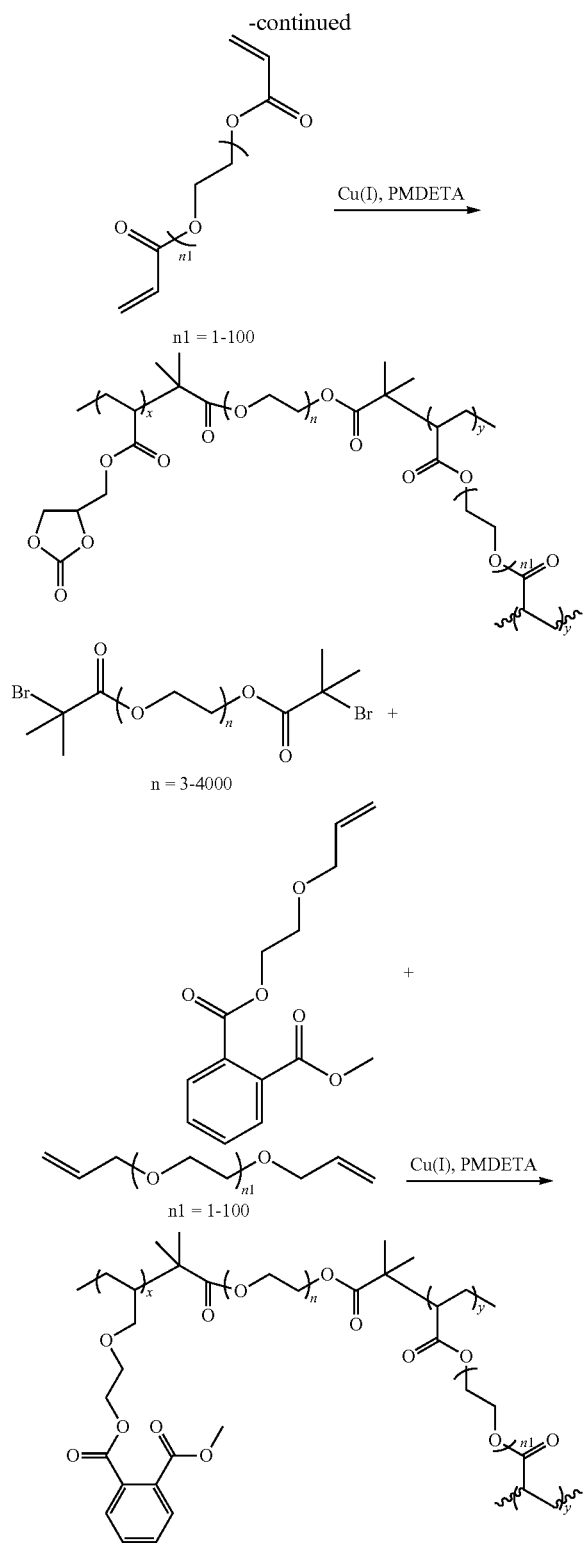
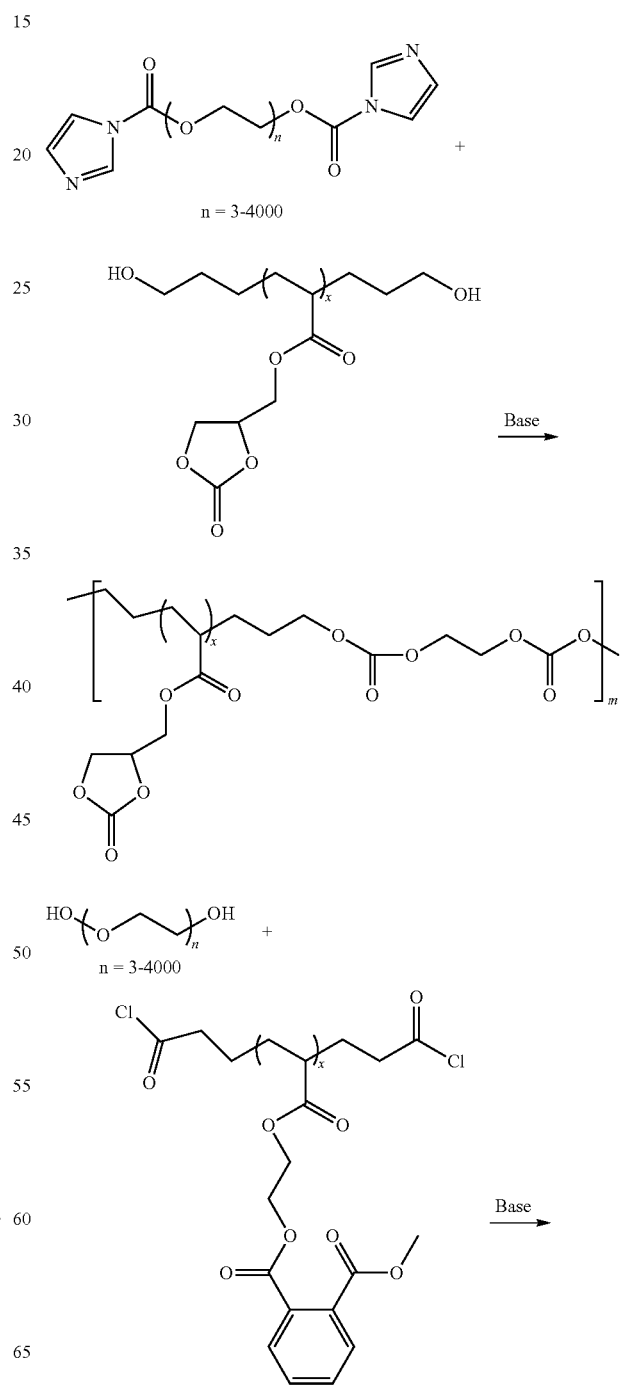

In a suitable organic solvent, solution of the mixture of end-caped PEG, carbon-carbon double bond substituted monomers with plasticizing groups, and carbon-carbon double bond substituted monomers with crosslinking groups are bubbled with nitrogen for 15 minutes. Cu(I) salt and PMDETA (N, N, N', N", N"-Pentamethyldiethylenetriamine) are then added. This solution before polymerization is referred to as electrolyte precursor solution. The reaction is protected with nitrogen and heated to 50° C.-130° C. After a 1 hour to 48 hour reaction, the reaction mixture appears sticky. An organic phase is filtered with celite and then the solvent is removed by a rotary evaporator to obtain the product (polymer electrolyte solution). The yield is 60-95%.

In some embodiments, the mixture of all the starting materials (called precursors for electrolyte or electrolyte precursor solution) before heating can also be used for device fabrication using in-situ polymerization under heating.

In some embodiments, esterification is employed to form the desired polymers:

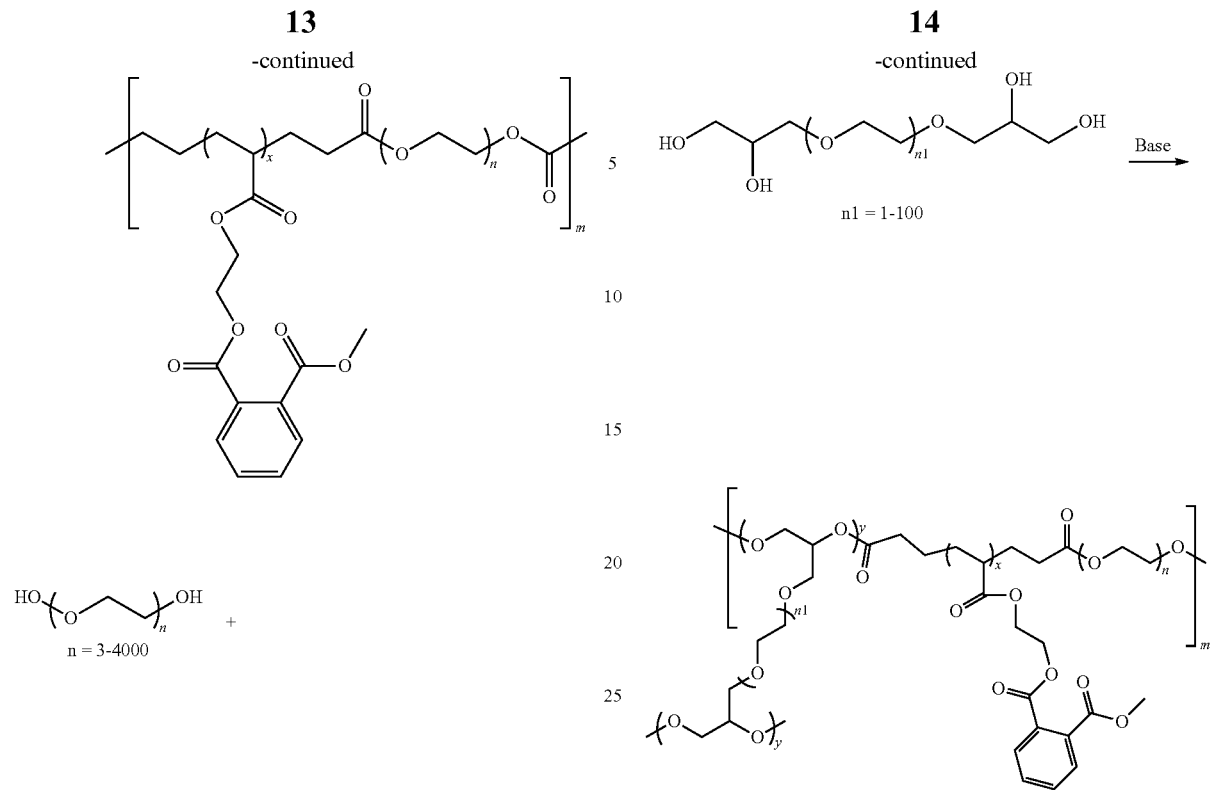

In a suitable organic solvent, solution of alcohol is added with acid chloride or active eater at −10° C. to 10° C. Base is added slowly into the mixture and the mixture is heated to 50° C. to 130° C. for the reaction. After reacting for 1 hour to 48 hours, water is added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, random copolymer is employed to form the desired polymers:

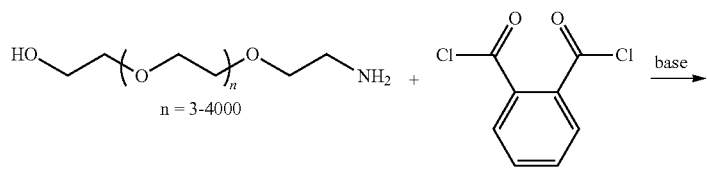

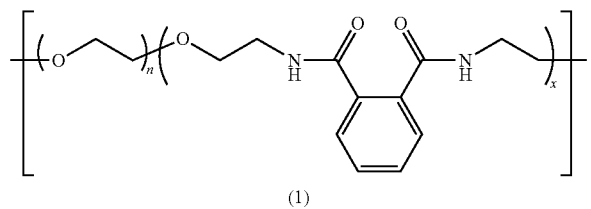

(1)

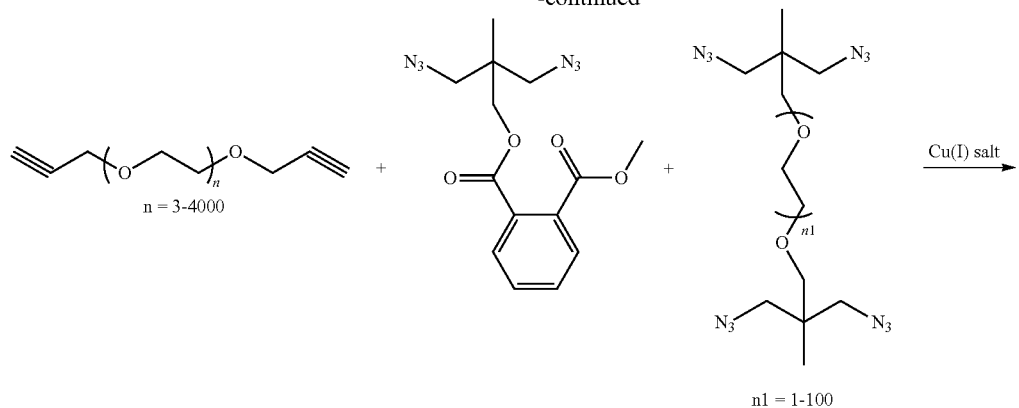
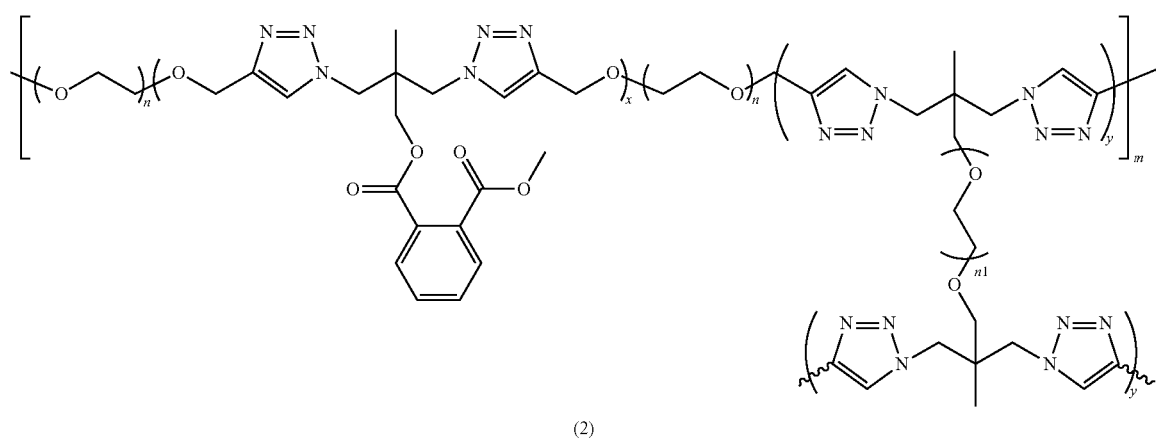
(2)
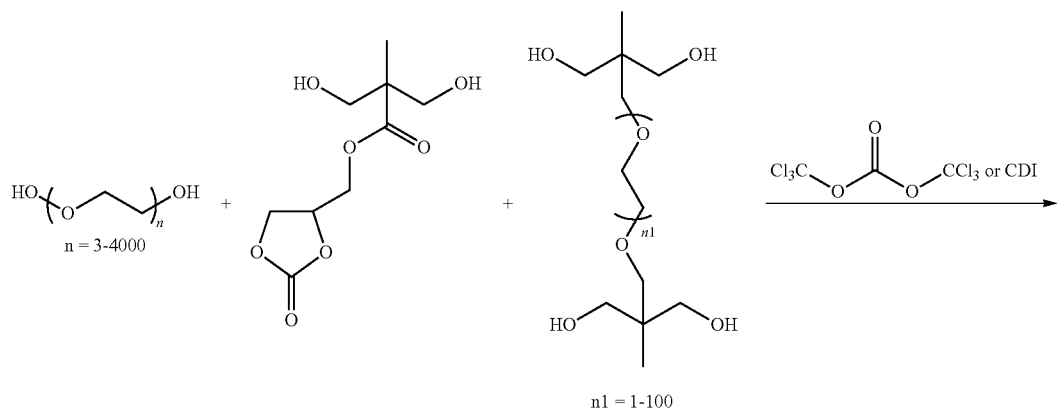
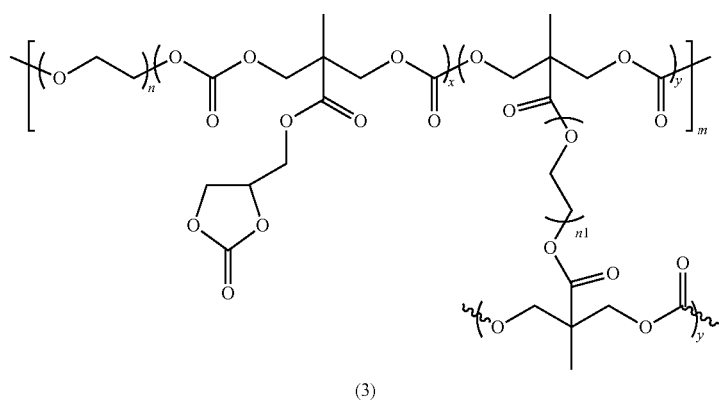
(3)

In reaction (1), in a suitable organic solvent, solution of amine is added with acid chloride at −10° C. to 10° C. Base is added slowly into the mixture, and the mixture is heated to 50° C. to 130° C. for the reaction. After reacting for 1 hour to 48 hours, water is added into the mixture. The organic phase is distilled to remove solvent and obtain the polymers. The yield is 60-95%.

In reaction (2), alkyne and azide monomer are added to a suitable organic solvent under nitrogen. Copper(I) salt is then added as catalyst. The solution is reacted at 10° C. to 130° C. for 1 hour to 48 hours. Water is added into the mixture. The organic phase is distilled to remove solvent and obtain the polymers. The yield is 60-95%.

For reaction (3), in a suitable organic solvent, solution of the alcohol monomer is added with triphosgene and base or N,N'-Carbonyldiimidazole(CDI) at −10° C. to 10° C. The mixture is stirred at 10° C. to 130° C. for 1 hour to 48 hours. Water is added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, the solid electrolyte layer 108 may include ion conducting polymers chemically linked with plasticizing linear polymers that have a glass transition temperature less than −20° C. Example linear polymers include, but are not limited to, polyethylene, polybutylene, polyisodibutylene, siloxane, etc. By linking these plasticizing linear polymers with ion conducting polymers, the ion conductivity and transparency of the polymers can also be enhanced.

Example polymer electrolytes may include, but be not limited to:

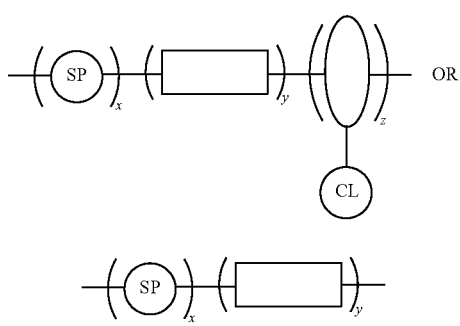

wherein each of x, y, and z is an integer greater than 0, and

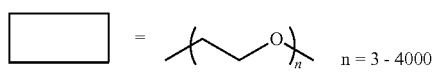

SP means soft polymers with low glass transition temperature (<−20° C.). The connection between different parts of main chain and the connection between main chain and CL can be any type of one or several organic bonds.

Cross-linking (CL) groups may include any function chemicals which can connect with two or more monomers. Example CL groups may include, but are not limited to:

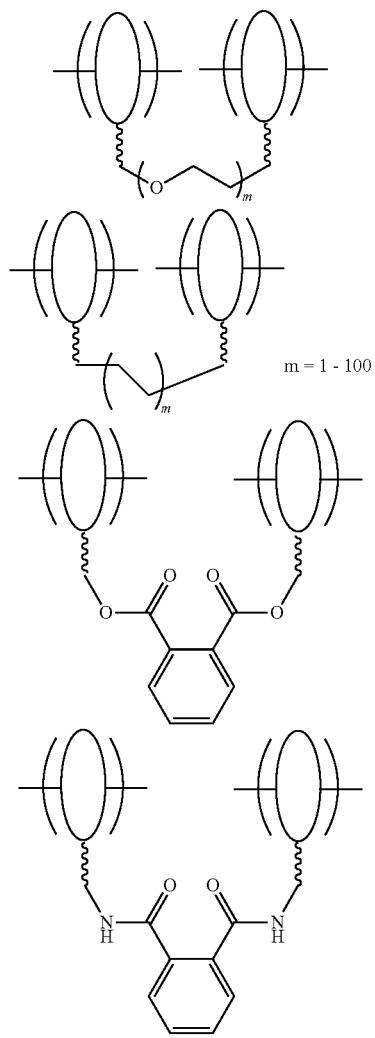

In some embodiments, suitable polymers for ECD electrolytes may be form with polyethylene, PEO, and cross-linking groups. Example reactions include, but are not limited to:

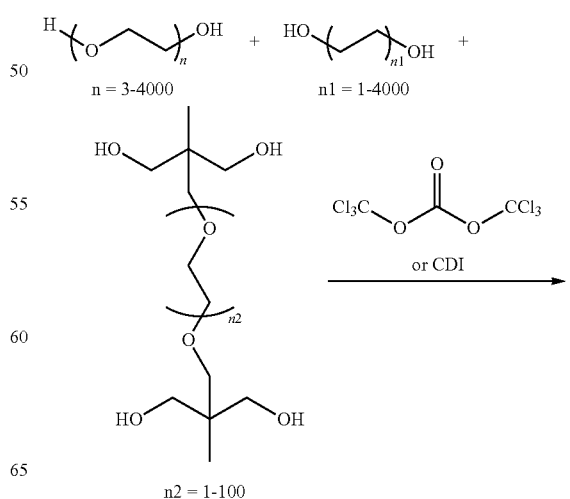

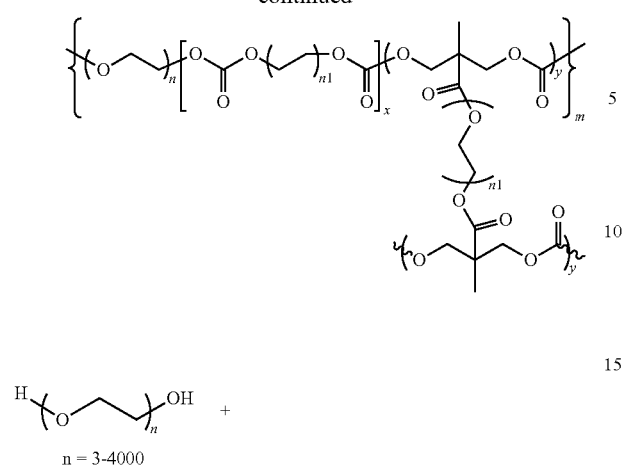

In the above reactions, in a suitable organic solvent, a solution of alcohol monomers and functionalized polyethylene is added with triphosgene and base or N,N'-Carbonyldiimidazole(CDI) at −10° C. to 10° C. The mixture is stirred at 10° C. to 130° C. for 1 hour to 48 hours. Water is added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, suitable polymers for ECD electrolytes may be form with polyisobutylene, PEO, and cross-linking groups. Example reactions include, but are not limited to:

In the above reactions, in a suitable organic solvent, a solution of alcohol monomers and functionalized polyisobutylene is added with triphosgene and base or N,N'-Carbonyldiimidazole(CDI) at −10° C. to 10° C. The mixture is stirred at 10° C. to 130° C. for 1 hour to 48 hours. Water is then added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, suitable polymers for ECD electrolytes may be formed with siloxane, PEO, and cross-linking groups. Example reactions include, but are not limited to:

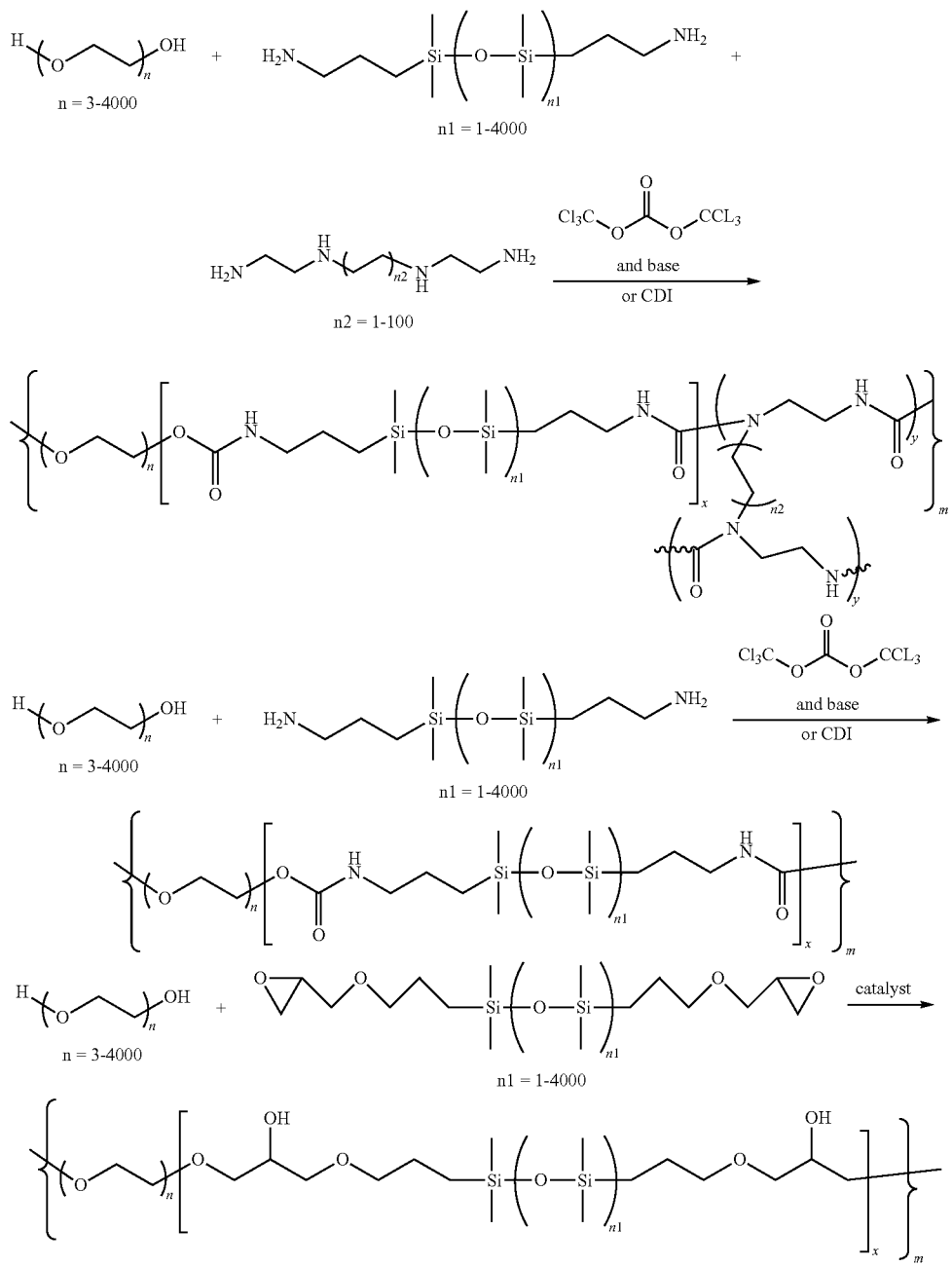

In the above reactions, in a suitable organic solvent, a solution of all starting materials and siloxane is added with triphosgene and base or N,N'-Carbonyldiimidazole(CDI) or catalyst at −10° C. to 10° C. The mixture is stirred at 10° C. to 130° C. for 1 hour to 48 hours. Water is then added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, a suitable polymer for ECD electrolytes may be formed as follows:

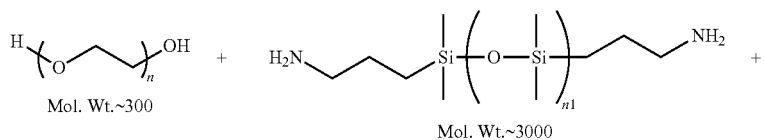

-continued

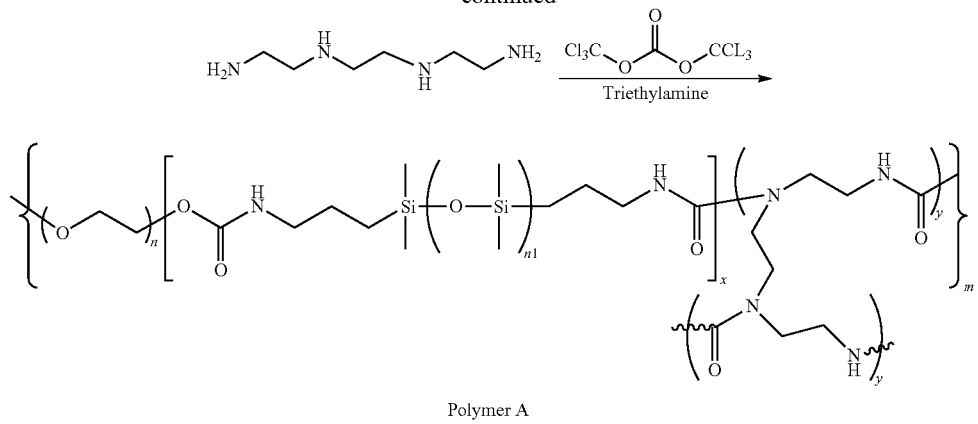

Polymer A

In this reaction, 3 g (10 mmol) of Polyethylene glycol (Mn~300), 3.0 g (1 mmol) of Poly(dimethylsiloxane) bis(3-aminopropyl) terminated (Mn~3000), triethylenetetramine 0.015 g (0.1 mmol) are added to 100 mL dichloromethane (DCM). The solution is cooled to 0° C. before triphosgene 1.13 g (3.8 mmol) is added into the solution slowly. Triethylamine 2.5 g (24.7 mmol) is added dropwisely. After stirring at 0° C. for 2 hours, the solution is warmed back to room temperature and stirred for 18 hours. DI water 100 ml is added into the mixture to wash the organic solution. The organic phase is collected and dried with $MgSO_4$ and then distilled under vacuum to remove the solvent and obtain the product (polymer A). The yield is 80-100%.

In some embodiments, a suitable polymer for ECD electrolytes may be formed as follows:

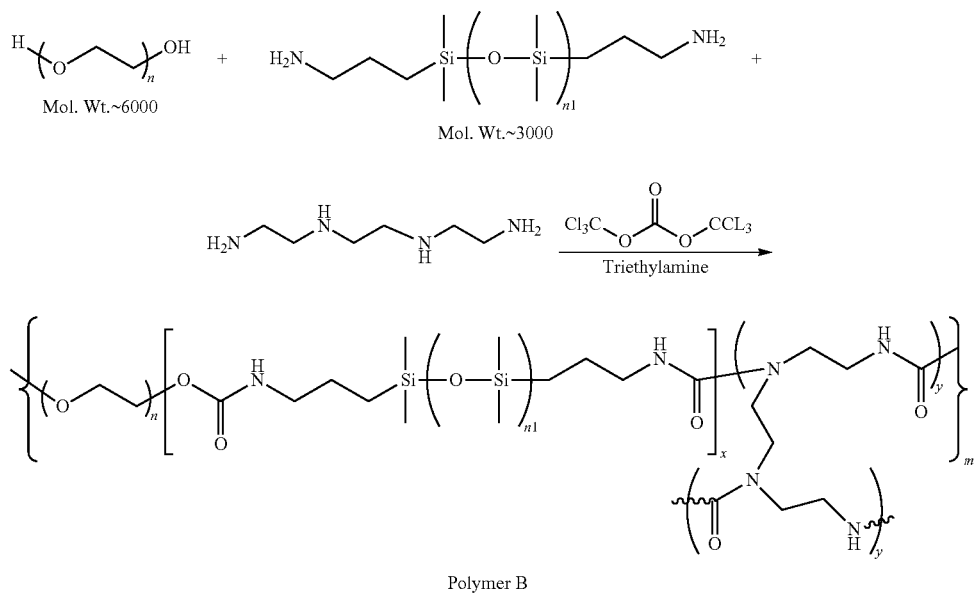

Polymer B

In this reaction, 6 g (1 mmol) of Polyethylene glycol (Mn~6000), 3.0 g (1 mmol) of Poly(dimethylsiloxane) bis (3-aminopropyl) terminated (Mn~3000), triethylenetetramine 0.015 g (0.1 mmol) are added to 100 mL dichloromethane(DCM). The solution is cooled to 0° C. before triphosgene 0.21 g (0.71 mmol) is added into the solution slowly. Triethylamine 0.47 g (4.6 mmol) is added dropwisely. After stirring at 0° C. for 2 hours, the solution is warmed back to room temperature and stirred for 18 hours. DI water 100 ml is added into the mixture to wash the organic solution. The organic phase is collected and dried with $MgSO_4$ and then distilled under vacuum to remove the solvent and obtain the product (polymer B). The yield is 80-100%.

In some embodiments, a suitable polymer for ECD electrolytes may be formed as follows:

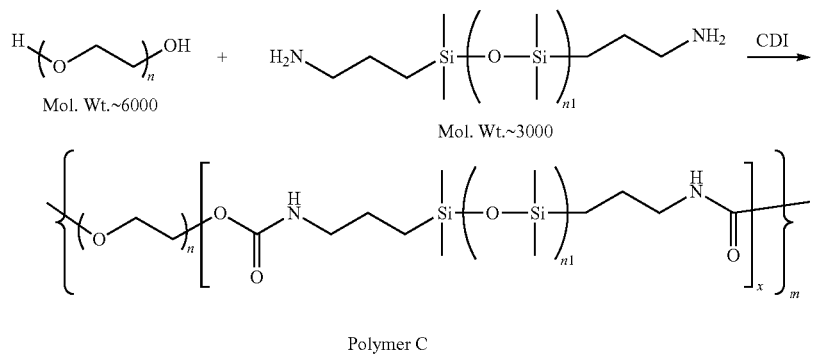

Polymer C

In this reaction, 6 g (1 mmol) of Polyethylene glycol (Mn~6000), 3.0 g (1 mmol) of Poly(dimethylsiloxane) bis (3-aminopropyl) terminated (Mn~3000) are added to 100 mL toluene. The solution is cooled to 0° C. before 0.324 g (2 mmol) N,N'-Carbonyldiimidazole(CDI) is added into the solution slowly. After stirring at 0° C. for 2 hours, the solution is heated to 60° C. and stirred for 18 hours. DI water 100 ml is added into the mixture to wash the organic solution. The organic phase is collected and dried with $MgSO_4$ and then distilled under vacuum to remove the solvent and obtain the product (polymer C). The yield is 80-100%.

In some embodiments, a suitable polymer for ECD electrolytes may be formed as follows:

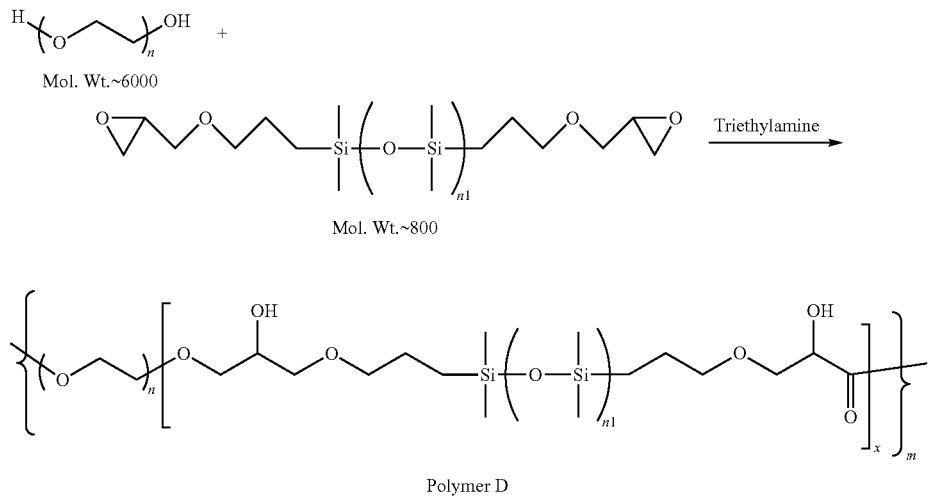

Polymer D

In this reaction, 6 g (1 mmol) of Polyethylene glycol (Mn~6000), 0.8 g (1 mmol) of Poly(dimethylsiloxane) diglycidyl ether terminated and triethylamine 0.1 g (1 mmol) are added to 100 mL toluene. The solution is heated to 110° C. for 24 hours. DI water 100 ml is added into the mixture to wash the organic solution. The organic phase is collected and dried with $MgSO_4$ and then distilled under vacuum to remove the solvent and obtain the product (polymer D). The yield is 80-100%.

In some embodiments, the solid electrolyte layer 108 may include ion conducting polymers chemically linked with plasticizing polymer blocks that have plasticizing groups as side chains.

Example polymer electrolytes may include, but are not limited to:

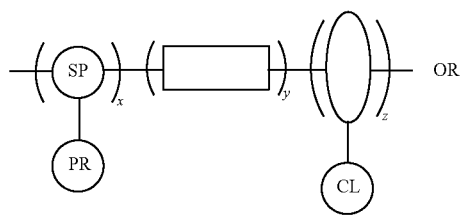

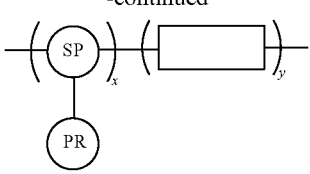

wherein each of x, y, and z is an integer greater than 0, and

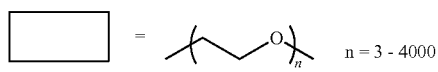

The connections between different parts of main chain, the connection between main chain SP and PR, the connection between main chain and CL can be any type of one or several organic bonds. SP are soft polymers with low glass transition temperature (<−20° C.).

Example PR groups may include, but be not limited to:

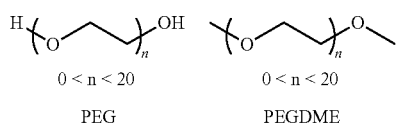

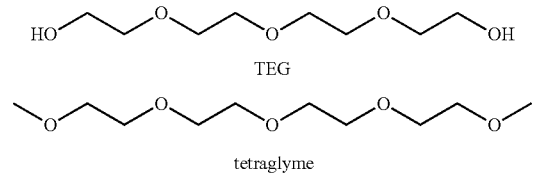

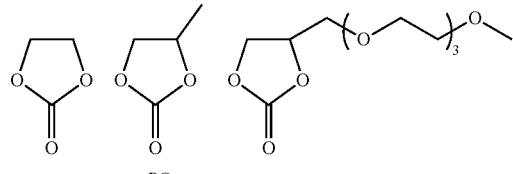

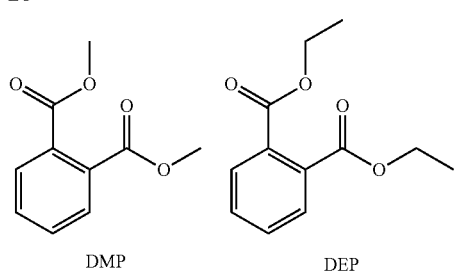

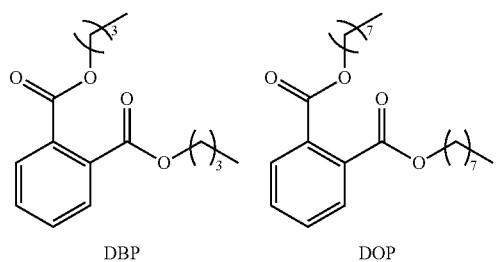

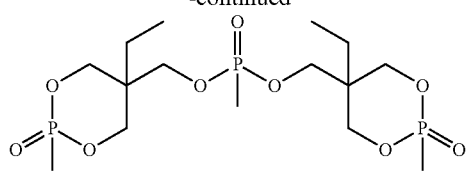

CP

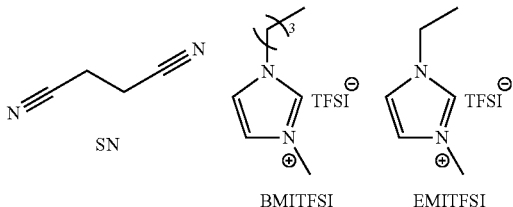

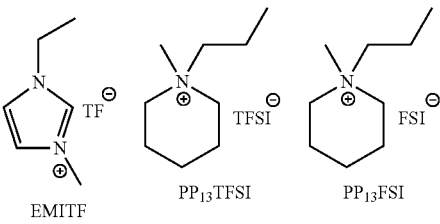

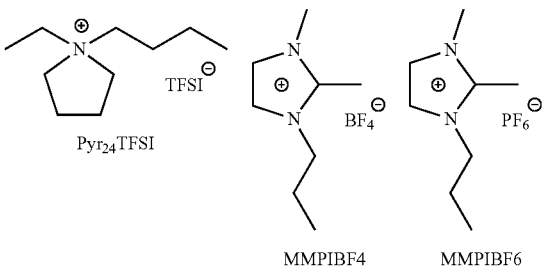

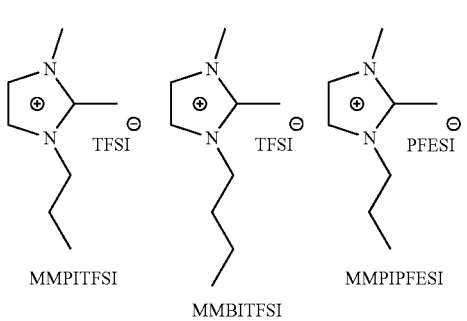

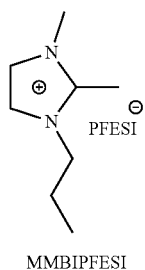

MMBIPFESI

Example CL groups may include, but be not limited to:
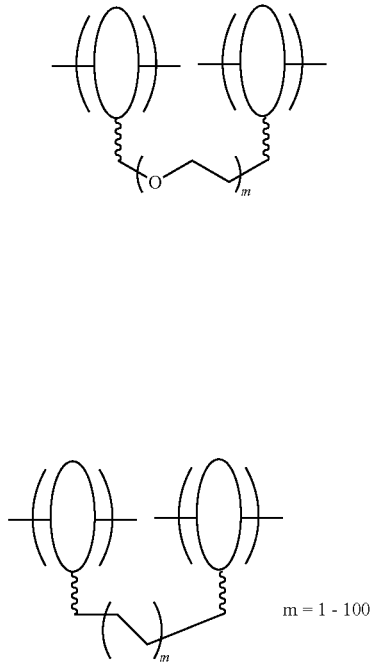
m = 1 - 100
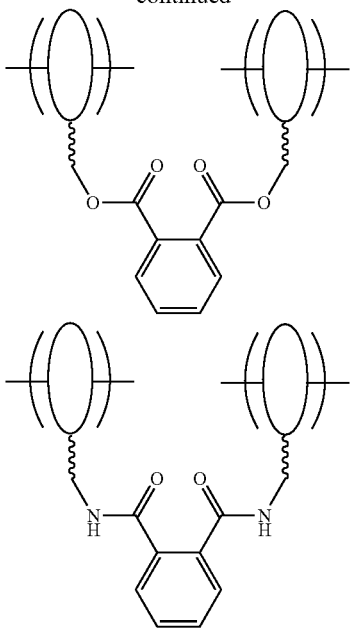
In some embodiments, suitable polymers for ECD electrolytes may be form with plasticizing groups on siloxane polymers, PEO, and cross-linking groups. Example reactions include, but are not limited to:
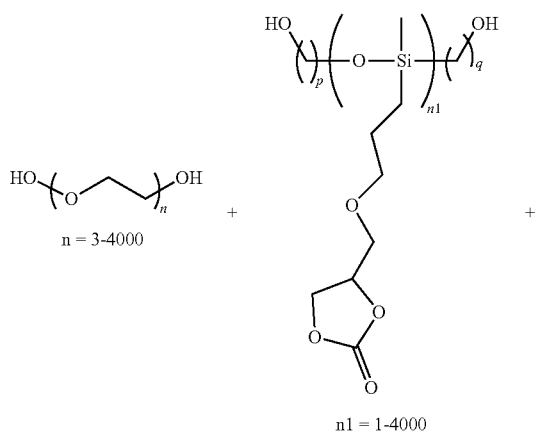
n = 3-4000
n1 = 1-4000
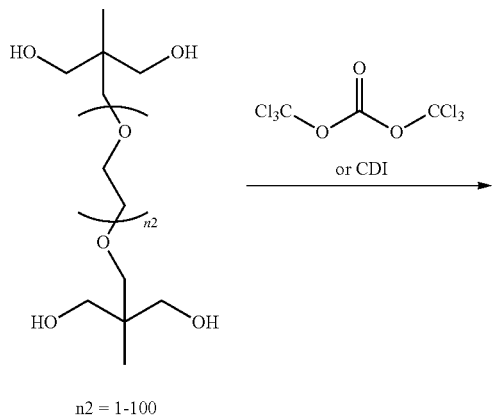
n2 = 1-100

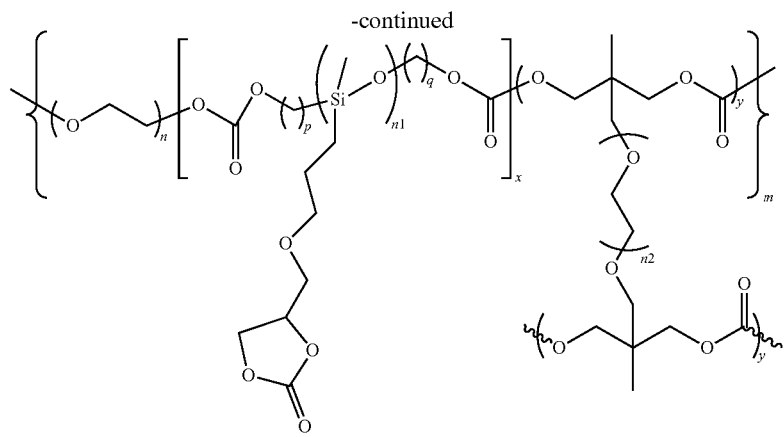

In the above reactions, in a suitable organic solvent, a solution of alcohol monomers and siloxane is added with triphosgene and base or N,N'-Carbonyldiimidazole(CDI) at −10 to 10° C. The mixture is stirred at 10° C. to 130° C. for 1 hour to 48 hours. Water is then added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, the solid electrolyte layer 108 may include brush copolymers having a main chain of soft polymers and side chains of ion-conducting species and one or more non-miscible groups. Different from linear type polymers, brush-type polymers are very hard to form dense packing because of the bulky sidechains. Therefore, new designs of brush-type polymers are proposed to avoid crystalline regions and form amorphous structure to achieve fully transparent solid electrolytes.

In some embodiments, to ensure the amorphous structures for brush-type polymers, the polymer main chains are consisted of relatively soft polymer chains that can freely rotate. Examples of soft polymer chains include siloxane chains, ethylene chains, acrylate chains, methyl acrylate chains, and combinations of two or more types of the above materials. In some embodiments, in addition to ion-conducting species, one or more non-miscible groups can be additionally introduced into the polymer side chains to disrupt the packing of the polymer chains. The non-miscible groups may be, for example, alkyl chains, aromatic groups, or any groups that are not miscible with the ion conducting groups. If the brush polymer is in a liquid state or has a low mechanical modulus, cross-linking groups can be added to ensure the solid state or enhance the mechanical modulus.

Example brush-type polymers having differing side chains to disturb the packing of polymer include, but are not limited to:

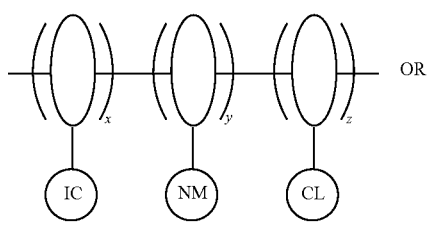

OR

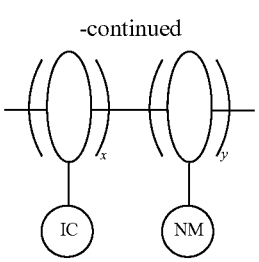

wherein each of x, y, and z is an integer greater than 0, and the main chain include, but is not limited to:

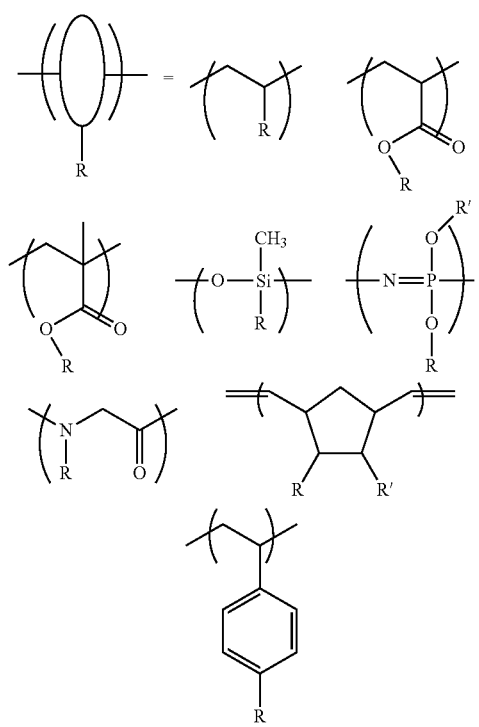

NM means non-miscible groups having structures including alkyl chains, aromatic groups, combination of alkyl and aromatic groups or any groups that are not miscible with the ion conducting groups.

IC means ionic conductivity groups that may include, but are not limited to:
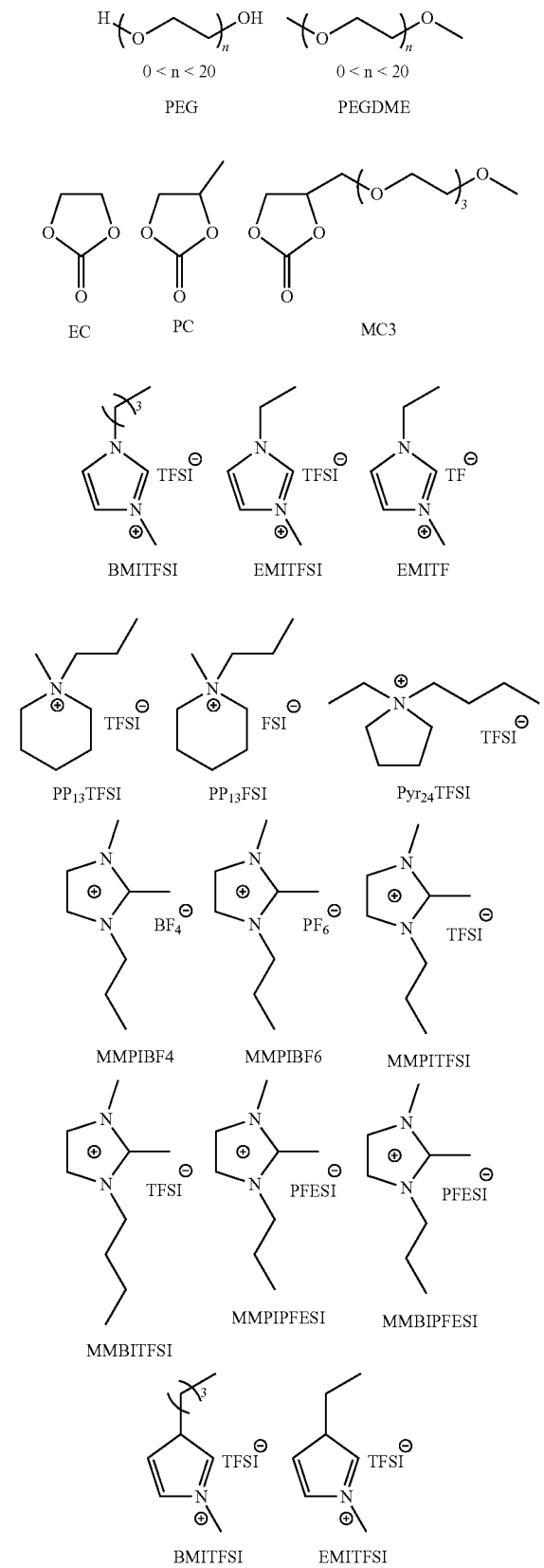
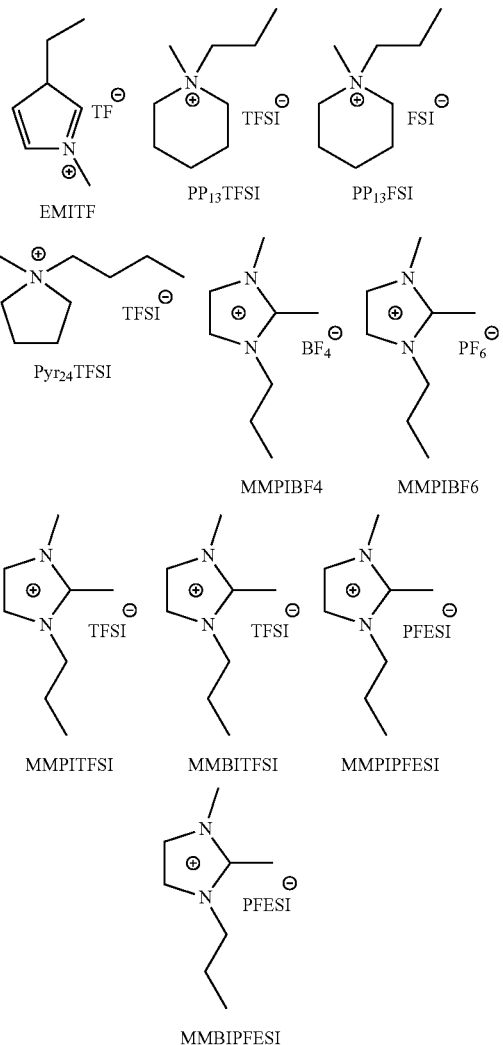
CL means Cross-linking groups including any function chemicals which can connect two or more monomers. Example CL groups may include, but be not limited to:
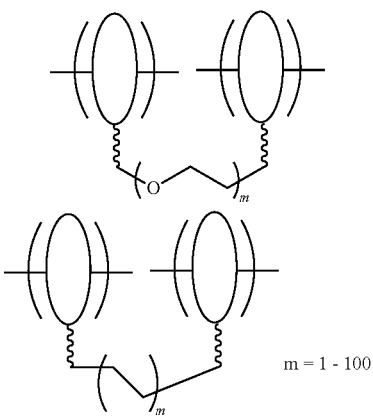
In some embodiments, the connection between different parts of main chain, the connection between main chain and IC, the connection between main chain and NM, the connection between main chain and CL can be any type of one or several organic bonds.

Two methods may be employed to form the above polymers for ECD electrolytes. The first method includes forming the main chain polymer first and then grafting the different side chains onto the main chain to obtain the desired polymers. The second method includes forming monomers or oligomers with different types of side chains and then polymerizing to obtain the desired polymers.

In an example first method, siloxane is employed as the main chain. For example, a desired polymer may be formed by the reactions including, but are not limited to:

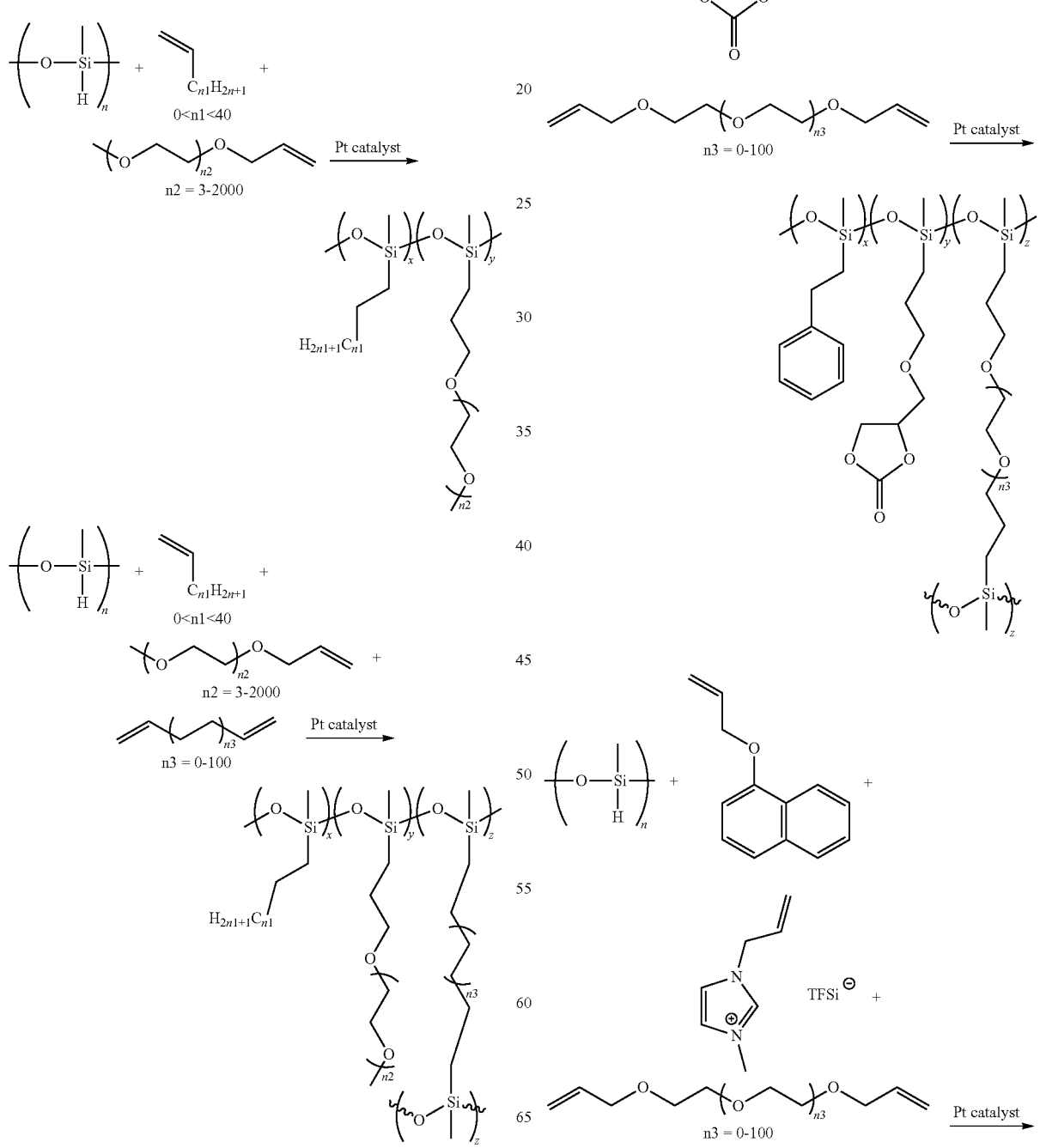

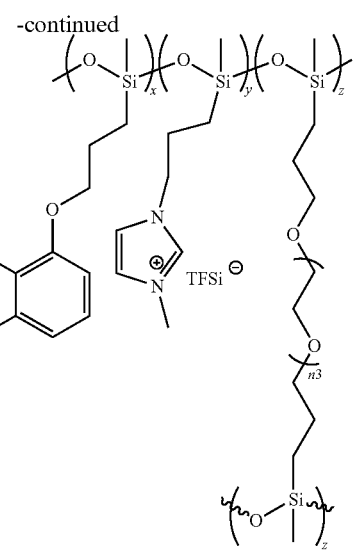

In the above reactions, in a suitable organic solvent, solution of polymethylhydrosiloxane, vinyl substituted non-miscible groups, vinyl substituted ionic conductive group, and vinyl substituted crosslink groups is bubbled with nitrogen for about 15 min. Pt as a catalyst is then added. The reaction is protected with nitrogen and heated to 40° C. to 110° C. After 1 hour to 24 hours, the reaction mixture appears sticky. The solvent of the mixture is removed with a rotary evaporator to obtain the product. The yield of the process is 60-97%.

In some embodiment, the mixture of all the starting materials (called precursors for electrolyte or electrolyte precursor solution) before heating can also be used for device fabrication using in-situ polymerization under heating.

Another example polymer for ECD electrolytes may be formed according to the following reaction:

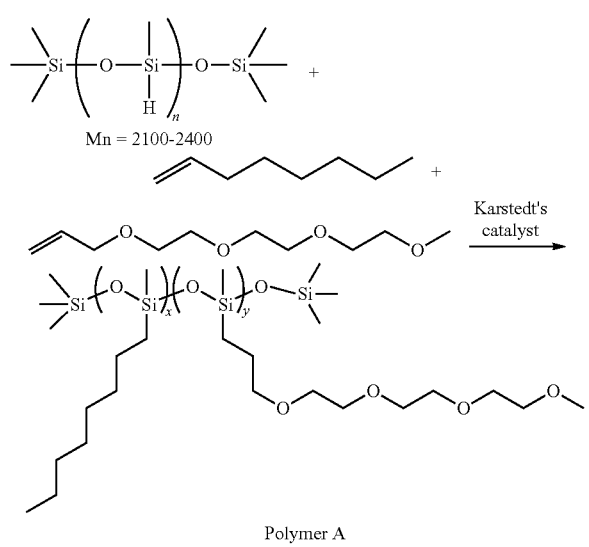

Polymer A

In this reaction, 2.3 g (~1 mmol) Poly(methylhydrosiloxane) (Mn=2100-2400), 0.56 g (5 mmol) 1-Octene, 7.14 g (35 mmol) Allyloxy(triethylene oxide) methyl ether are added to 100 ml toluene. The solution is bubbled with nitrogen for about 15 min followed by adding Karstedt's catalyst 0.4 g (0.4 mmol) under nitrogen. The reaction is protected with nitrogen and heated to 50° C. After 24 hours, the reaction mixture appears sticky. The solvent of the mixture is removed with a rotary evaporator to obtain the product (polymer A). The yield of the process is 80-100%.

Yet another example polymer for ECD electrolytes may be formed according to the following reaction:

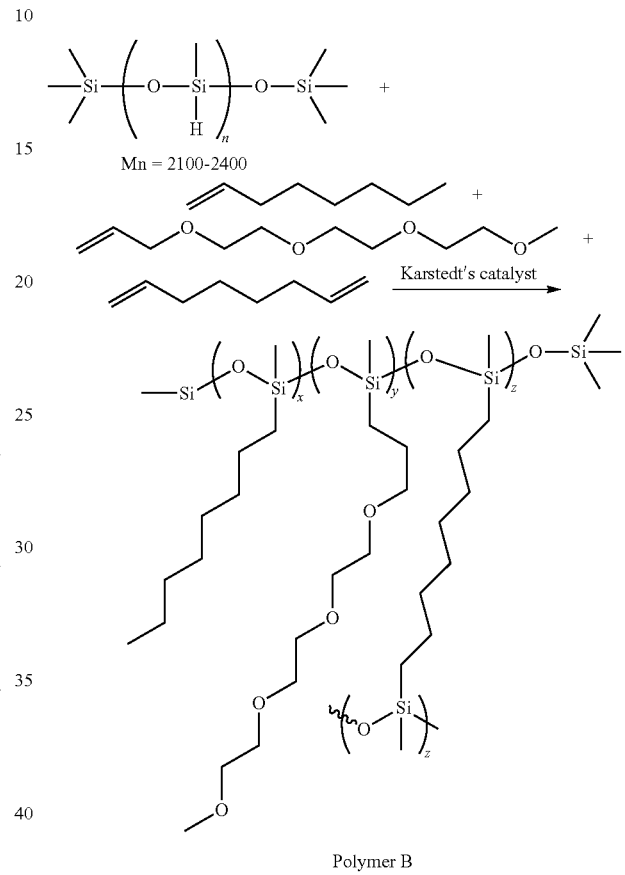

Polymer B

In this reaction, 2.3 g (~1 mmol) Poly(methylhydrosiloxane) (Mn=2100-2400), 0.56 g (5 mmol) 1-Octene, 6.73 g (33 mmol) Allyloxy(triethylene oxide) methyl ether, 0.22 g (2 mmol) 1,7-Octadiene are added to 100 ml toluene. The solution is bubbled with nitrogen for about 15 min followed by adding Karstedt's catalyst 0.4 g (0.4 mmol) therein under nitrogen. The reaction is protected with nitrogen and heated to 50° C. After 24 hours, the reaction mixture appears sticky. The solvent of the mixture is removed with a rotary evaporator to obtain the product (polymer B). The yield of the process is 80-100%.

Another example polymer for ECD electrolytes may be formed according to the following reaction:

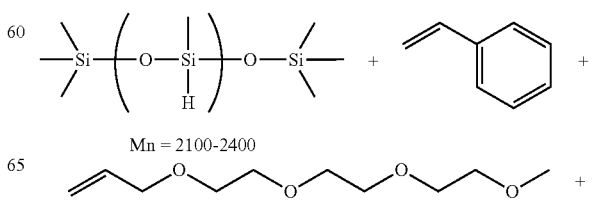

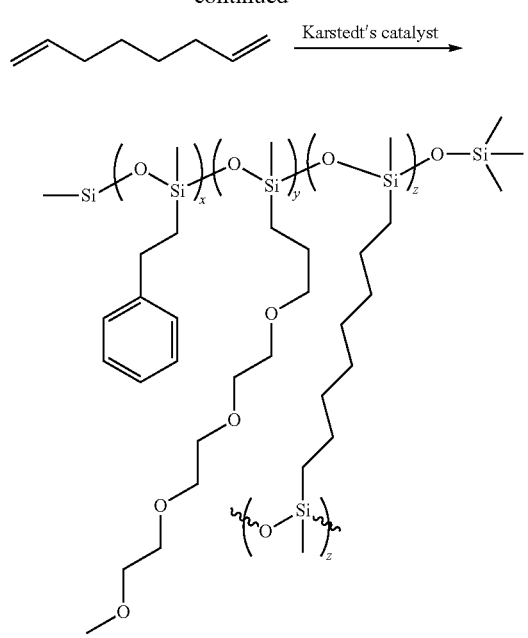

Polymer C

In this reaction, 2.3 g (~1 mmol) Poly(methylhydrosiloxane) (Mn=2100–2400), 0.52 g (5 mmol) Styrene, 6.73 g (33 mmol) Allyloxy(triethylene oxide) methyl ether, 0.22 g (2 mmol) 1,7-Octadiene are added to 100 ml toluene. The solution is bubbled with nitrogen for about 15 min. before Karstedt's catalyst 0.4 g (0.4 mmol) is added therein under nitrogen. The reaction is protected with nitrogen and heated to 50° C. After 24 hours, the reaction mixture appears sticky. The solvent of the mixture is removed with a rotary evaporator to obtain the product (polymer C). The yield of the process is 80-100%.

In another example first method, 1,2-polybutadiene is employed as the main chain. For example, a desired polymer may be formed by the reactions including, but not limited to:

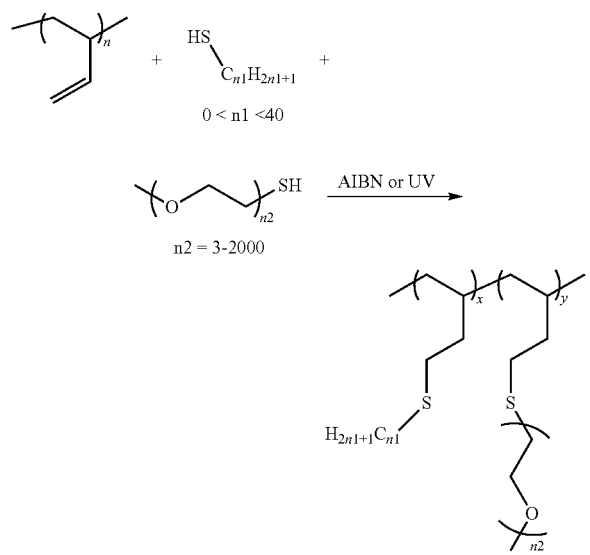

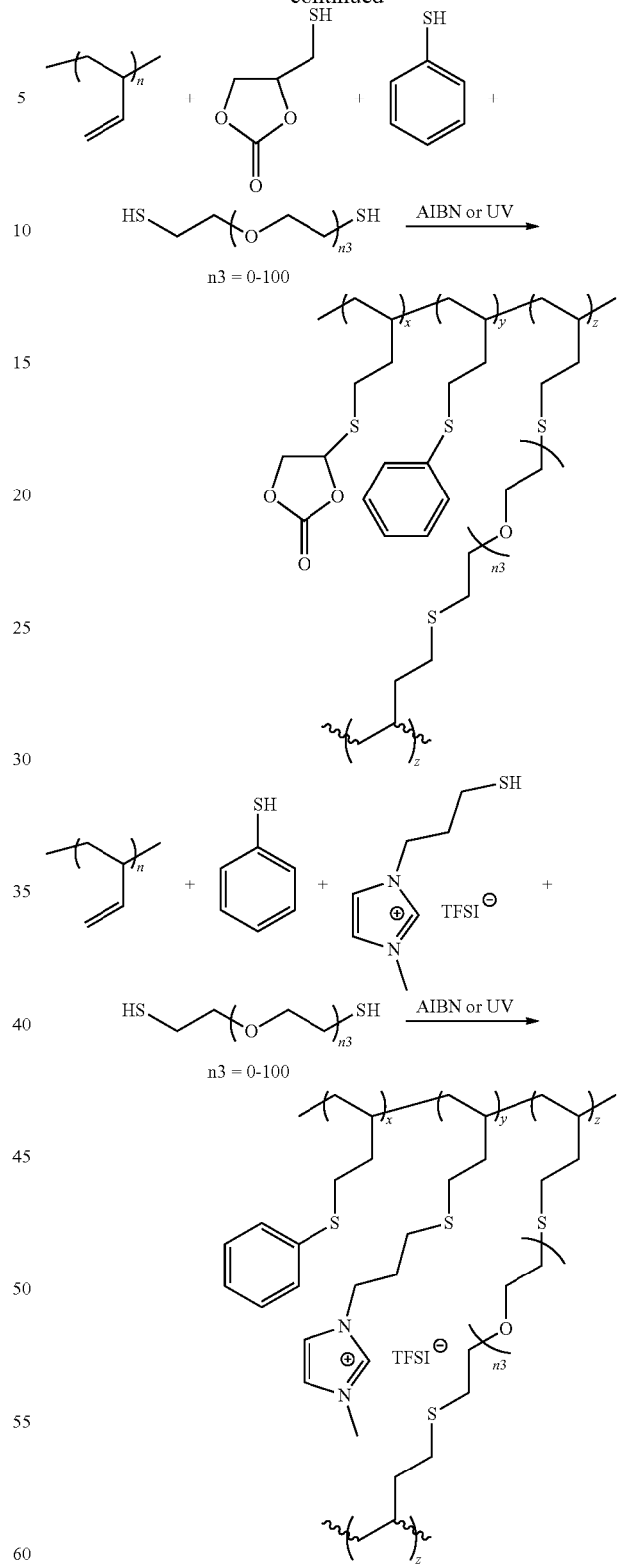

Condition 1: Polymerization by heating. 1,2-polybutadiene, with or without a radical initiator, thiol substituted non-miscible groups, a thiol substituted ionic conductive group, and a thiol substituted crosslink group are mixed in a suitable organic solvent solution or a no-solvent condition.

The mixture is heated at 40° C. to 110° C. for 10 minutes to 24 hours, resulting in a sticky solution or solid. The synthesized sticky solution or solid can be used the target polymer electrolyte, which can be coated on a working electrode or a counter electrode to form a solid electrolyte film.

In some embodiments, the mixture of all the starting materials (called "precursors" for the electrolyte or electrolyte precursor solution) before polymerization can also be used for device fabrication using in-situ polymerization under heating.

Condition 2: Polymerization by UV light. 1,2-Polybutadiene, with or without a radical initiator, thiol substitute non-miscible groups, a thiol substituted ionic conductive group, and a thiol substituted crosslink group are mixed in a suitable organic solvent solution or a no-solvent condition. The mixture is exposed to UV light for 2 minutes to 150 minutes, resulting in a sticky solution or solid. The synthesized sticky solution or solid can be used as the target polymer electrolyte, which can be coated on a working electrode or a counter electrode to form a solid electrolyte film.

In some embodiments, the mixture of all the starting materials (called "precursors" for the electrolyte or electrolyte precursor solution) before polymerization can also be directly used for device fabrication using in-situ polymerization under UV light.

Example radical initiators include, but are not limited to: tert-Amyl peroxybenzoate, 4,4-Azobis(4-cyanovaleric acid), 1,1'-Azobis(cyclohexanecarbonitrile), 2,2'-Azobisisobutyronitrile, Benzoyl peroxide2, 2,2-Bis(tert-butylperoxy)butane, 1,1-Bis(tert-butylperoxy)cyclohexane, 2,5-Bis(tert-butylperoxy)-2,5-dimethylhexane, 2,5-Bis(tert-Butylperoxy)-2,5-dimethyl-3-hexyne, Bis(1-(tert-butylperoxy)-1-methylethyl)benzene, 1,1-Bis(tert-butylperoxy)-3,3,5-trimethylcyclo-hexane, tert-Butyl hydroperoxide, tert-Butyl peracetate, tert-Butyl peroxide, tert-Butyl peroxybenzoate, tert-Butylperoxy isopropyl carbonate, Cumene hydroperoxide, Cyclohexanone peroxide, Dicumyl peroxide, Lauroyl peroxide, 2,4-Pentanedione peroxide, Peracetic acid, and Potassium persulfate.

In an example second method, monomers with different type of side chains are formed and then polymerized to obtain the desired polymer. For example, a desired polymer may be formed by the reactions including:

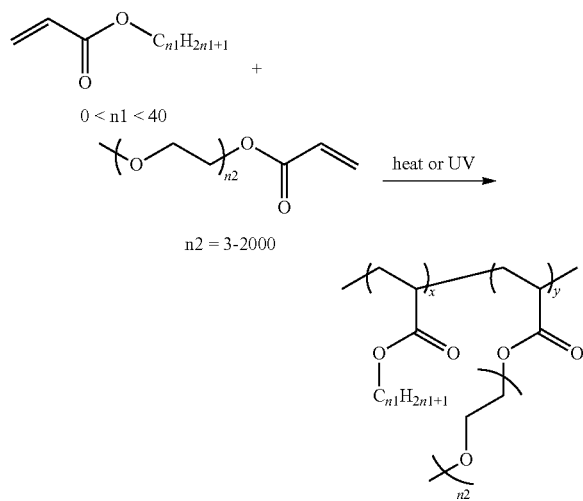

Condition 1: Polymerization by heating. a monomer with non-miscible groups, a monomer with ionic conductive group, and a monomer with crosslinking group, with or without a radical initiator are mixed in a suitable organic solvent solution or a no-solvent condition. The mixture is heated to 40° C. to 110° C. for 10 minutes to 24 hours, resulting in a sticky solution or solid. The synthesized sticky solution or solid can be used as the target polymer electrolyte, which can be coated on a working electrode or a counter electrode to form a solid electrolyte film.

In some embodiments, the mixture of all the starting materials (called "precursors" for the electrolyte or electrolyte precursor solution) before polymerization can also be directly used for device fabrication using in-situ polymerization under heating.

Condition 2: Polymerization by UV light. a monomer with non-miscible groups, a monomer with ionic conductive group, and a monomer with crosslinking group, with or without a radical initiator are mixed in a suitable organic solvent solution or a no-solution condition. The mixture is exposed to UV light for 2 minutes to 150 minutes, resulting in a sticky solution or solid. The synthesized sticky solution or solid can be used as the target polymer electrolyte, which can be coated on a working electrode or a counter electrode to form a solid electrolyte film.

In some embodiments, the mixture of all the starting materials (called "precursors" for the electrolyte or electrolyte precursor solution) before polymerization can also be used for device fabrication using in-situ polymerization under UV light.

Example radical initiators include, but are not limited to: tert-Amyl peroxybenzoate, 4,4-Azobis(4-cyanovaleric acid), 1,1'-Azobis(cyclohexanecarbonitrile), 2,2'-Azobisisobutyronitrile, Benzoyl peroxide2, 2,2-Bis(tert-butylperoxy)butane, 1,1-Bis(tert-butylperoxy)cyclohexane, 2,5-Bis(tert-butylperoxy)-2,5-dimethylhexane, 2,5-Bis(tert-Butyl-peroxy)-2,5-dimethyl-3-hexyne, Bis(1-(tert-butylperoxy)-1-methyl-ethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, Cumene hydroperoxide, Cyclohexanone peroxide, Dicumyl peroxide, Lauroyl peroxide, 2,4-Pentanedione peroxide, Peracetic acid, and Potassium persulfate.

In some embodiments, a desired polymer may be formed by the reactions including, but not limited to:

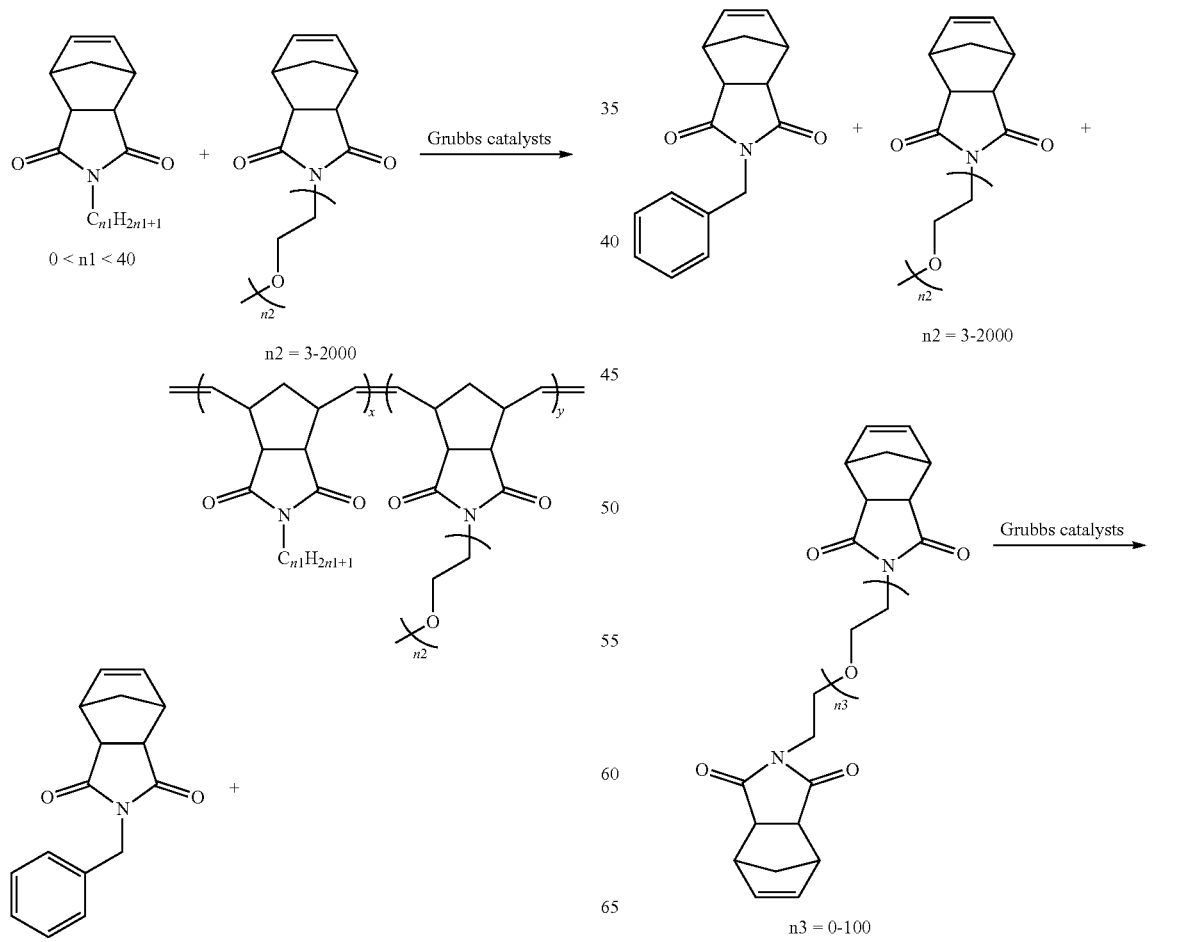

-continued

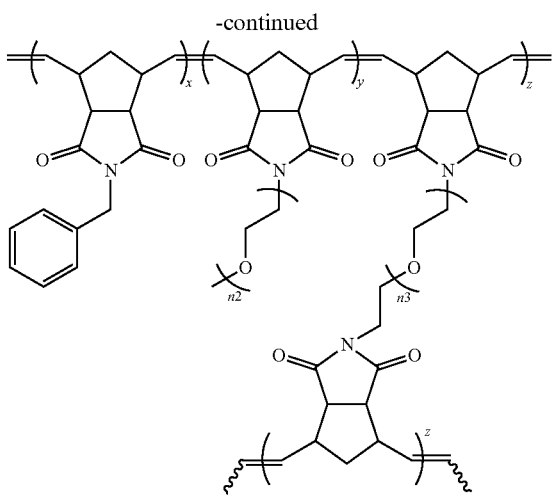

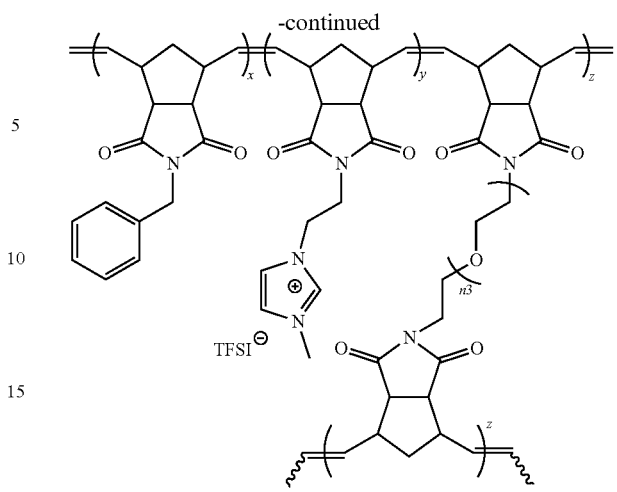

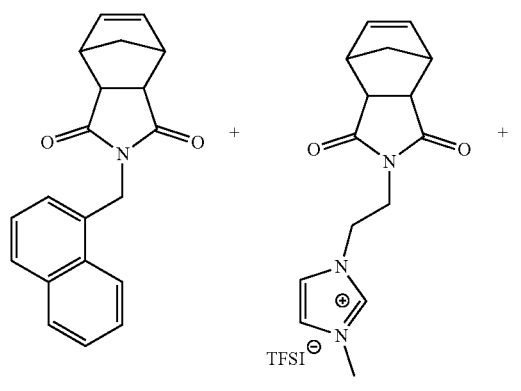

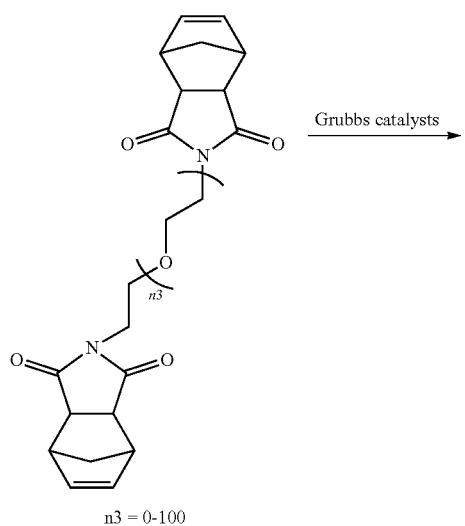

n3 = 0-100

In these reactions, in a suitable organic solvent, a solution of norbornene monomer with non-miscible groups, a norbornene monomer with ionic conductive group, and a norbornene monomer with crosslinking groups is bubbled with nitrogen for 15 min. Grubbs catalyst is then added therein. The reaction is protected with nitrogen and heated to 40° C. to 110° C. After 10 minutes to 24 hours, the reaction mixture appears sticky. The solvent of the mixture is removed with a rotary evaporator to obtain the product. The yield of the process is 60-97%.

In some embodiments, the mixture of all the starting materials (called precursors for electrolyte or electrolyte precursor solution) before heating can also be used for device fabrication using in-situ polymerization under heating.

In some embodiments, before being processed into a solid electrolyte thin film for an electrochromic device, any one or more of the above polymer electrolytes or electrolyte precursors (e.g., the mixture of all of the monomers or oligomers with or without one or more radical initiators, with or without catalyst before polymerization) may be blended with one or more types of organic or inorganic salts. Example inorganic salts include Li+, Na+, K+, Mg2+, Ca2+, Al3+ based salts, and others now known or later developed. Example organic salts include ionic liquids such as EMITFSI, EMIOTF, and others now known or later developed.

In some embodiments, before blending with any one or more of the example salts, any one or more of the polymer electrolytes disclosed herein may be dissolved in one or more appropriate solvents. The solvent(s) can help blend the polymers and salt(s) well, and can be removed by evaporation after being coated into films. The polymer electrolyte solution can be coated into films using any one of a variety of conventional solution-compatible coating strategies, including, but not limited to, spray coating, spin coating, slot-die coating, slit coating, roll-to-roll coating, transfer coating, and wire bar coating.

Figure 2:
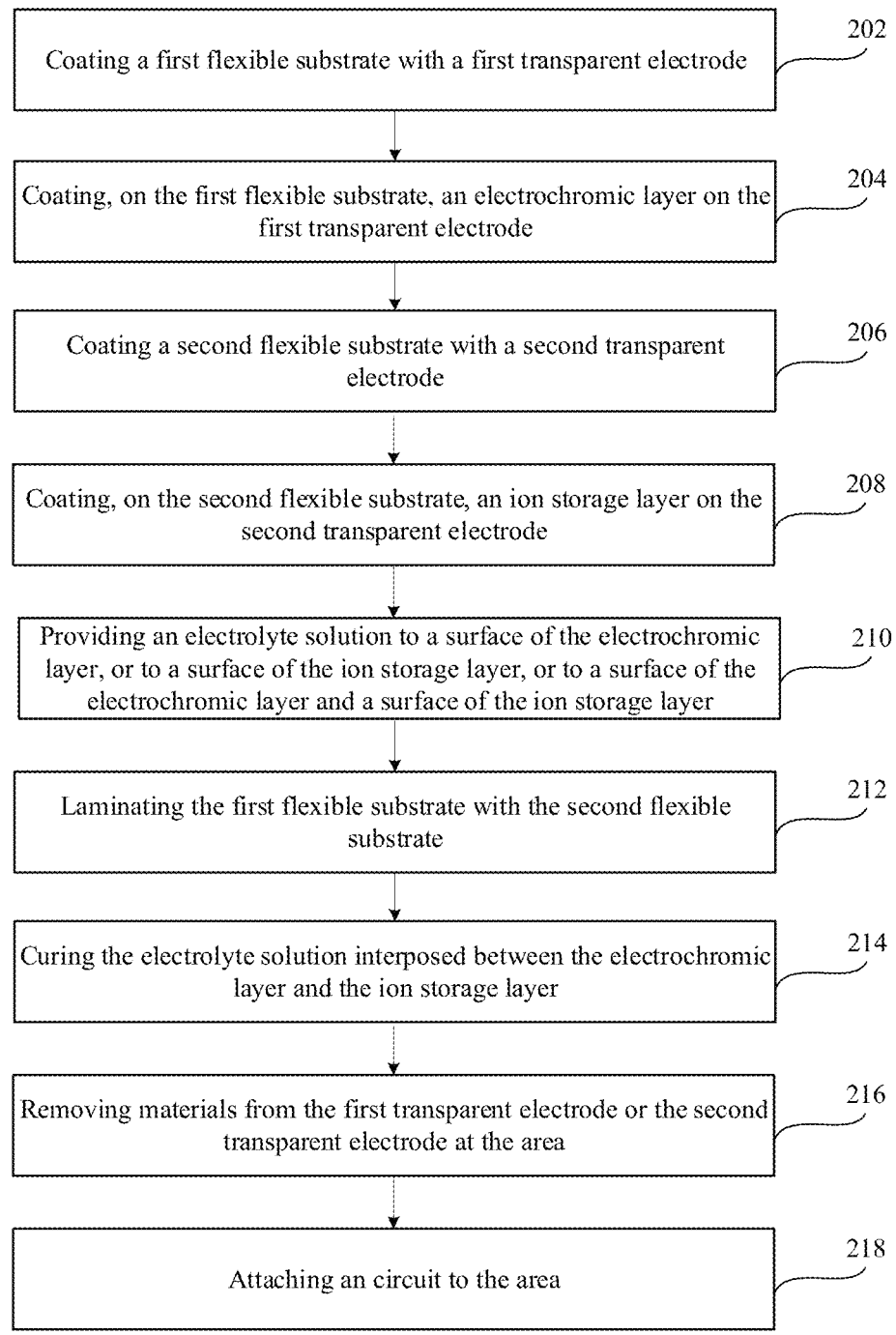
FIG. 2 is a flow chart illustrating a method for forming an electrochromic device, according to one example embodiment.

Reference is now made to FIG. 2. FIG. 2 is a flow chart illustrating a method 200 for forming an electrochromic device, according to one example embodiment. At 202, a first flexible substrate is coated with a first transparent electrode. The first transparent electrode may include, but is not limited to, indium-tin oxide (ITO), aluminum zinc oxide (AZO), fluorine doped tin oxide (FTO), silver nanowires, graphene, carbon nanotube, metal mesh based transparent conductive electrodes, or silver-nanoparticle ink. The first transparent electrode may be coated/deposited using physical or chemical vapor deposition methods, such as sputtering. At 204, on the first flexible substrate, an electrochromic layer is coated on the first transparent electrode. At 206, a second flexible substrate is coated with a second transparent electrode. The second transparent electrode may include, but is not limited to, indium-tin oxide (ITO), aluminum zinc oxide (AZO), fluorine doped tin oxide (FTO), silver nanowires, graphene, carbon nanotube, metal mesh based transparent conductive electrodes, or silver-nanoparticle ink. The second transparent electrode may be coated/deposited using physical or chemical vapor deposition methods, such as sputtering. At 208, on the second flexible substrate, an ion storage layer is coated on the second transparent electrode.

At 210, a polymer electrolyte solution or an electrolyte precursor solution is provided onto a surface of the electrochromic layer, or onto a surface of the ion storage layer, or onto a surface of the electrochromic layer and a surface of the ion storage layer, or onto the gap between a surface of the electrochromic layer and a surface of the ion storage layer. At 212, the first flexible substrate is laminated with the second flexible substrate such that an area of one of the substrates is not covered by another one of the substrates and such that the electrolyte solution is interposed between the electrochromic layer and the ion storage layer.

Figure 3A:
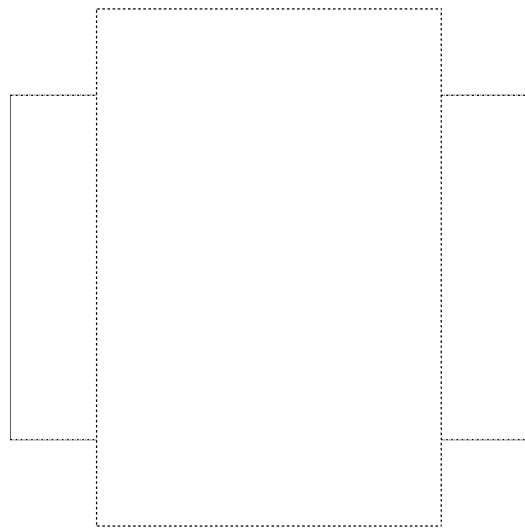
FIGS. 3A and 3B illustrate two lamination configurations in which an area of one of the substrates is not covered by another one of the substrates, according to example embodiments.
Figure 3B:

For example, one or both of the first flexible substrate (WE) and the second flexible substrate (CE) as prepared by the above operations is/are laid flat on a flat surface such as a marble plate, glass or the like. The polymer electrolyte solution or electrolyte monomer/oligomer solution (the precursor for a solid electrolyte) is applied to the first flexible substrate and/or the second flexible substrate by any one of a variety of solution-compatible coating strategies, including spray coating, spin coating, slot-die coating, slit coating, roll-to-roll coating, micro concave coating, screen printing, transfer coating, wire bar coating, etc. After the electrolyte solution is uniformly spread on one or both of the substrates, the substrates are laminated with each other. Suitable film lamination methods that may be used include, but are not limited to, cross cover, misalignment cover, and complete cover. FIGS. 3A and 3B illustrate two lamination configurations in which an area of one of the substrates is not covered by another one of the substrates.

In some embodiments, after the polymer electrolyte solution is uniformly spread on one or both of the substrates, part of the solvent of the polymer electrolyte solution is either dried in a room temperature or in an oven at a temperature ranging from 60-140° C. with or without vacuum. Then, the substrates are laminated with each other. Suitable film lamination methods that may be used include, but are not limited to, cross cover, misalignment cover, and complete cover.

After the lamination, a roller press machine, a flat plate pressing device, a vacuum pressing device, or other apparatus now known or later developed may be used for defoaming the precursor. For example, and more specifically, the multilayer thin film assembly consisting of the WE, the CE, and the precursor therebetween may be placed in a flat plate pressing apparatus and pressed at room (e.g., 1 atmosphere of pressure) temperature or a pressure of 30 MP-500 MP under heating (e.g., higher than 90° C.) for a predetermined time, such as between 1 min and 30 min. The pressing process may be terminated after the bubbles in the electrolyte layer are removed. Alternatively, the multilayer thin film assembly may be placed in a rolling press machine and defoamed, for example, at a speed of 0.5 m/s to 30 m/s at room temperature or under heating (e.g., higher than 90° C.) until the bubbles are removed from the electrolyte layer.

In some embodiments, the polymer electrolyte solution or electrolyte precursor may be dripped, for example, by a dispenser, evenly between the CE and the WE. The WE and CE are pressed together by a roller press, with the electrolyte precursor interposed therebetween. In some embodiments, the pressure of the roller press is in the range of 1 MP-200 MP, and speed can range, for example, from about 0.1 m/s to about 30 m/s. The speed of precursor drip can be estimated, for example, using X*Y*Z ml/s, wherein X (cm) is the thickness of electrolyte, Y (cm/s) is the speed of roller press, Z (cm) is the width of coincident part of WE and CE. This technique can be applied in a cost-effective, large-scale on-line assembling of the ECDs.

At 214, the electrolyte solution is cured to form the electrochromic device. In some embodiments, the electrolyte solution may be cured by a thermal process. For example, the electrolyte solution may be cured at 80-120° C. at a pressure of 30 MP to 500 MP for 1 to 30 min. For example, the multilayer thin film assembly may be placed in an oven with uniform heat radiation and baked at a temperature of 90° C. for a time between 1 min and 30 min to form a fully crosslinked solid-state electrolyte thin film, that further bond the WE and CE thin films together.

In some embodiments, the laminated device with polymer electrolyte solution interposed between two electrolyte was dried in an oven at a temperature ranging from 60-140° C. with or without vacuum to form a solid-state electrolyte thin film, that further bond the WE and CE thin films together.

In some embodiments, the electrolyte solution may be cured by UV irradiation. In some embodiments, the electrolyte solution is cured to generate an electrolyte layer having less than 20 wt % of neutral small organic molecules having a molecular weight of 3000 or less. In some embodiments, the electrolyte solution is cured to generate an electrolyte layer having less than 3 wt % of neutral small organic molecules having a molecular weight of 3000 or less. When too many neutral small organic molecules are present in the electrolyte layer, they may inhibit the ion conductivities between the ion storage layer and the electrochromic layer. In some embodiments, the electrolyte solution may be cured to generate an electrolyte layer free of neutral small organic molecules that can be detected or measured by available instruments.

In some embodiments, the multilayer thin film assembly may be placed in an oven with uniform heat radiation and baked at a temperature of 90° C. for a time between 1 min and 30 min to form a fully crosslinked solid-state electrolyte thin film, that further bond the WE and CE together.

In some embodiments, the method 200 further includes 216 in which materials on the first transparent electrode or the second transparent electrode at the area of one of the substrates not covered by another one of the substrates is removed. This operation removes the material(s) above the transparent electrode and exposes the surface of the transparent electrode. Techniques to remove the electrochromic layer, the ion storage layer, and the ion transfer (electrolyte) layer on the surface of the substrate(s) include, but are not limited to, wiping, laser etching, and plasma etching. When wiping with a dust-free paper, a dust-free cloth, or the like, an appropriate solvent may be employed that can dissolve the materials from those layers. For example, the wiping solvent may include, but not be limited to, acetone, ethanol, o-xylene, among others known in the art. Before wiping, a mold of silica gel or other material with the same shape may be used as a protector to avoid film peeling and contamination of the area. When laser etching is used, the apparatus's parameters can be determined according to the thickness and material characteristics of the WE, CE, and ion transport layer. For example, the laser etching may be conducted at a speed of 10 mm/s-600 mm/s, using an energy of 10 w-200 w and a frequency at 10 Hz-20000 Hz.

At 218, a circuit is attached to the area. For example, a circuit to control the electrochromic device is connected to the exposed transparent electrode. The circuit can be attached to the area, for example, by adhering a double-sided conductive tape or dispensing the conductive paste/ink to the area to form the conductive wires with a certain width in the exposed conducting areas. A flexible printed circuit board, silver paste, or copper wire can be adhered onto the circuit and extended to make connection with a power source.

The all solid-state thin film electrochromic device formed using the above operations can then be encapsulated into various products for various applications, such as in automobiles, airplanes, buildings, sunglasses, medical treatment, and education, among many others.

Embodiment 1

Figure 4:
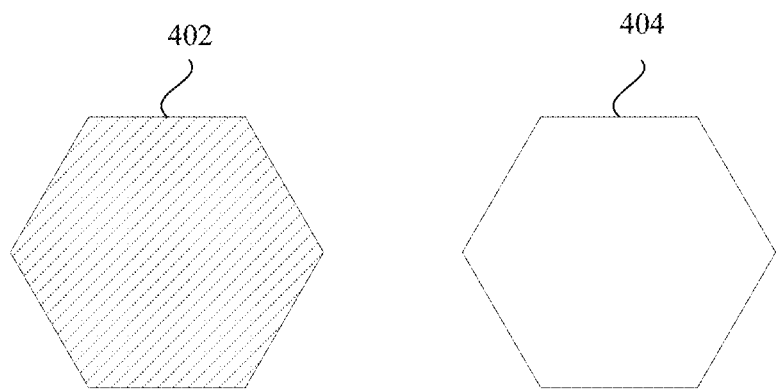
FIG. 4 illustrates hexagonal electrochromic layer film and ion storage layer film, according to one example embodiment.

1. Preparation of WE Thin Film 800 mg of the poly(ethylhexanepropylenedioxythiophene) is dissolved in 10 ml of o-xylene, magnetically stirred for ten hours to form a solution. The solution is uniformly applied to the surface of the nano-silver transparent conductive film (a substrate coated with a nano-silver conductive layer) by a sheet slit coating apparatus. The coated electrochromic layer film is baked at a high temperature of 120° C. for 30 min to form a film with a good adhesion on the surface of the flexible conductive substrate to obtain a WE. Thereafter, the as-fabricated electrochromic layer film is cut into a shape 402 as shown in FIG. 4 by a die cutting machine.

2. Preparation of Ion Storage Layer Film (CE)

A magnetron sputtering technique is used to deposit a tungsten trioxide film with a thickness of several tens of micrometers on the surface of the nano-silver transparent flexible conductive film at room temperature to obtain an ion storage layer film. The ion storage layer film is then cut into the same shape (404) as the electrochromic layer film by a die cutter as shown in FIG. 4.

3. Preparation of Ion Transfer Layer

Figure 5:
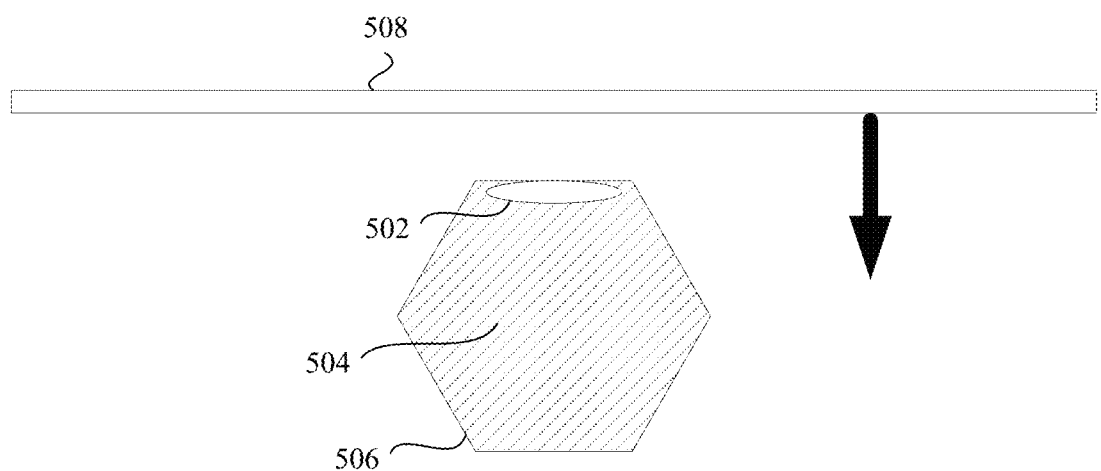
FIG. 5 is a schematic diagram showing a method for dispensing a precursor for electrolyte on an electrochromic layer using a wire bar coater, according to one example embodiment.

A brush-type polymer is employed as the ion transfer layer (electrolyte). The polymer is mixed with a lithium salt and an ultraviolet curing initiator in a mass ratio of 45/45/10. After magnetic stirring for 30 minutes, ultrasonic vibration is used to defoam the mixture for 30 minutes to obtain a precursor solution that is ready to use. The precursor 502 is dispensed on the edge of the electrochromic layer 504 and is uniformly distributed to the surface of the WE 506 by a wire bar coater 508, as shown in FIG. 5.

4. Fitting and Curing

Figure 6:
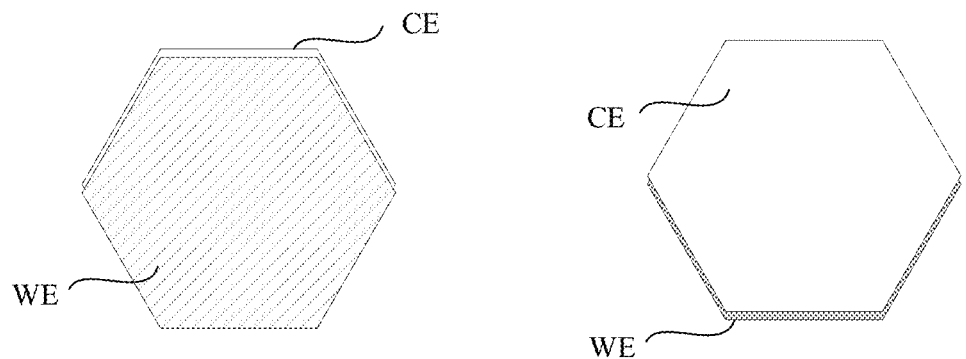
FIG. 6 is a schematic diagram showing that an ion storage layer is overlaid on an electrolyte-coated electrochromic layer in a staggered manner, according to one example embodiment.

The ion storage layer is overlaid on the electrolyte-coated electrochromic layer in a staggered manner, as shown in FIG. 6 with the WE and CE facing each other. The laminated composite film is then fed into a roller press to remove air bubbles in the composite film layer. After defoaming, the laminated ECDs is placed under UV light, and the electrolyte precursor is thereby thoroughly crosslinked to form a solid composite and to bond WE and CE together to form an ECD.

5. Exposure of the Conductive Areas and Circuit Layout

Figure 7:
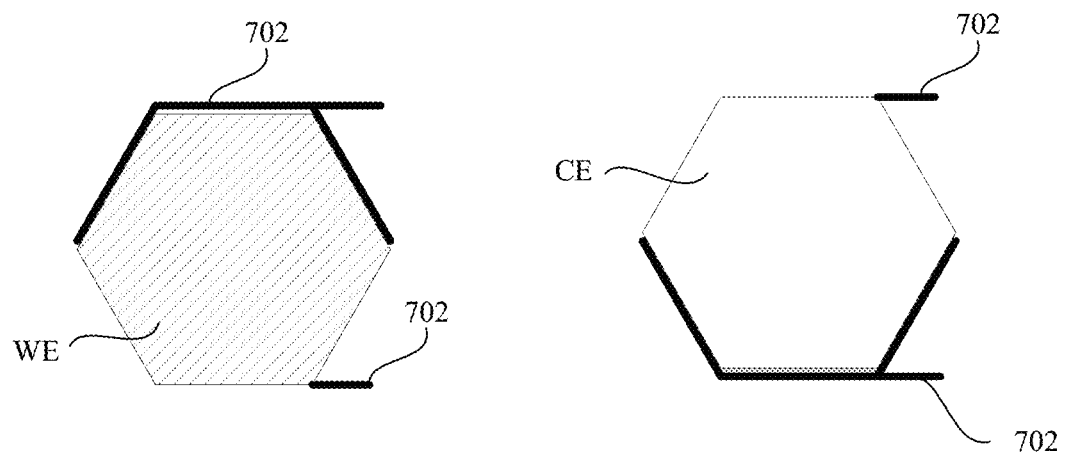
FIG. 7 is a schematic diagram showing a circuit for an electrochromic device, according to one example embodiment.

The electrolyte and WE left on the reserved circuit area (in a strip shape) are wiped off with acetone. The ion storage layer is etched away with a laser to expose the conductive layer. A copper conductive tape 702 is adhered on the exposed area of the conductive layer and extended out to be the positive and negative electrodes, wherein the lead connected to the WE is a positive electrode, and the lead connected to the CE is a negative electrode. The circuit layout and wiring are shown in FIG. 7.

Embodiment 2

1. Preparation of Electrochromic Layer Thin Film (WE)

800 mg of ECP (a copolymer of the 2,5-dibromo- and 2,5-tributylstannyl-2-ethyl-hexyloxy-substituted ethylhexane-3,4-propylenedioxythiophene (ProDOT-$(CH_2OEtHx)_2$) and 4,7-dibromo-2,1,3-benzothiadiazole (BTD)) is dissolved in 10 ml of o-xylene, magnetically stirred for ten hours to form a solution. The solution is uniformly applied to the surface of the ITO transparent conductive film by spin-coating. Then, the coated electrochromic layer film is baked at a temperature of 120° C. for 30 min to form a film that adheres well to the surface of the flexible conductive film to obtain an electrochromic layer film. Thereafter, the electrochromic layer film is cut into a desired shape by a die cutting machine.

2. Preparation of Ion Storage Layer Film (CE)

An ink of $Nb_2O_5$, with or without doping of $TiO_2$, is coated via the slot-die coating with a thickness of several tens of nanometers on the surface of an ITO transparent flexible conductive film at room temperature to obtain an ion storage layer film.

3. Preparation of Ion Transfer Layer

A brush-type polymer is employed as the ion transfer layer (electrolyte). The polymer is mixed with a lithium salt and a thermal curing initiator in a mass ratio of 50/45/5. After magnetic stirring for 10 min, ultrasonic vibration is used to defoam the mixture for 10 min to obtain a precursor solution that is ready to use. The precursor is uniformly applied to the surface of the electrochromic layer by screen printing.

4. Fitting and Curing

The ion storage layer is overlaid on the electrolyte-coated electrochromic layer in a staggered manner. The laminated composite film is then flattened by a vacuum laminating machine and defoamed at a high pressure to remove bubbles in the composite film layer, and then the composite film is cured at a high temperature of 100° C. for 10 min to form a solid composite and to bond WE and CE together to form an ECD.

5. Exposure of the Conductive Areas and Circuit Layout

The electrolyte and WE left on the reserved circuit area (in a strip shape) are wiped off with acetone. The ion storage layer is etched away with a laser to expose the conductive layer. A silver wire or a silver paste cloth is used to form the circuit on the exposed area of the conductive layer, and the positive and negative electrodes are wired out by fixing the FPC using silver glue, wherein the lead connected to the WE is a positive electrode, and the lead connected to the CE is a negative electrode.

Embodiment 3

1. Preparation of Electrochromic Layer Thin Film (WE)

Thin film preparation steps are same as described in the embodiment 1, above. Other than that, the WE is cut into a square shape with a size of 2 cm×2 cm by a die cutting machine.

2. Preparation of Ion Storage Layer Film (CE)

Thin film preparation steps are same as described in embodiment 2, above. Other than that, the CE is cut into a square shape with a size of 2 cm×2 cm by a die cutting machine.

3. Preparation of Ion Transfer Layer

Same as described in embodiment 1, above.

4. Fitting and Curing

The ion storage layer is overlaid on the electrolyte-coated electrochromic layer in a staggered manner. The laminated thin film is then flattened by a vacuum laminating machine and defoamed at a high pressure to remove bubbles in the composite film layer, and then the electrolyte precursor is thoroughly crosslinked via UV irradiation to form a solid composite and to bond the WE and the CE together to form an ECD.

5. Exposure of the Conductive Areas and Circuit Layout

The electrolyte and WE left on the reserved circuit area (in a strip shape) are wiped off with acetone. The ion storage layer is etched away with a laser to expose the conductive layer. A copper tape is used to form the circuit on the exposed area of the conductive layer, and the positive and negative electrodes are wired out by capper tapes, wherein the lead connected to the WE is a positive electrode, and the lead connected to the CE is a negative electrode.

Embodiment 4

1. Preparation of Electrochromic Layer Thin Film (WE)

Figure 8A:
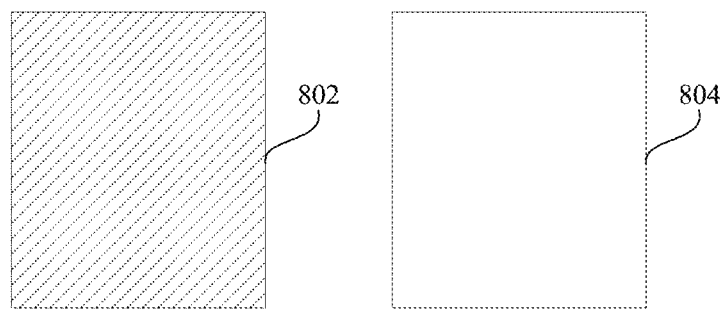
FIG. 8A illustrates rectangular electrochromic layer film and ion storage layer film, according to one example embodiment.

1000 mg of the poly(ethylhexane propylenedioxythiophene) is dissolved in 10 ml of o-xylene, magnetically stirred for ten hours, and the solution is uniformly applied to the surface of the nano-silver transparent conductive film by a sheet slit coating apparatus. The coated electrochromic layer film is baked at a high temperature of 120° C. for 30 min to form a film with good adhesion on the surface of the flexible conductive substrate to obtain a WE (802). Thereafter, the WE 802 is cut into a shape as shown in FIG. 8A by a die cutting machine.

2. Preparation of Ion Storage Layer Film (CE)

Prussian blue functionalized with ligands is suspended in alcohol and coated on the surface of the transparent FTO flexible conductive film by a slit coating technique to obtain an ion storage layer film. After coating, the film is baked at 100° C. for 20 min to obtain a CE (804) (FIG. 8A). The ion storage layer film is then cut into the same shape as the electrochromic layer film by a die cutting machine.

3. Preparation of Ion Transfer Layer

Same as described in embodiment 1, above.

4. Fitting and Curing

Figure 8B:
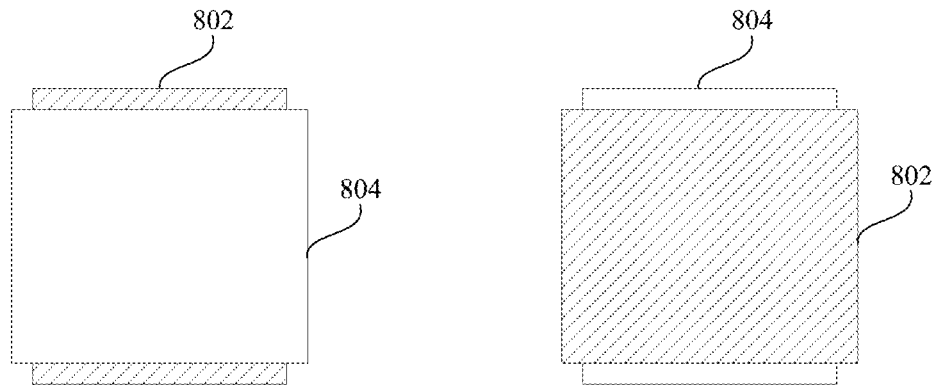
FIG. 8B is a schematic diagram showing that the ion storage layer shown in FIG. 8A is overlaid on the electrolyte-coated electrochromic layer shown in FIG. 8A in a staggered manner, according to one example embodiment.

The ion storage layer is overlaid on the electrolyte-coated electrochromic layer in a staggered manner, as shown in FIG. 8B. The laminated composite film is fed into a roller press to remove air bubbles in the composite film layer. After defoaming from the roll press, the composite film electrochromic layer is cured under UV irradiation to obtain the all solid state ECD.

5. Exposure of the Conductive Areas and Circuit Layout

Figure 8C:
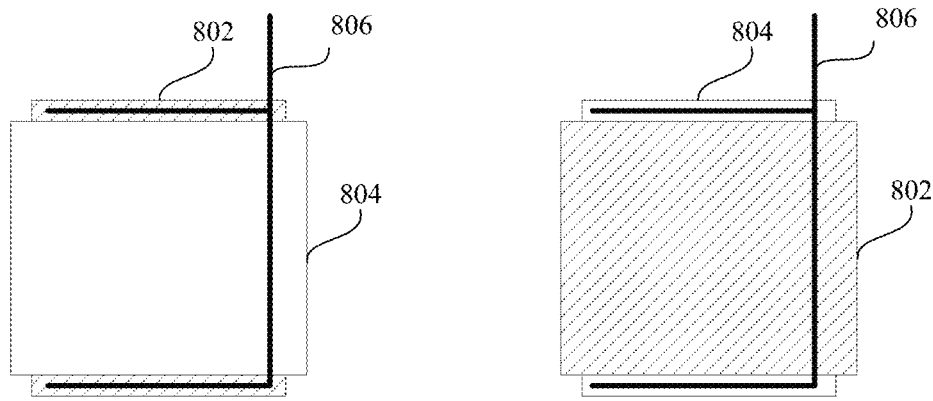
FIG. 8C is a schematic diagram showing a circuit for the electrochromic device shown in FIG. 8B, according to one example embodiment.

The electrolyte, WE 802 and CE 804 left on the reserved circuit area are wiped off with acetone. A silver wire or a silver paste cloth is used to form the circuit 806 on the exposed area of the conductive layer. The conductive cloth is placed on the exposed area of the conductive layer to directly wire out the positive and negative electrodes, wherein the lead-out end of the electrochromic layer is a positive electrode, and the lead portion of the ion storage layer is a negative electrode. The circuit layout is shown in FIG. 8C.

Embodiment 5

1. Preparation of Electrochromic Layer Thin Film (WE)

Thin film preparation steps are the same as described in embodiment 1, above. Other than that, the WE is cut into a rectangular shape with a size of 4 cm×20 cm by a die cutting machine.

2. Preparation of Ion Storage Layer Film (CE)

Thin film preparation steps are the same as described in embodiment 2, above. Other than that, CE is cut into a rectangular shape with a size of 4 cm×20 cm by a die cutting machine.

3. Preparation of Ion Transfer Layer

Same as described in embodiment 1, above.

4. Fitting and Curing

Same as described in embodiment 1, above. Other than that, the all-solid state ECD is a rectangular shape with a size of 4 cm×20 cm by a die cutting machine.

Embodiment 6

1. Preparation of Electrochromic Layer Thin Film (WE)

600 g of ECP (a copolymer of the 2,5-dibromo- and 2,5-tributylstannyl-2-ethyl-hexyloxy-substituted ethylhexane-3,4-propylenedioxythiophene (ProDOT-(CH$_2$OEtHx)$_2$) and 4,7-dibromo-2,1,3-benzothiadiazole (BTD)) is dissolved in 10 L of o-xylene and magnetically stirred for ten hours to form a solution. The solution is uniformly applied to the surface of full roll of PET substrate with ITO transparent conductive film by roll to roll coating. The width of the PET substrate is 50 cm. Then, the coated electrochromic layer film was baked at a high temperature of 140° C. for 3 min. The WE thin film is then winded into a roll.

2. Preparation of Ion Storage Layer Film (CE)

Prussian blue functionalized with ligands is suspended in alcohol and coated on the surface of a full roll of PET substrate with ITO transparent conductive film by roll to roll coating. The width of the PET substrate is 50 cm. After coating, the film is baked at 120° C. for 2 min. After that, a roll of CE thin film is obtained by winding.

3. Preparation of Ion Transfer Layer

Same as described in embodiment 1, above.

4. Fitting and Curing

Figure 9:
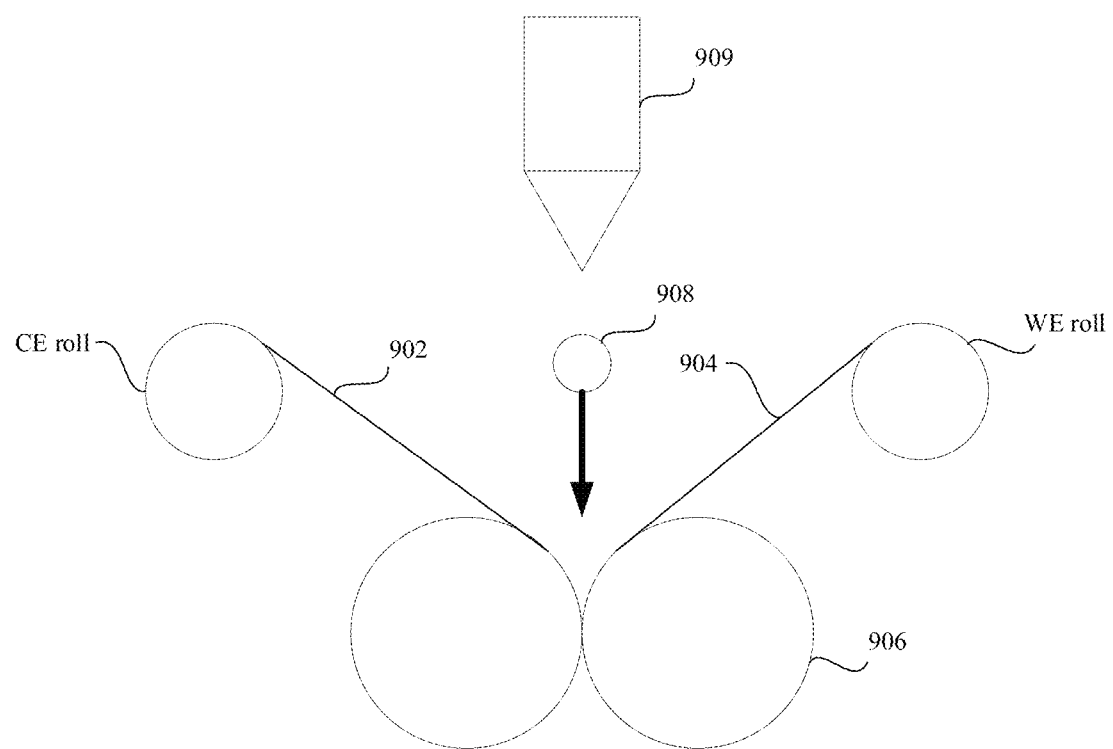
FIG. 9 is a schematic diagram showing a roller press technique to laminate an electrochromic layer film and an ion storage layer film with an electrolyte precursor dispensed therebetween, according to one example embodiment.

Reference is made to FIG. 9. The CE film 902 and the WE film 904 are pressed together in a roller press 906. And those two films are completely coincident. The speed of roller press 906 is 5 m/s. The rate of the precursor drip 908 is 25 ml/s. At the same time, the dispenser 909 dripped the electrolyte precursor evenly in the middle of the CE film 902 and the WE film 904 as shown in FIG. 9. The laminated ECD is exposed to UV radiation, and the electrolyte is thereby crosslinked to form a solid composite and to bond the WE 904 and the CE 902 together.

5. Exposure of the Conductive Areas and Circuit Layout

The large size all solid-state device is cut into a desired shape by laser semi-cutting technology. Then, the electrolyte, the CE, and the WE left on the reserved circuit area (in a strip shape) are wiped off with acetone. A copper conductive tape is adhered on the exposed area of the conductive layer and extended out to be the positive and negative electrodes, wherein the lead connected to the WE is a positive electrode, and the lead connected to the CE is a negative electrode.

Embodiment 7

1. Preparation of Electrochromic Layer Thin Film (WE)

600 mg of ECP (a copolymer of the 2,5-dibromo- and 2,5-tributylstannyl-2-ethyl-hexyloxy-substituted ethylhexane-3,4-propylenedioxythiophene (ProDOT-$(CH_2OEtHx)_2$) and 4,7-dibromo-2,1,3-benzothiadiazole (BTD)) is dissolved in 10 ml of toluene and magnetically stirred for ten hours to form a solution. The solution is uniformly applied to the surface of a flexible ITO transparent conductive substrate with a size of 10 cm×10 cm by slot-die coating. Then, the coated WE is baked at a high temperature of 80° C. for 30 min to form a film and to adhere well to the surface of the flexible conductive film to obtain the WE.

2. Preparation of Ion Storage Layer Film (CE)

400 mg of poly(nitronylnitroxylstyrene) is dissolved in 10 ml of N-Methyl-2-Pyrrolidone and magnetically stirred for ten hours to form a solution. The solution is uniformly applied to the surface of a flexible ITO transparent conductive substrate with a size of 10 cm×10 cm by slot-die coating. The coated CE film is dried at a temperature of 100° C. for 30 min to form the CE.

3. Preparation of Ion Transfer Layer

Ion conducting polymers chemically linked with plasticizing linear polymers are used in this embodiment. The polymers are mixed with a lithium salt in a mass ratio of 60/40. After magnetic stirring for 30 minutes, ultrasonic vibration is used to defoamed the mixture for 30 minutes to get a precursor solution that is ready to use. The precursor is dripped by a dispenser evenly between the CE film and the WE film. The as-fabricated WE or and CE are pressed together in a roller press with the electrolyte precursor disposed therebetween. The pressure of the roller press is 100 MP, and speed is 10 m/s. The rate of precursor drip is 10 ml/s. The composite film is cured at a high temperature of 100° C. for 10 min to form a solid composite and to bond the WE and CE together.

4. Fitting and Curing

The electrolyte and WE left on the reserved circuit area (in a strip shape) are wiped off with acetone. The ion storage layer is etched away with a laser to expose the conductive layer. A copper tape is used to form the circuit on the exposed area of the conductive layer, and the positive and negative electrodes are wired out by fixing the FPC using silver glue, wherein the lead connected to the WE is a positive electrode, and the lead connected to the CE is a negative electrode.

Figure 10:
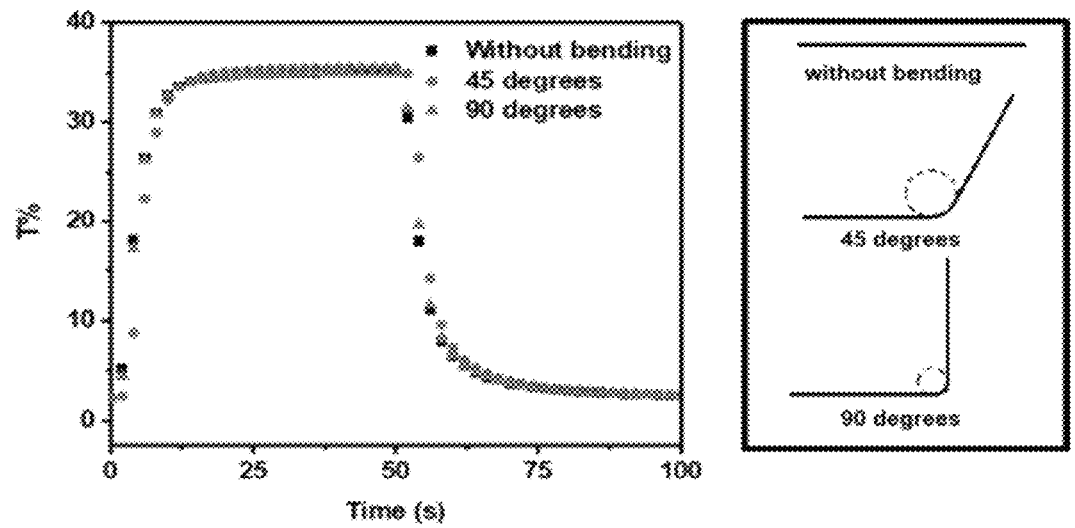
FIG. 10 is a diagram showing transmittance changes of the thin-film ECDs bent at different angles, according to one example embodiment.
Figure 11A:
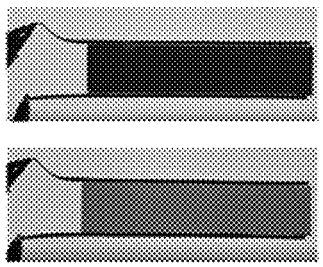
FIGS. 11A-11E are pictures showing ECDs in various operations according to example embodiments.
Figure 11B:
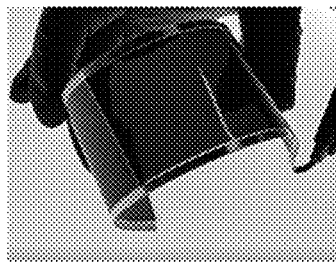
Figure 11C:
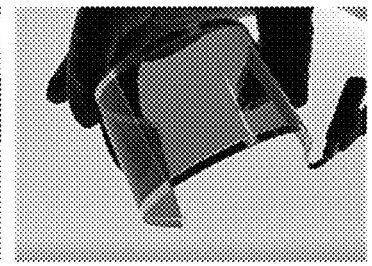
Figure 11D:
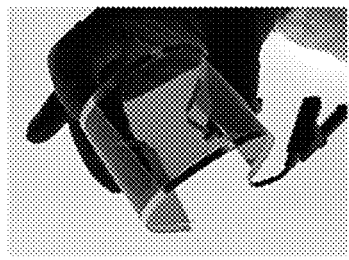
Figure 11E:
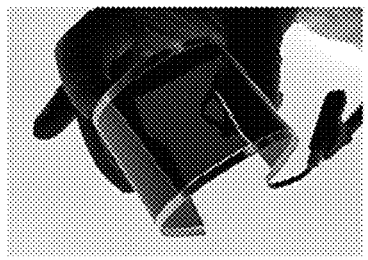

Due to the lack of physical support, the requirement of chambers for receiving the electrolytes, and the delicate sealing techniques needed, liquid or gel based ECDs are not robust and cannot be easily bent. The embodiments of this disclosure provide a solid electrolyte layer which completes solid-state ECDs. The ECDs of the present disclosure can be bent and fixed into 0 degrees to 360 degrees bended shapes, with small radii of curvature (e.g., as low as 2.5 cm), which demonstrates the capability to be adapted to any surface having virtually any shape(s) and curvature(s). For example, as shown in FIG. 10, thin-film all-solid-state ECDs made consistent with embodiments of the present disclosure are bent and fixed into certain degrees, and their transmittance changes have been measured in-situ when switching between −1.2 and 1.5 V. The radius of curvature of the ECD bent at 45 degree is 7.8 cm in this example. The most extreme bending in this example, wherein the radius of curvature was 4.2 cm, demonstrated by the disclosed all-solid-state ECDs was 90 degrees, which shows a great potential to be adapted onto most of the curved surfaces in many applications including sunroof, rearview mirror, building windows, and so on. In contrast, to achieve any significant degree of bending without causing the issues (like the damage of WE or CE, contact of WE and CE with one another, etc.), tremendous efforts are needed in the sealing and encapsulation of liquid or gel based ECDs known in the art. ECDs of the present disclosure that have all-solid electrolyte layers, however, do not require any such measures.

FIG. 11 are pictures showing ECDs in operations according to example embodiments. In FIG. 11A, ECDs are in a colored/dimming state (up) and a bleached state (down) without bending. In FIG. 11B, the ECD is in the colored/dimming state when curved into a near semi-circle. In FIG. 11C, the ECD is in the bleached state when curved into a near semi-circle. In FIG. 11D, the ECD is in the colored/dimming state when curved into a circle. FIG. 11E, the ECD is in the bleached state when curved into a circle. These examples indicate that the ECDs formed according to the embodiments of this disclosure are very flexible and stable.

Figure 12:
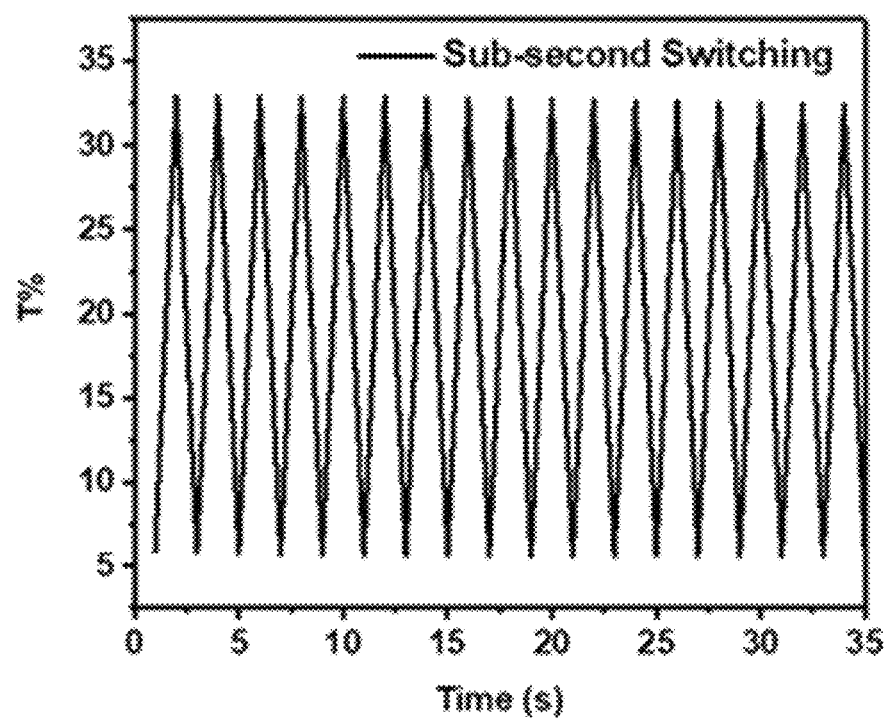
FIG. 12 is a diagram showing transmittance change of an ECD with one second switching time, according to one example embodiment.

The disclosed all-solid-state ECDs demonstrate rapid switching time for coloring and bleaching. For example, 0.1 s–1 s switching times can be achieved. A 2 cm×2 cm ECD is subjected to one second double-potential switching between −1.2 and 1.5 V, and the transmittance change is measured in-situ. As shown in FIG. 12, the ECD switched in one second can achieve ~90% of the optical contrast at a complete switch, which indicated that the tested all solid-state ECD has a fast switching kinetic.

Due to the solid-state form of the electrolyte layer, it is possible to fabricate the electrolyte film as thin as, for example, 0.1 μm. By manufacturing-friendly and cost-efficient processes, including roller, plate, or vacuum press processes, among others known in the art, it can be easily fabricated down to, for example, 5 μm, thus the all-solid state ECDs can be as slim as, for example, 25 μm. The thickness of each layer and ECDs can be further reduced. The slim design for the disclosed all-solid-state ECDs can be a great advantage to be applied for small integrated systems.

Due to very low viscosity of a liquid or gel electrolyte, the roller, plate, or vacuum press processes cannot be used for liquid or gel electrolyte based ECDs. However, due to the robustness and high temperature tolerance, the disclosed all-solid-state ECDs allow continuous manufacturing friendly and cost-efficient processes, such as roll-to-roll coating and roller press processes for cheap large-scale on-line production and allow easy encapsulation into products for various applications.

Further, due to the use of the solid-state electrolyte, there will be no delamination, or many side reactions occurring at the WE, CE/electrolyte interfaces. Thus, the disclosed ECDs show a better cycling performance. Low voltage consumption of the disclosed solid-state ECDs (can be as low as 1.5 V) is beneficial for battery powered applications.

Figure 13A:
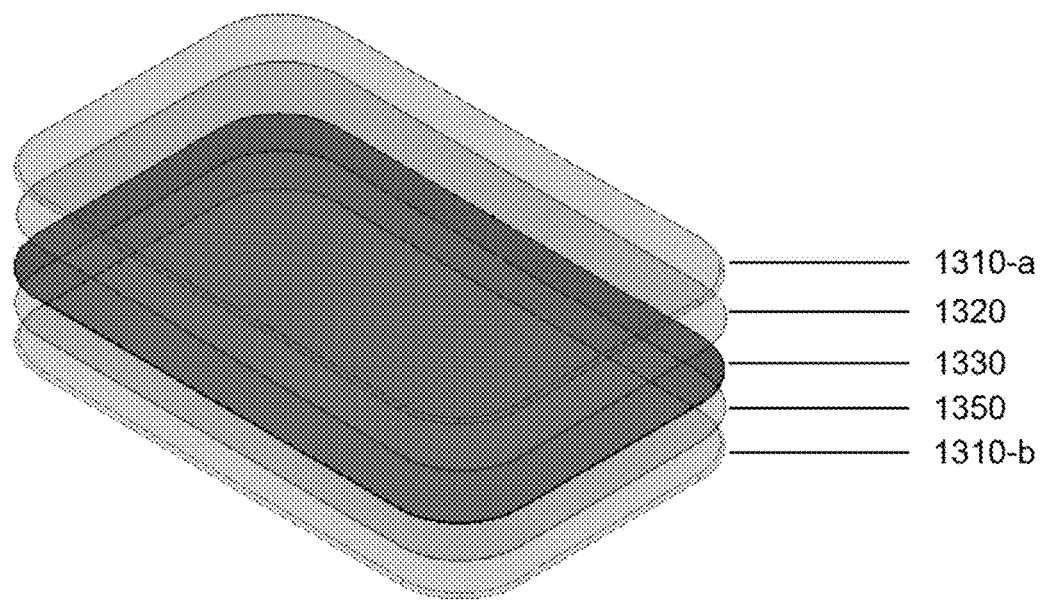
FIG. 13A is an explosive diagram of an electrochromic sunroof based on an all solid-state thin-film electrochromic device, according to one example.
Figure 13B:
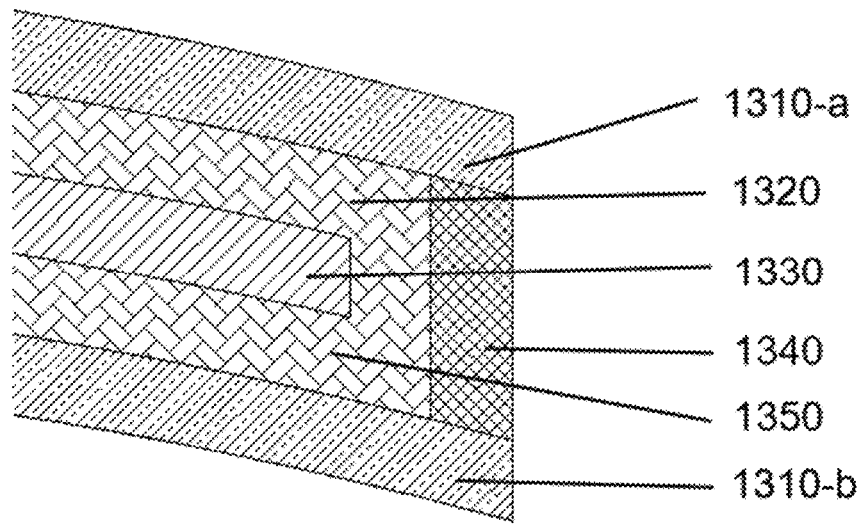
FIGS. 13B and 13C are schematic diagrams illustrating cross sectional views of two example electrochromic sunroofs based on all solid-state thin-film electrochromic device.
Figure 13C:
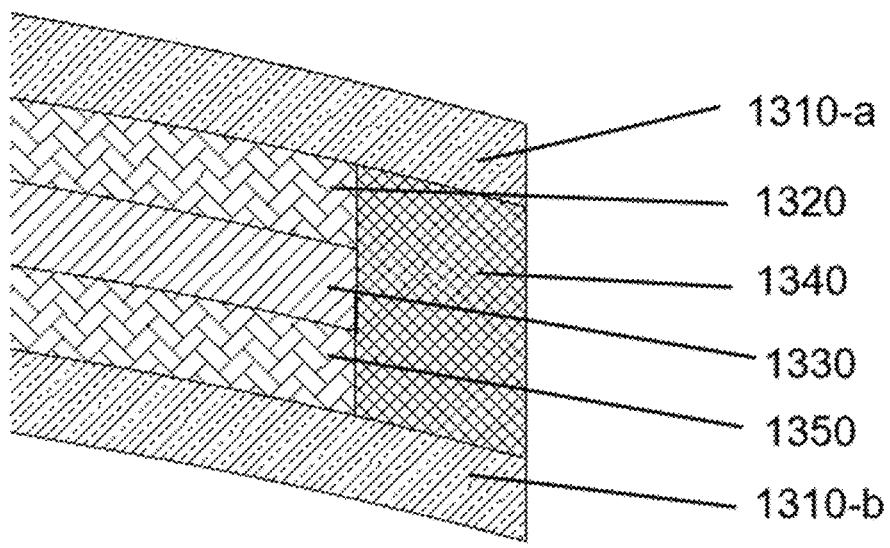

The ECDs formed according to the above techniques can be used in an electrochromic sunroof. The pre-assembled all solid-state thin-film electrochromic device (ECD) is flexible and the disclosed electrochromic sunroof can have any shape including curved shapes. FIG. 13A is an explosive diagram of an electrochromic sunroof 1300 containing an ECD according to one example embodiment. FIGS. 13B-13C are schematic diagrams illustrating cross sectional views of the example electrochromic sunroofs. As shown in FIGS. 13A-13C, the electrochromic sunroof 1300 includes a first glass 1310-a, a first adhesive 1320 disposed on the first glass 1310-a, a second glass 1310-b, a second adhesive 1350 disposed on the second glass 1310-b, a pre-assembled all solid-state thin-film electrochromic device (ECD) 1330 interposed between the first adhesive layer 1320 and the second adhesive layer 1350, and a sealant 1340 disposed at edges of the first glass and the second glass to seal the ECD 1330. The first adhesive layer 1320 and the second adhesive layer 1350 are disposed between the first glass 1310-a and the second glass 1310-b. Edges of adhesive layers (1320 and 1350) are equal to or beyond the edge of ECD 1330. The sealant 1340 is adhesive and waterproof and is disposed at various distances from the edge of the ECD 1330. For example, the sealant 1340 is disposed at a distance from the edge of the ECD with adhesives (1320 and 1350) filled therebetween (as illustrated in FIG. 13B) or be in close contact with the edge of the ECD (as illustrated in FIG. 13C).

In some embodiments, the first glass 1310-a and the second glass 1310-b are flat or with a certain or varied curvature with a curvature radius ranges, for example, from 100 mm to 10000 mm.

The adhesives 1320 and 1350 are optical transparent adhesives. The light transmittance of the selected adhesive may be between 1%-100%. The first adhesive layer 1320 and the second adhesive layer 1350 are optical transparent and optionally have substantially same refractive indexes with refractive indexes of the first glass and the second glass. Example transparent adhesives include optical clear adhesive (OCA) (including but not limited to resin OCA, liquid OCA (LOCA) or solid OCA), hot melting adhesives (including but not limited to ethylene vinyl acetate membrane (EVA) and polyvinyl butyral membrane (PVB)), among others known in the art. Example curing methods include moisture curing, heat curing, UV curing, among others known in the art. When it comes to optical clear adhesive, UV curing, or moisture curing is commonly performed after the adhesive is applied to the surface or encapsulated in the device. When it comes to hot melting adhesive, heat curing is commonly performed during the incorporating process.

The all solid-state thin-film electrochromic device (ECD) 1330 is consistent with those disclosed above. The thickness of the ECD ranges, for example, from 0.02 mm to 3.0 mm.

The Sealant 1340 has very good adhesion to the glass and is waterproof. Example sealant includes butyl rubber, epoxy rubber, polyurethane, acrylic, among the others known in the art. This sealant usually has a volume shrinkage of 0.5%-2% during curing (including heat curing, UV curing, moisture curing, among others known in the art) to keep the two pieces of the glass stuck together tightly after curing to obtain a better encapsulation. The curing method is selected depending on the characteristics of the sealant.

Depending on different types of adhesives used and the processes to apply the sealant, at least three example preparation processes are presented hereinafter to encapsulate pre-assembled ECDs into a sunroof. To make a curved sunroof, the ECD film may be first thermally bent into a curved shape with a certain curvature (curvature radius can range, for example, from 50 mm to infinity) in an oven at 50° C. to 200° C. for 5 min to 30 min using a mold conforming to the shape and curvature of the curved surface with or without vacuum depending on the hardness of the mold. This step can help make the assembling step easier since the thermally bent ECD can remain the same curvature as the glass during the operation. However, because the ECD in this disclosure is flexible and can be bent easily to fit to the surface with any shape and curvature, this step is optional to make curved sunroof. For a flat sunroof, this step can be omitted.

Method A, with Liquid Optical Clear Adhesives (LOCA)

1. Prepare the materials: Cut the ECD into the desired shape and size with a die cutting machine or a laser machine or others known in the art. Set the right instrument parameters to ensure that the cutting process is performed smoothly. Select the special LOCA materials with viscosity between 100 CPS and 10,000 CPS. Choose the proper viscosity of the LOCA, which is very important due to the disclosed manufacture process.

2. Apply the sealant onto one or both of the first glass and the second glass.

Figure 14:
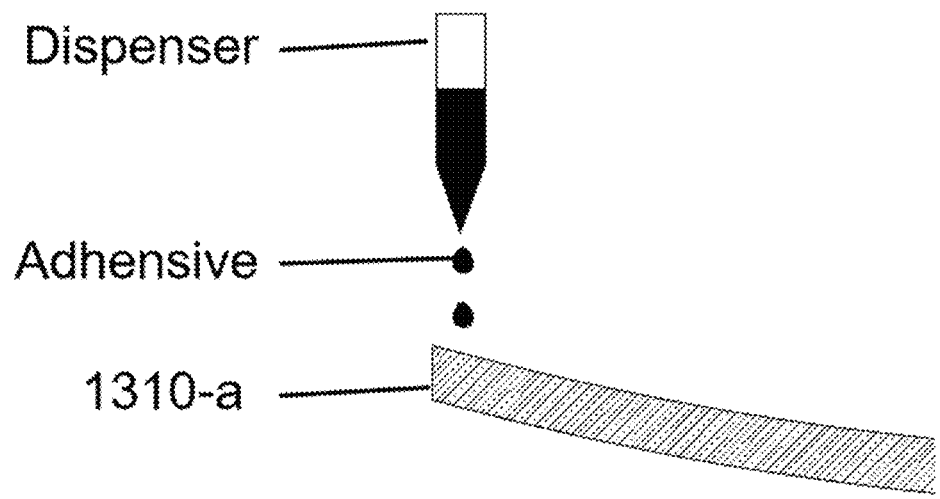
FIG. 14 is a process scheme of dispensing the sealant onto the first glass 1310-*a*.
Figure 15:
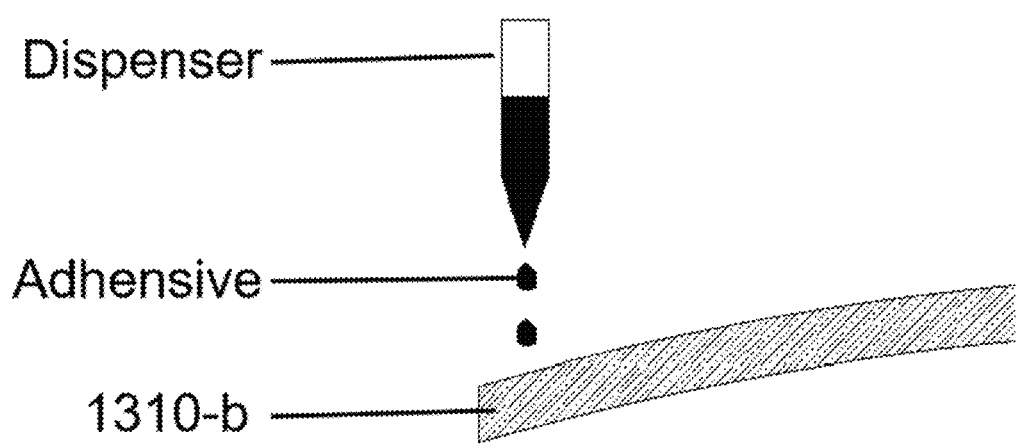
FIG. 15 is a process scheme of dispensing the sealant onto the second glass 1310-*b*
Figure 17:
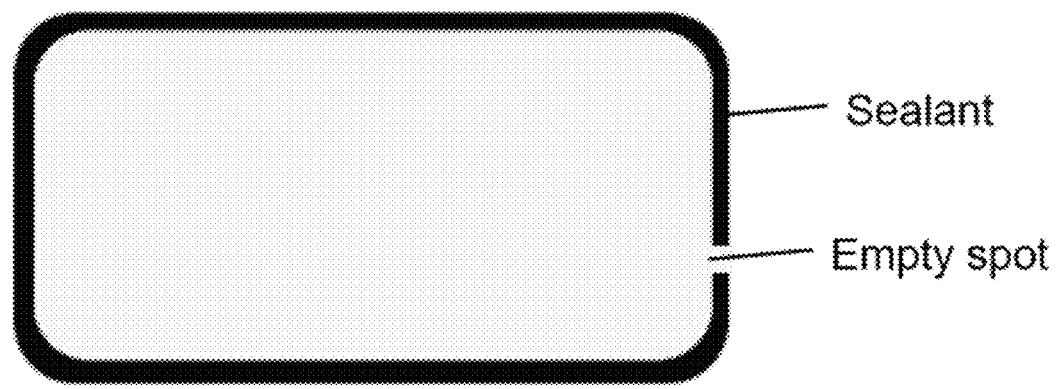
FIG. 17 is a schematic diagram of after dripped sealant onto the edge of the glass.

2.1 The method a of applying the sealant: The sealant is evenly dripped onto the edges of the first glass 1310-a and/or the second glass 1310-b (as shown in FIG. 14 and FIG. 15) by an appropriate machine including but not limited to glue dispenser, holt-melt adhesive dispenser, among others known in the art. The viscosity of the sealant normally ranges from 500 cps to 2,500,000 cps. The sealant is evenly dripped onto the edge of the glass by an appropriate machine including but not limited to glue dispenser, holt-melt adhesive dispenser, among others known in the art. The amount of the sealant is well controlled to avoid bubbles and overflow. The diameter of the dispenser needle may range, for example, from 0.01 mm to 15 mm. The flow rate may range, for example, from 0.001 mL/min to 100 mL/min. The flow rate is determined by the thickness and width of the sealant. The thickness of the sealant commonly ranges, for example, from 0.1 mm to 10 mm. The width of the sealant commonly ranges, for example, from 0.01 mm to 30 mm. As shown in FIG. 17, after the glass edge is evenly dripped with sealant, one or more spots need to be left randomly uncovered by the sealant, so that to allow the excess LOCA to overflow. The width of the spot commonly ranges, for example, from 1 mm to 10 mm. There is not any limitation to the shapes of the spots.

Figure 16:
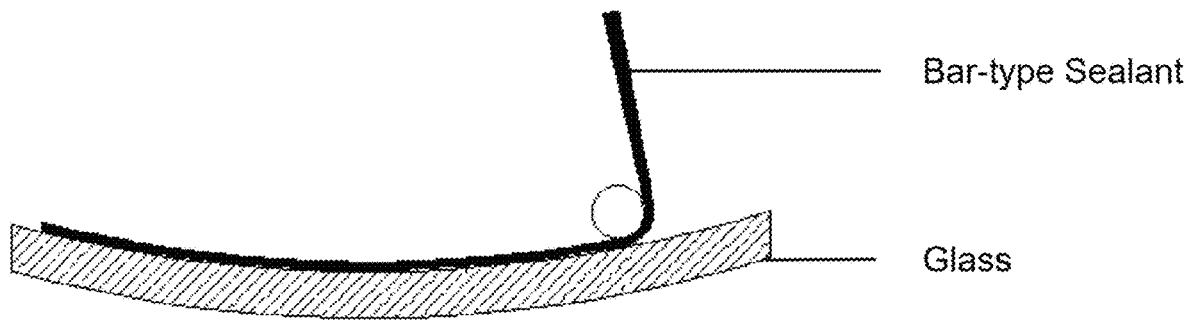
FIG. 16 is a process scheme of applying the bar-type sealant onto one or both of two pieces of glass.

2.2 The method b of applying the sealant: The bar-type sealant (including but not limited to butyl rubber, epoxy rubber, polyurethane, acrylic, among the others known in the art) is evenly stick onto one or both of the two pieces of glass surface (as shown in FIG. 16) by an appropriate machine including but not limited to sticking tape equipment, among others known in the art. The width of the bar-type sealant ranges, for example, from 0.5 mm to 30 mm, the thickness of the bar-type sealant ranges, for example, from 0.1 mm to 10 mm, and the thickness compression ratio of the bar-type sealant range, for example, from 50% to 95%. The widths of the empty spots commonly range, for example, from 1 mm to 10 mm. If necessary, the empty spots can be filled with overflowed LOCA finally.

3. Prepare a pre-assembled electrochromic sunroof.

Figure 18:
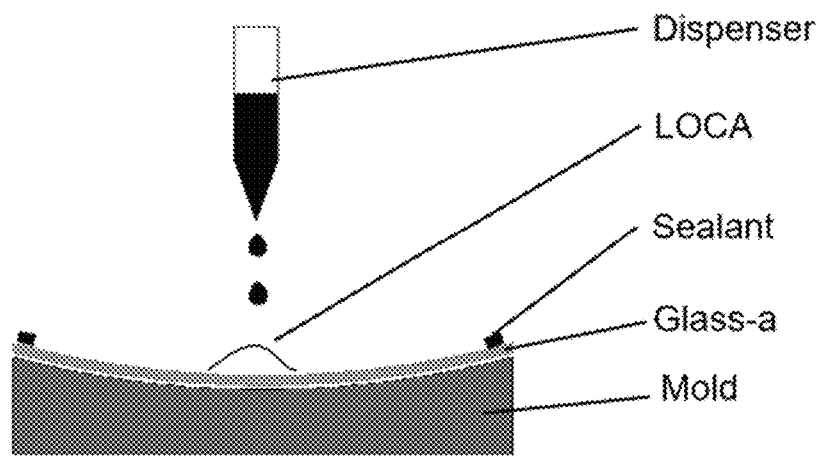
FIG. 18 is a scheme of integrating the LOCA dispensing process onto the first glass 1310-*a*.
Figure 19:
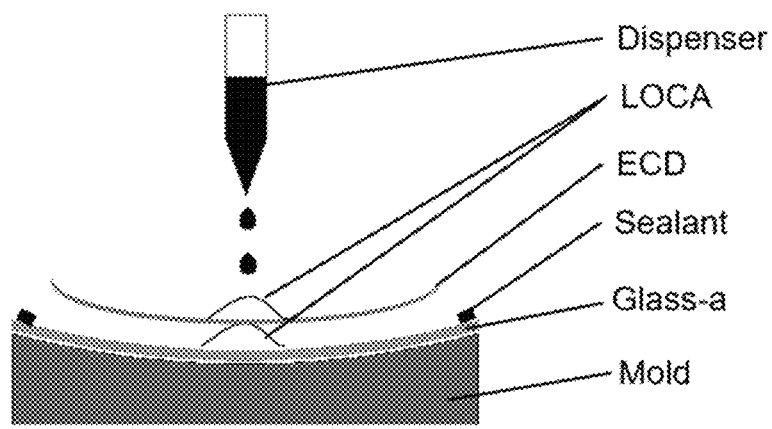
FIG. 19 is a scheme of integrating the LOCA dispensing process onto the pre-assembled ECD.
Figure 20:
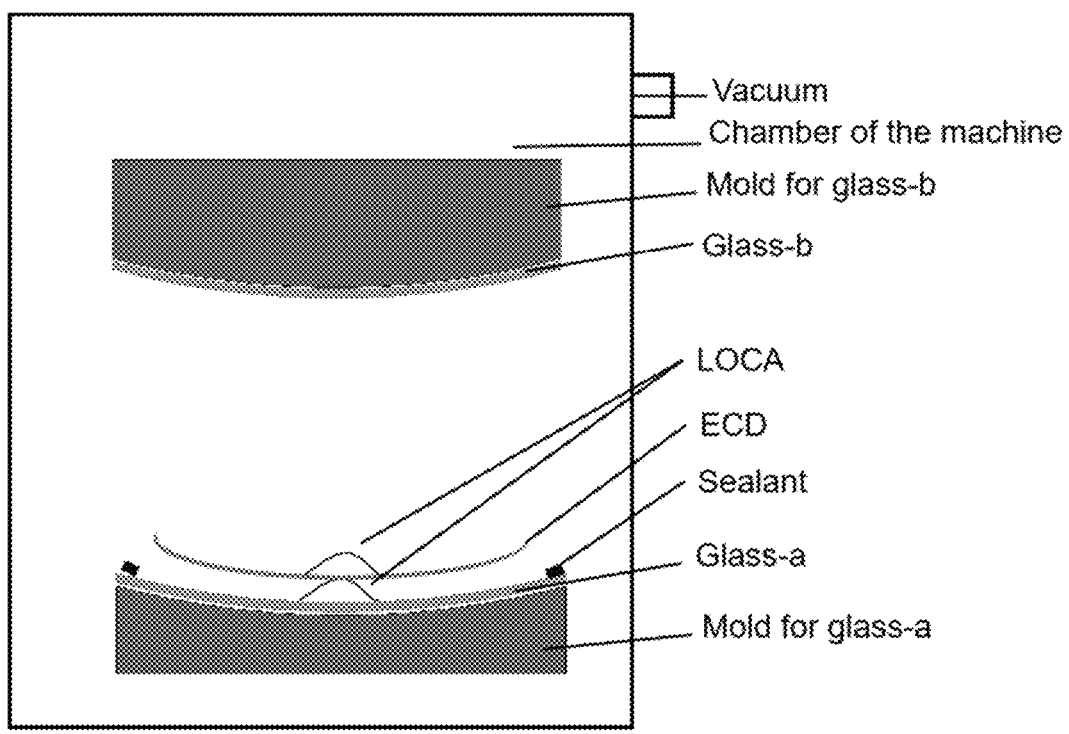
FIG. 20 is a scheme of the vertical pressing method to assemble the electrochromic sunroof (The sealant dispensed onto the first glass-a).
Figure 21:
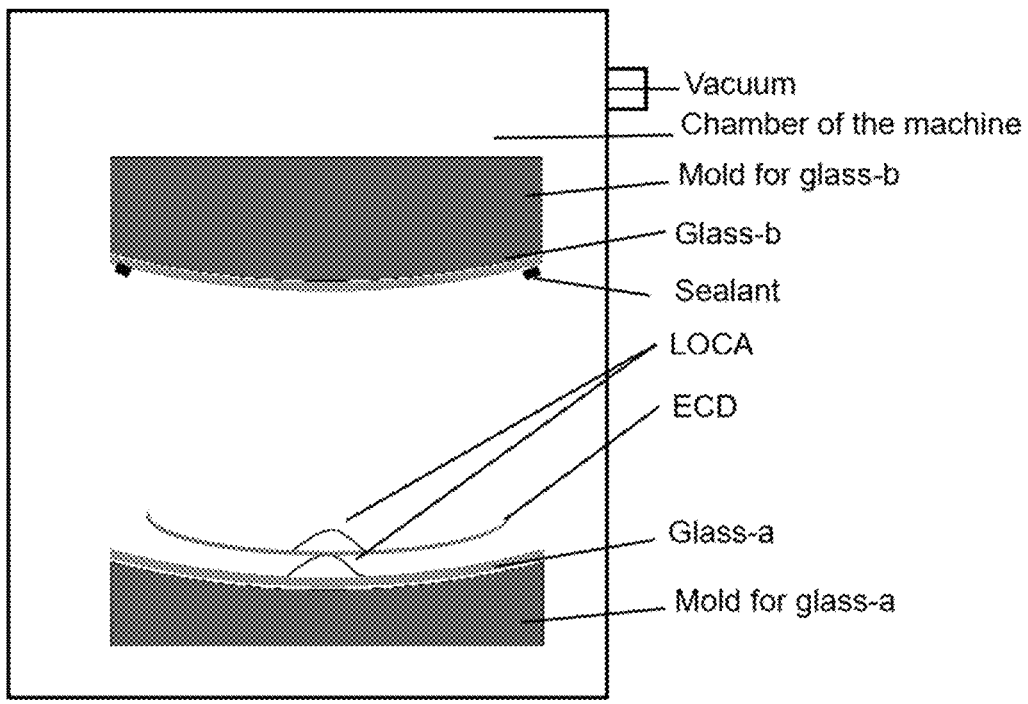
FIG. 21 is a scheme of the vertical pressing method to assemble the electrochromic sunroof (The sealant dispensed onto the second glass-b).

(1) Fix the first glass 1310-a (including the flat, curved and spherical ones) onto a mold with the curvature determined based on the glass. The deviation between the curvature radius from the mold and the one from the glass may range, for example, from 0 mm to 100 mm. (2) Drop the LOCA in the middle of the glass with the dispenser (as shown in FIG. 18). The applied weight of the LOCA can be estimated by the glass area and the resulting thickness, but the amount of the LOCA is well controlled to avoid bubbles and overflow. After pressing in step 5, the applied LOCA can form the first adhesive layer. (3) Fix the ECD onto the surface of the LOCA and then drop the LOCA again (as shown in FIG. 19). After pressing in step 5, the secondly applied LOCA can form the second adhesive layer. (4) Fix the second glass 1310-*b* onto another mold by vacuum adsorption which curvature is designed based on the second glass. (5) The first mold with the first glass 1310-*a* and the second mold with the second glass 1310-*b* are separated and held by a machine to avoid any contact before the pressing process. Vertical pressing method is adopted to assemble the sunroof after fixation. The process schemes of the example vertical pressing methods are shown in FIG. 20 and FIG. 21, according to some example embodiments. The vacuuming procedure and the pressing procedure which are shown in FIG. 21 are identical with the ones in FIG. 20, except the places to apply the sealant. After the vacuum reaches the set number, normally more than 95%, the mold with the second glass 1310-*b* is pressed onto the other mold for 5 second to 30 minutes. During the pressing process, the pressure applied is normally 1 kPa-to 1000 kPa.

4. Cure the adhesives and the sealant: After being pre-assembled, the pre-assembled electrochromic sunroof is cured via an appropriate curing method, including but not limited to radiation (e.g. UV) curing, heat curing, moisture curing, among others known in the art.

Method B, with the Hot Melting Adhesives

1. Prepare the materials: Cut the adhesive and ECD into a desired shape and size with a die cutting machine or a laser machine or others known in the art. Set the right instrument parameters to ensure that the cutting process is performed smoothly. The adhesive in Method B is directly provided as a layer format from commercial resources.

2. Applying the sealant onto one or both of the first glass and the second glass: The same as the Method A, step 2.

3. Pre-assembling of the electrochromic sunroof: Stack the first glass 1310-*a*, the first adhesive layer 1320, the pre-assembled ECD 1330, the second adhesive layer 1350 and the second glass 1310-*b* together layer by layer in an order shown in FIG. 13.

Figure 22:
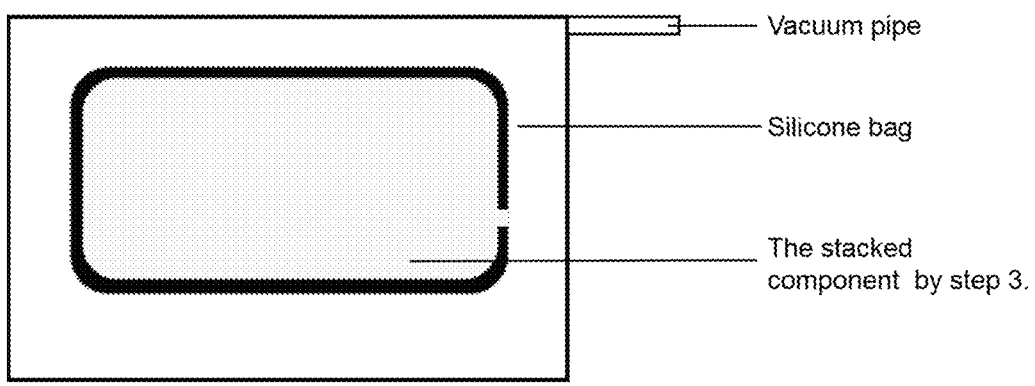
FIG. 22 is a schematic diagram of the stacked components in the silicone bag.

4. Pre-press shaping process: (1) Put the stacked components into a system with vacuum capability (including but not limited to the silicone bag (as shown in FIG. 22), or U-shaped silicone ring), (2) A vacuum generator is used to connect the vacuum pipe of that system, and then the vacuum state is maintained. The vacuum is set to more than 80%. (3) After the vacuum state of the system is maintained for 5-180 min at room temperature, put it into a heating oven. The temperature of the heating oven may range, for example, from 25° C. to 180° C. The heating time may range, for example, from 5 min to 180 min. (4) After heating, the system is kept in a vacuum state until the temperature is cooled to below 60° C. (5) Remove the pre-press component from the silicone bag or U-shaped silicone ring.

5. High-press process: (1) Put the pre-press component into an autoclave. The temperature of the autoclave may range, for example, from 60° C. to 180° C. The pressure of the autoclave may range, for example from 100 kPa to 1800 kPa. The time of the autoclave may range, for example, from 10 min to 1200 min. (2) After high-press in the autoclave, deflate it to standard atmospheric pressure until the temperature is cooled to below 60° C.

Method C, with the Hot Melting Adhesives

1. Prepare the materials: The same as the Method B, step 1.

2. Stack the adhesive, glass together: The same as the Method B, step 3.

3. Pre-press shaping process: The same as the Method B, step 4.

4. High-press process: The same as the Method B, step 5. Obtain unsealed composites.

Figure 23:
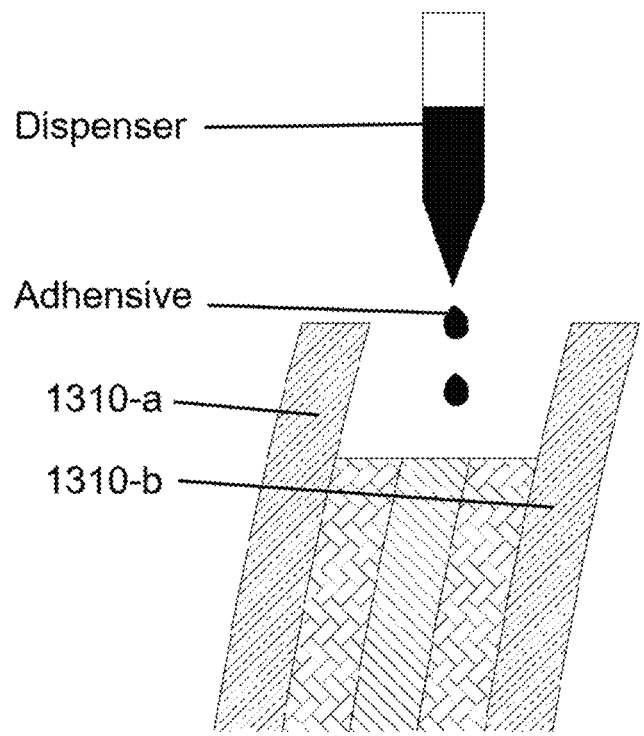
FIG. 23 is a schematic diagram of the sealant dripping process into the space between the two pieces of glass of the unsealed composites.

5. Dripped the sealant into the gap between two pieces of the glass: 1) The sealant is dripped into the gap between two pieces of glass (as shown in FIG. 23) by an appropriate machine. The requirements of the dropping machine and sealant are as the same as Method A, step 2.1.

6. Curing the sealant via an appropriate curing method, including but not limited to radiation (e.g. UV) curing, heat curing, moisture curing, among others known in the art.

Method D, with the Resin OCA or Solid OCA

1. Prepare the materials: The same as the Method C, step 1.

2. Stick the adhesive, glass and/or ECD together to form a half-cell: three different types of half-cells can be formed and they are described separately below.

Figure 24:
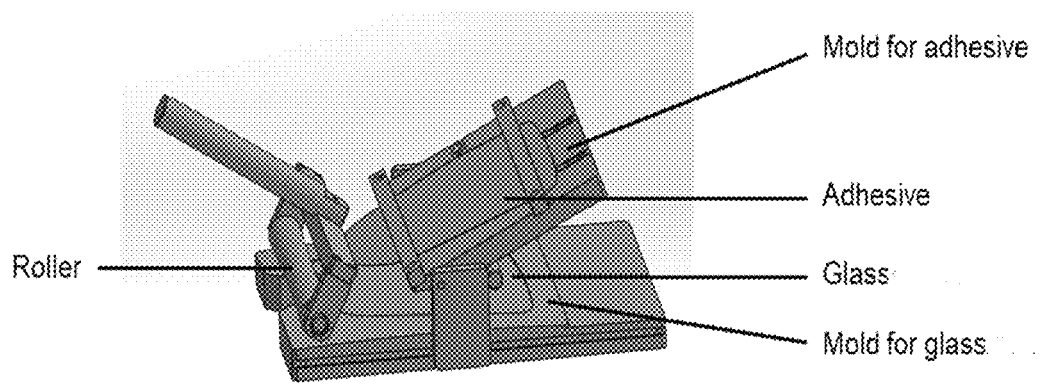
FIG. 24 is a diagram showing a process scheme of the rolling method to apply the adhesive to the glass (half-cell), according to one example embodiment.
Figure 25:
FIG. 25 is a scheme of the customized roller used in a rolling method, according to example embodiments.
Figure 26:
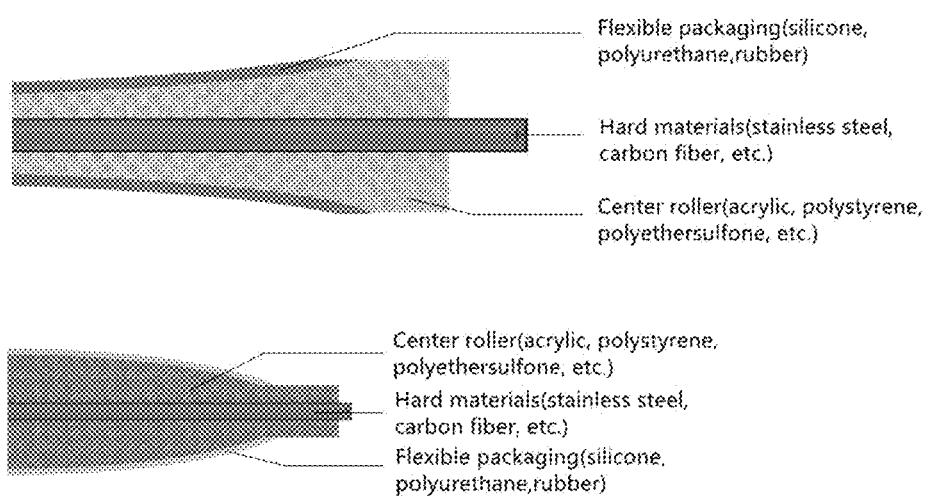
FIG. 26 is another scheme of the customized roller used in a rolling method, according to example embodiments.

2.1 A half-cell made by the first glass and the first adhesive layer: A rolling method can help to attach the resin OCA or solid OCA to the glass. The process scheme is shown in FIG. 24. The rolling process comprises: (1) Fixing the surface of the first glass (including the flat, curved and spherical surfaces, among the others known in the art) on the special fixture of the rolling platform with a mold made from materials which are not as hard as steel (example materials include, but not be limited to, rubber, silica gel, polyurethane, polyacrylate, polyester, epoxy, among others known in the art). The mold is customized according to the curvature of the glass when it comes to curved samples. Commonly the Shore hardness of the mold is more than 50. The curvature deviation between the roller and the glass may be less than 10%. (2) Adjusting the relative position between the edge of the first adhesive layer (resin OCA or solid OCA) and the edge of the first glass to have either both edges aligned or have the edge of the first glass beyond the edge of the first adhesive layer. (3) The adhesive and the surface of the glass are pressed by a roller as shown in FIG. 25 and FIG. 26, which is made by materials not as hard as steel (including, but not limited to be rubber, silica gel, polyurethane, polyacrylate, polyester, epoxy, among others known in the art). The roller is customized according to the curvature of the glass. The Shore hardness of the roller is commonly less than 100. The curvature deviation between the roller and the glass may be less than 10%. During the rolling process, the pressure applied on both the first adhesive layer and the first glass may range, for example, from 100 Pa to 1000 kPa.

2.2 A half-cell made by the first glass, the first adhesive layer and ECD: Stick an ECD to the first adhesive layer from the half-cell prepared by step 2.1 to form another type of half-cell. The equipment used in this step is same as shown in FIG. 24. The rolling process comprises: (1) Fixing the surface of the half-cell prepared by 2.1 (including the flat, curved and spherical surfaces, among the others known in the art) on the special fixture of the rolling platform with a mold made from materials which are not as hard as steel (example materials include, but not be limited to, rubber, silica gel, polyurethane, polyacrylate, polyester, epoxy, among others known in the art). The mold is customized according to the curvature of the glass when it comes to curved samples. Commonly the Shore hardness of the mold is more than 50. The curvature deviation between the roller and the glass may be less than 10%. (2) Adjusting the relative position between the edge of the ECD and the edge of the first adhesive layer on the surface of the half-cell prepared by 2.1 to have either both edges aligned or have the edge of the first adhesive layer beyond the edge of the ECD. (3) The ECD and the half-cell prepared by step 2.1 are pressed by a roller as shown in FIG. 24 and FIG. 25, which is made by materials not as hard as steel, (including, but not limited to be rubber, silica gel, polyurethane, polyacrylate, polyester, epoxy, among others known in the art). The roller is customized according to the curvature of the glass. The Shore hardness of the roller is commonly less than 100. The curvature deviation between the roller and the glass may be less than 10%. During the rolling process, the pressure applied on both the adhesive layer and the glass may range, for example from 100 Pa to 1000 kPa.

2.3 A half-cell made by the first glass, the first adhesive layer, ECD and the second adhesive layer: Stick the second adhesive layer to the surface of ECD from the half-cell prepared by step 2.2 to form another type of half-cell. The same rolling process from 2.1 in method D is used.

3. Pack two half-cells together to form a laminate:

3.1 In some embodiments, one of the half-cells is made via step 2.1 in method D, and the other half-cell is made via step 2.2 in method D. Then the two half cells may be packed together to form a laminate with a vertical pressing method. The equipment used in this step is the same as shown in FIG. 20 or FIG. 21. Fix the first half-cell on the surface of a mold, and fix the second half-cell on the surface of another mold. The mold with the first half-cell and the one with the second half-cell are separated and held by a machine to avoid any contact before the pressing process. After the vacuum reaches the set number, normally more than 95%, one mold is pressed onto the other mold for 5 second to 30 minutes. During the pressing process, the pressure applied is, for example, 1 kPa-to 1000 kPa.

3.2 In some embodiments, one of the half-cells is made via 2.3 of method D, and the other half-cell is the second glass. Then the two half cells may be packed together to form a laminate with a vertical pressing method. The equipment used in this step is same as shown in FIG. 20 or FIG. 21. Fix the first half-cell on the surface of a mold, and fix the second half-cell on the surface of another mold. The mold with the first half-cell and the one with the second half-cell are separated and held by a machine to avoid any contact before the pressing process. After the vacuum reaches the set number, normally more than 95%, one mold is pressed onto the other mold for 5 second to 30 minutes. During the pressing process, the pressure applied is, for example, 1 kPa-to 1000 kPa.

4. High-press process: The same as the Method C, step 4.

5. Dripped the sealant into the gap between two pieces of the glass: 1) The sealant is dripped into the gap between two pieces of glass (as shown in FIG. 23) by an appropriate machine. The requirements of the dropping machine and sealant are as the same as Method C, step 5.

6. Curing the sealant as the same as Method C, step 6.

Embodiment 1: Use Method a to Make an Electrochromic Sunroof with a Curvature Radius of 3000 mm 100. Prepare the materials with a laser machine: To cut an ECD with a thickness of 500 μm, the moving speed of the laser machine is set to be 100 mm/s, laser power is set to be 30 W, and the frequency is set to be 100 Hz. The height of the laser over the ECD layer is 0.2 cm. Select the special LOCA materials with viscosity 300 CPS.

110. Apply the sealant onto the first glass: Select the sealant with the viscosity of 2000000 CPS, and then drip the sealant onto the edge of the first glass, evenly used the holt-melt adhesive dispenser with 160° C. The diameter of the dispenser is 4 mm. The flow rate is 5 mL/min. The thickness of the sealant is 1.5 mm and the width is 3 mm.

120. Pre-assembled steps: (1) Fix the first glass 1310-*a* onto a mold with curvature determined by the glass. (2) Drop the LOCA in the middle of the glass with a glue dispenser. The weight of the LOCA are 200 g. (3) Fix the ECD onto the surface of the LOCA and then drop the LOCA again onto the ECD. The method is the same as step (2). (4) Fix the second glass onto another special mold which curvature is designed based on the glass. (5) The mold with the first glass and the one with the second glass are separated and held by a machine to avoid any contact before the pressing process. After the vacuum reaches the set number, usually more than 95%, the mold with the second glass is pressed onto the other mold for 15 minutes. During the pressing process, the pressure applied is 500 kPa.

130. Curing the pre-assembled electrochromic sunroof: UV curing LOCA is evenly dripped onto the two surfaces between the ECD and the two pieces of glass after press. Then the LOCA is cured via UV curing, with an energy of 2000 mJ/cm$^2$.

Embodiment 2: Use Method a to Make an Electrochromic Sunroof with a Curvature Radius of 0 mm 200. Prepare the materials with a laser machine: The same as Embodiment 1 step 100.

210. Apply the sealant onto the second glass: Drip the sealant onto the edge of one of the second glass. Select the bar-type butyl rubber with 5.0 mm width and 2.0 mm thickness, and then stick onto one piece of glass-b by hand operation.

220. Pre-assembled steps: The same as Embodiment 1 step 120.

230. Curing the pre-assembled electrochromic sunroof: The same as Embodiment 1 step 130.

Embodiment 3: Use Method B to Make an Electrochromic Sunroof with a Curvature Radius of 3000 mm 300. Prepare the materials with a die cutting machine: Set the parameters of a die cutting machine as follow to cut PVB: the customized mold is used, which shape is determined based on the shape of the glass, and the pressing power is set to be 5 t. The height of the mold over the adhesive layer is 1.0 cm.

310. Apply the sealant onto the first glass: Select the sealant with the viscosity of 200000 CPS, and then drip the sealant onto the edge of one of the first glass, evenly used the holt-melt adhesive dispenser with 120° C. The diameter of the dispenser is 4 mm. The flow rate is 8 mL/min. The thickness of the sealant is 1.5 mm and the width is 5 mm.

320. Stack the adhesive, glass together: Stack the first glass, the first adhesive layer, the pre-assembled ECD, the second adhesive layer and the second glass together layer by layer in an order shown in FIG. 13.

330. Pre-press steps: (1) Put the stacked component into the silicone bag. (2) A vacuum generator is used to connect the vacuum pipe of the silicone bag, and then the vacuum state is maintained. The vacuum number is reach 80%. (3) After the vacuum state of the silicone bag is maintained for 15 min at room temperature, put it into a heating oven at 100° C. for 30 min. (4) After heating, the silicone bag is kept in a vacuum state until the temperature is cooled to 60° C.

340. High-press steps: (1) Put the pre-press component into an autoclave. The temperature of the autoclave is heating up to 60 min. (2) After high-press in the autoclave, deflated it to normal pressure until the temperature is cooled to 60° C.

Embodiment 4: Use Method C to Make an Electrochromic Sunroof with a Curvature Radius of 1500 mm 400. Prepare the materials with a die cutting machine: Set the parameters of a die cutting machine as follow to cut PVB: the customized mold is used, which shape is determined based on the shape of the glass, and the pressing power is set to be 5 t. The height of the mold over the adhesive layer is 0.38 cm.

410. Stack the adhesive, glass together: Stack the first glass, the first adhesive layer, the pre-assembled ECD, the second adhesive layer and the second glass together layer by layer in an order shown in FIG. 13.

420. Pre-press steps: The same as Embodiment 3, step 330.

430. High-press steps: The same as Embodiment 3 step 340.

440. Dripped the sealant into the gap between two pieces of glass: Select the sealant with the viscosity of 500 CPS, and then drip the sealant into the gap between two pieces of glass with a glue dispenser. The diameter of the dispenser is 0.5 mm. The flow rate is 5 mL/min. And then the sealant is cured via UV curing, with an energy of 4000 mJ/cm$^2$.

Embodiment 5: Use Method D to Make an Electrochromic Sunroof with a Curvature Radius of 1500 mm 500. Prepare the materials with a die cutting machine: Set the parameters of a die cutting machine as follow to cut solid OCA or resin OCA: the customized mold is used, which shape is determined based on the shape of the glass, and the pressing power is set to be 5 t. The height of the mold over the adhesive layer is 0.38 cm.

510. Prepare a half-cell made by the first glass and the first adhesive layer and ECD: Stick the first adhesive layer to the first glass to form a half-cell by a rolling process. Rolling process steps: (1) Fix the surface of the first glass on the rolling platform with a mold made from rubber. The mold is customized according to the curvature of the glass. The Shore hardness of the mold is 60. The curvature deviation between the roller and the glass is 5%. (2) Attach the edge of the adhesives layer to the edge of the glass. (3) The adhesive and the surface of the glass are pressed by a roller, which is made by silica gel. The roller is customized according to the curvature of the glass. The Shore hardness of the roller is commonly 80. The curvature deviation between the roller and the glass is 5%. During the rolling process, the pressure applied on both the adhesive layer and glass is 6 kPa.

520. Prepare another half-cell made by the second glass, the second adhesive layer and ECD: Use the second glass and the second adhesive layer to form a half-cell via step 510 first and then stick the ECD to the half-cell to form a second half-cell. A rolling process is used. Rolling process steps: (1) Fix the surface of the first half-cell on the rolling platform with a mold made from rubber. The mold is customized according to the curvature of the glass. The Shore hardness of the mold is 60. The curvature deviation between the roller and the glass is 5%. (2) Attach the edge of the ECD to the edge of the adhesive on the surface of the first half-cell. (3) The ECD and the first half-cell are pressed by a roller, which is made by silica gel. The roller is customized according to the curvature of the glass. The Shore hardness of the roller is commonly 80. The curvature deviation between the roller and the glass is 5%. During the rolling process, the pressure applied on both the adhesive layer and glass is 6 kPa.

530. Pack the two half cells together to form a laminate: (1) Fix the half-cell prepared by step 510 onto a mold with curvature determined by the glass. (2) Fix the half-cell prepared by step 520 onto another special mold which curvature is designed based on the glass. (3) The mold with the first half-cell and the one with the second half-cell are separated and held by a machine to avoid any contact before the pressing process. After the vacuum reaches the set number, usually more than 95%, the mold with the second glass is pressed onto the other mold for 15 minutes. During the pressing process, the pressure applied is 500 kPa.

540. High-press process: The same as the Embodiment 4, step 430.

550. Dripped the sealant into the gap between two pieces of glass: The same as Embodiment 4, step 440.

The present disclosure provides an easy way to fabricate a sunroof with all solid-state flexible thin film ECDs. It can be applied to any irregular shape of the sunroof, even for curved sunroofs. Compared with the conventional materials and encapsulation methods, the all solid-state ECD film is safer as nothing will leak when the glass is broken. The disclosed process makes the industrial production of the electrochromic sunroof more manufacturing friendly and cost efficient with improved production yield and reduced waste and defect rate.

Other than electrochromic sunroof disclosed in this disclosure, the pre-assembled flexible solid-state thin film ECD can also be easily applied to fabricate other window-type devices, such as aircraft electrochromic windows, ship electrochromic windows, metro electrochromic windows, train electrochromic windows, building skylights, wall windows, the car side window, display cabinet and so on.

What is claimed is:
1. An electrochromic sunroof, comprising:
 a first glass;
 a first adhesive layer disposed on the first glass;
 a second glass;
 a second adhesive layer disposed on the second glass;
 a solid-state electrochromic device (ECD) interposed between the first adhesive layer and the second adhesive layer; and
 a sealant disposed at edges of the first glass and the second glass to seal the ECD between the first glass and the second glass, wherein,
 the first adhesive layer and the second adhesive layer are optically transparent;
 the sealant includes an opening configured to allow excess of the first adhesive layer and the second adhesive layer to overflow;
 edges of the adhesive layers are equal to or beyond edges of the ECD;
 a lateral surface of the ECD not facing the opening is covered by an adhesive layer formed by the first adhesive layer and the second adhesive layer, and a lateral surface of the adhesive layer is covered by the sealant;

a lateral surface of the ECD facing the opening is covered by the adhesive layer formed by the first adhesive layer and the second adhesive layer; and the sealant is adhesive and waterproof.

2. The electrochromic sunroof of claim 1, wherein the first glass and the second glass are flat or with curvatures.

3. The electrochromic sunroof of claim 1, wherein the first adhesive layer and the second adhesive layer include one or more of a liquid optically-clear adhesive, a resin optically-clear adhesive, a solid optically-clear adhesive, and a hot melting adhesive.

4. The electrochromic sunroof of claim 3, wherein the hot melting adhesives include at least one of ethylene vinyl acetate membrane or polyvinyl butyral membrane.

5. The electrochromic sunroof of claim 1, wherein the sealant include one or more of butyl rubber, epoxy rubber, polyurethane, and acrylic.

6. A method for preparing the electrochromic sunroof of claim 1, the method comprising:
applying the sealant onto one or both of the first glass and the second glass;
stacking the first glass, the first adhesive layer, the ECD, the second adhesive layer, the second glass together layer by layer in a certain order; and
curing the first adhesive layer, the second adhesive layer, and the sealant.

7. A method for preparing the electrochromic sunroof of claim 1, comprises:
applying the sealant onto one or both of the first glass and the second glass;
stacking the first glass, the first adhesive layer, the ECD, the second adhesive layer, the second glass together layer by layer in a certain order;
applying a pre-press shaping process; and
applying a high-press process.

8. A method for preparing the electrochromic sunroof of claim 1, comprises:
stacking the first glass, the first adhesive layer, the ECD, the second adhesive layer, the second glass together layer by layer in a certain order;
applying a pre-press shaping process;
applying a high-press process;
dripping the sealant into a gap between the first glass and the second glass; and
curing the sealant.

9. A method for preparing the electrochromic sunroof of claim 1, comprises:
sticking the first glass and the first adhesive layer together to form a first half-cell, and sticking the second glass, the second adhesive layer, and the ECD together to form a second half-cell; or sticking the first glass, the first adhesive layer, the ECD, and the second adhesive layer together to form a first half-cell and having the second glass as a second half-cell;
packing the first and second half-cells together to stick the first glass, the first adhesive layer, the ECD, the second adhesive layer, the second glass together to form a laminate;
applying a high-press process to the laminate;
applying the sealant into a gap between the first glass and the second glass; and
curing the sealant.

10. An electrochromic sunroof, comprising:
a first glass;
a first adhesive layer disposed on the first glass;
a second glass;
a second adhesive layer disposed on the second glass;
a solid-state electrochromic device (ECD) interposed between the first adhesive layer and the second adhesive layer; and
a sealant disposed at edges of the first glass and the second glass to seal the ECD between the first glass and the second glass, wherein,
the first adhesive layer and the second adhesive layer are optically transparent;
the sealant includes an opening configured to allow excess of the first adhesive layer and the second adhesive layer to overflow;
edges of the adhesive layers are equal to or beyond edges of the ECD;
a lateral surface of the ECD not facing the opening is covered by an adhesive layer formed by the first adhesive layer and the second adhesive layer and covered by the sealant;
a lateral surface of the ECD facing the opening is covered by the adhesive layer formed by the first adhesive layer and the second adhesive layer; and
the sealant is adhesive and waterproof; and
the ECD comprises a solid electrolyte layer, wherein the solid electrolyte layer contains solid electrolyte polymers having a polymer backbone structure, wherein the solid electrolyte polymers includes:
(a) ion conducting polymers copolymerized with monomers or oligomers, wherein the monomers or oligomers have plasticizing moieties as a side chain;
(b) ion conducting polymers covalently linked with plasticizing linear polymers that have a glass transition temperature less than −20° C.;
(c) ion conducting polymers covalently linked with plasticizing polymer blocks that have plasticizing groups as side chains; or
(d) brush copolymers with side chains of one or more ion-conducting species and one or more non-miscible groups.

11. The electrochromic sunroof of claim 10, wherein the first glass and the second glass are flat or with curvatures.

12. The electrochromic sunroof of claim 10, wherein the first adhesive layer and the second adhesive layer include one or more of a liquid optically-clear adhesive, a resin optically-clear adhesive, a solid optically-clear adhesive, and a hot melting adhesive.

13. The electrochromic sunroof of claim 12, wherein the hot melting adhesives include at least one of ethylene vinyl acetate membrane or polyvinyl butyral membrane.

14. The electrochromic sunroof of claim 10, wherein the sealant include one or more of butyl rubber, epoxy rubber, polyurethane, and acrylic.

* * * * *